United States Patent
Leung et al.

(10) Patent No.: US 9,392,332 B2
(45) Date of Patent: *Jul. 12, 2016

(54) APPARATUS AND METHOD FOR PARENTAL CONTROL USING V-CHIP PLUS+ AND MASTER PASSWORD

(71) Applicant: Rovi Guides, Inc., Santa Clara, CA (US)

(72) Inventors: Wing P. Leung, Arcadia, CA (US); Roy J. Mankovitz, Encino, CA (US); Henry C. Yuen, Pasadena, CA (US)

(73) Assignee: Rovi Guides, Inc., San Carlos, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/104,925

(22) Filed: Dec. 12, 2013

(65) Prior Publication Data
US 2014/0196074 A1  Jul. 10, 2014

Related U.S. Application Data

(63) Continuation of application No. 13/190,192, filed on Jul. 25, 2011, now Pat. No. 8,635,642, which is a continuation of application No. 10/033,532, filed on Oct. 16, 2001, now Pat. No. 8,006,260, which is a
(Continued)

(51) Int. Cl.
| | |
|---|---|
| *H04N 7/16* | (2011.01) |
| *H04N 21/475* | (2011.01) |
| *H04N 5/445* | (2011.01) |
| *H04N 7/088* | (2006.01) |

(Continued)

(52) U.S. Cl.
CPC ....... *H04N 21/4753* (2013.01); *H04N 5/44543* (2013.01); *H04N 7/0887* (2013.01); *H04N 7/163* (2013.01); *H04N 21/4314* (2013.01); *H04N 21/4316* (2013.01); *H04N 21/441* (2013.01); *H04N 21/4532* (2013.01); *H04N 21/4751* (2013.01); *H04N 21/4755* (2013.01); *H04N 21/482* (2013.01)

(58) Field of Classification Search
CPC  H04N 21/4532; H04N 7/163; H04N 21/4542
USPC ................... 725/28–31, 34–36; 709/217–232
See application file for complete search history.

(56) References Cited

U.S. PATENT DOCUMENTS

| | | | |
|---|---|---|---|
| 4,847,781 A | 7/1989 | Brown, III et al. | |
| 5,001,554 A | 3/1991 | Johnson et al. | |

(Continued)

OTHER PUBLICATIONS

Decision on Appeal from U.S. Appl. No. 90/011,528.
(Continued)

*Primary Examiner* — Annan Shang
(74) *Attorney, Agent, or Firm* — Ropes & Gray LLP

(57) ABSTRACT

A method and apparatus for exercising access control over television programs using a parental control user interface that has different functions is provided. The method requires a password to enter into a master mode for obtaining access to all the functions of the parental control user interface. Once in the master mode, the user may enter a criterion for blocking a television program from being viewed or recorded or the user can override an already blocked television program.

If a user, not in the master mode, attempts to watch or record a program that meets the blocking criterion and the program does not meet the overriding criterion, a prompt is provided to the user to enter the password. Upon entering a correct password, the program is unblocked.

20 Claims, 69 Drawing Sheets

Related U.S. Application Data continuation of application No. 09/221,615, filed on Dec. 28, 1998, now abandoned, which is a continuation-in-part of application No. 08/831,531, filed on Apr. 1, 1997, now abandoned, and application No. 09/221,615, which is a continuation-in-part of application No. 09/190,031, filed on Nov. 11, 1998, now abandoned.

(60) Provisional application No. 60/014,512, filed on Apr. 1, 1996, provisional application No. 60/022,210, filed on Jul. 18, 1996, provisional application No. 60/023,724, filed on Aug. 8, 1996, provisional application No. 60/111,342, filed on Dec. 7, 1998, provisional application No. 60/100,575, filed on Sep. 16, 1998.

(51) Int. Cl.
*H04N 21/431* (2011.01)
*H04N 21/45* (2011.01)
*H04N 21/482* (2011.01)
*H04N 21/441* (2011.01)

(56) References Cited

U.S. PATENT DOCUMENTS

| | | | |
|---|---|---|---|
| 5,168,372 A | | 12/1992 | Sweetser |
| 5,172,111 A | * | 12/1992 | Olivo, Jr. ............ G11B 27/105 348/E7.056 |
| 5,331,353 A | | 7/1994 | Levenson et al. |
| 5,382,983 A | | 1/1995 | Kwoh et al. |
| 5,434,678 A | * | 7/1995 | Abecassis ............ A63F 13/10 348/E5.102 |
| 5,446,919 A | | 8/1995 | Wilkins |
| 5,465,113 A | | 11/1995 | Gilboy |
| 5,485,518 A | | 1/1996 | Hunter et al. |
| 5,548,345 A | | 8/1996 | Brian et al. |
| 5,550,572 A | * | 8/1996 | Chang ............ B41J 13/10 347/171 |
| 5,550,575 A | | 8/1996 | West et al. |
| 5,583,864 A | | 12/1996 | Lightfoot et al. |
| 5,585,866 A | | 12/1996 | Miller et al. |
| 5,589,892 A | | 12/1996 | Knee et al. |
| 5,610,653 A | | 3/1997 | Abecassis |
| 5,619,653 A | | 4/1997 | Kawauchi |
| 5,710,815 A | | 1/1998 | Ming et al. |
| 5,809,124 A | * | 9/1998 | Bayod ............ H04M 15/00 379/132 |
| 5,878,141 A | | 3/1999 | Daly et al. |
| 5,914,472 A | | 6/1999 | Foladare et al. |
| 5,949,471 A | | 9/1999 | Yuen et al. |
| 5,969,748 A | * | 10/1999 | Casement ........ H04N 5/44543 348/E5.105 |
| 6,018,516 A | | 1/2000 | Packer |
| 6,067,564 A | | 5/2000 | Urakoski et al. |
| 6,095,413 A | | 8/2000 | Tetro et al. |
| 6,108,640 A | | 8/2000 | Slotznick |
| 6,115,057 A | * | 9/2000 | Kwoh et al. ............ 725/28 |
| 6,147,974 A | | 11/2000 | Matsumoto et al. |
| RE36,988 E | | 12/2000 | Johnson et al. |
| 6,226,793 B1 | * | 5/2001 | Kwoh ............ 725/28 |
| 6,262,722 B1 | | 7/2001 | Allison et al. |
| 6,266,816 B1 | | 7/2001 | Watson, Jr. et al. |
| 6,343,275 B1 | | 1/2002 | Wong |
| 6,492,997 B1 | | 12/2002 | Gerba et al. |
| 6,539,429 B2 | | 3/2003 | Rakavy et al. |
| 6,785,817 B2 | | 8/2004 | Bacon et al. |
| 8,046,800 B2 | | 10/2011 | Daniels |
| 2003/0083533 A1 | | 5/2003 | Gerba et al. |

OTHER PUBLICATIONS

EIA, "EIA Standard 608 (EIA-608) Recommended Practice for Line 21 Data Service," 130 pgs., Sep. 20, 1994.
U.S. Appl. No. 09/221,615, filed Dec. 28, 1998, Leung et al.
U.S. Appl. No. 10/033,532, filed Oct. 16, 2001, Leung et al.
U.S. Appl. No. 13/190,192, filed Jul. 25, 2011, Leung et al.
U.S. Appl. No. 13/610,156, filed Sep. 11, 2012, Leung et al.
U.S. Appl. No. 09/398,963, filed Sep. 16, 1999, Hancock et al.
U.S. Appl. No. 10/682,785, filed Oct. 9, 2003, Hancock et al.
U.S. Appl. No. 90/011,528, filed Mar. 3, 2011, Hancock et al.
U.S. Appl. No. 90/011,550, filed Apr. 13, 2011, Hancock et al.

* cited by examiner

*Fig.7*

| 76 | 78 |
|---|---|
| KCBS | 2 |
| KEYT | 3 |
| KNBC | 4 |
| KTLA | 5 |
| CH | 6 |
| KABC | 7 |
| KCAL | 9 |
| FOX | X |
| KCOP | 13 |
| KSCI | 18 |
| KWHY | 22 |
| KVCR | 24 |
| KCET | 28 |
| KMEX | X |

Fig. 8

| KCBS | 2 |
| KEYT | 3 |
| KNBC | 4 |
| KTLA | 5 |
| CH | 6 |
| KABC | 7 | X | REVIEW | V-CHIP PLUS+ |
| KCAL | 9 | BLOCK THIS CHANNEL | | |
| FOX | X |
| KCOP | 13 |
| KSCI | 18 |
| KWHY | 22 |
| KVCR | 24 |
| KCET | 28 |
| KMEX | X |

*Fig.* 9

| KCBS | 2 |
|---|---|
| KEYT | 3 |
| KNBC | 4 |
| KTLA | 5 |
| CH | 6 |
| KABC | X |
| KCAL | 9 |
| FOX | X |
| KCOP | 13 |
| KSCI | 18 |
| KWHY | 22 |
| KVCR | 24 |
| KCET | 28 |
| KMEX | X |

| ✓ | REVIEW | V-CHIP PLUS+ |
|---|---|---|

*Fig. 10*

| KCBS | 2 |
|------|---|
| KEYT | 3 |
| KNBC | 4 |
| KTLA | 5 |
| CH | 6 |
| KABC | X |
| KCAL | 9 |
| FOX | X |
| KCOP | 13 |
| KSCI | 18 |
| KWHY | 22 |
| KVCR | 24 |
| KCET | 28 |
| KMEX | X |

✓ REVIEW   V-CHIP PLUS+
VCR/V-CHIP PLUS+ REVIEW LIST 80
82

Fig. 11

VCR/V-CHIP PLUS + REVIEW LIST

```
07 SAT 01/10      11:15p    1h 55m + 15m
11 M-F            07:30p    1h 40m - 15m
28 M-F            04:00p    1h 00m
35 WED 1/21       02:00p    2h 10m + 15m
28 SAT WKLY       11:00a    1h 55m + 30m
09 M-F            10:00p    1h 00m
02 SUN 01/18      10:00p    3h 50m
```

△▽ MOVE    [ENTER] DELETE

[CHANGE] ◁▷ REDUCE PROGRAM LENGTH

[CHANNEL SURF] EXIT

*Fig. 12*

| | | | | |
|---|---|---|---|---|
| KCBS | 2 | | | |
| KEYT | 3 | | | |
| KNBC | 4 | | | |
| KTLA | 5 | | | |
| CH | 6 | | | |
| KABC | X | ✓ | REVIEW | V-CHIP PLUS+ |
| KCAL | 9 | GO TO V-CHIP PLUS+ SETUP SCREEN | | |
| FOX | X | | | |
| KCOP | 13 | | | |
| KSCI | 18 | | | |
| KWHY | 22 | | | |
| KVCR | 24 | | | |
| KCET | 28 | | | |
| KMEX | X | | | |

80 — (points to KABC row)
82 — (points to V-CHIP PLUS+ cell)

SET V-CHIP  ☐ ON  ☐ OFF
         126  122  120

[MOVIE RATINGS] 130
[TV RATINGS] 128

BLOCKS SHOWS RATED HIGHER THAN: 124

THE V-CHIP FEATURE IS DISABLED

AND BLOCKS:

☐ VIOLENCE        ☐ LANGUAGE
☐ SEXUAL SITUATIONS  ☐ DIALOGUE

◁▷ CHANGE/SELECT

TO PERSONALIZE YOUR TV VIEWING,
PRESS [V-CHIP PLUS+/BLOCK]
△▽ TO MOVE
[VCHIP+] TO EXIT

Fig. 23

V-CHIP PLUS+

TO BLOCK THE SHOW:

KWHY 22 7/4 SAT 10:00p - 0:00a

ONCE — 142
140

DAILY

WEEKLY

THIS SHOW WILL BE BLOCKED

THANKS FOR USING V-CHIP+

Fig. 26

REVIEW V-CHIP PLUS+ SELECTIONS

146 — BLOCK  144 — RECORD  WATCH

BABYSITTER ON(OFF)

| KNBC | 4 | SUN | 05/17 | 11:00a-12:15p |
| KTLA | 5 | M-F | | 11:00a-12:15p |
| KWHY | 22 | SAT | WKLY | 10:00p-11:20p |

△▽◁▷  MOVE CURSOR

VCHIP+  TO EXIT

ENTER  DELETE

Fig. 27

RECORD/WATCH

TO RECORD THE SHOW:

| CH | 36 | 6/21 | SUN | 2:46a-2:52a |

ONCE    DAILY    WEEKLY

THIS SHOW WILL BE RECORDED

Fig. 29

RECORD/WATCH

TO WATCH SHOW:

CH. 36   6/21   SUN   2:46a - 2:52a

[ONCE]   [DAILY]   [WEEKLY]

TV WILL TURN ON WHEN THIS SHOW IS ON

Fig. 30

REVIEW V-CHIP PLUS+ SELECTIONS

| BLOCK | RECORD | WATCH |

BABYSITTER ON(OFF)

| KCBS | 2 | SAT | 05/16 | 09:00a-10:00a |
| KNBC | 4 | M-F | | 12:00p-01:00p |

△▽◁▷ MOVE CURSOR    ENTER  DELETE

VCHIP+ TO EXIT

*Fig. 32*

BABYSITTER

ON / OFF

BABYSITTER SETS YOUR TV TO RECIEVE ONLY THOSE PROGRAMS YOU SELECT. TO IDENTIFY THESE PROGRAMS, ENTER THEIR PLUSCODES BELOW:

PLUS CODE  23452

ONCE   WEEKLY   DAILY

△▽ ◁▷   TO MOVE
VCHIP+   TO EXIT
REVIEW   BABYSITTER SELECTIONS

ENTER   TO SELECT

Fig. 33

BABYSITTER PROGRAM REVIEW

☐ ON    ☐ OFF

WHEN ON, YOU WILL ONLY BE ABLE TO WATCH THE PROGRAMS LISTED BELOW:

| KCBS | 2  | MON | 05/18  | 10:00p – 12:30a |
| KABC | 7  | MON |        | WEEKLY 02:00p – 03:30p |
| CH   | 24 | THU | 05/21  | 10:30a – 10:00p |

△▽ TO MOVE

ENTER   DELETE

VCHIP + TO CANCEL & EXIT
BABYSITTER   BACK TO ENTRY SCREEN

*Fig. 34*

Show Blocked by VChip Plus+

Please enter a password, then press the
<OK> key.

———  ———  ———  ———  ———  ———

OR
Press the Guide key to enter GUIDE Plus+.

Press the Ch+ or Ch- key to go to the next
channel

Press <OK> to try again.

FIG. 66

Do you wish to establish a
VChip Plus+ Master Password?
This will enable you to block shows by
rating, time, channel and program title.

Yes
No

FIG. 67

You may set up a VChip Plus+
Master Password at any time
by entering GUIDE Plus+ and
selecting the VChip Plus+
password screen.

FIG. 68

Password Creation
Please create a password by inputting
a 3 to 7 digit number using the
number keys on the remote.
Choose something that you will not forget.

___  ___  ___  ___  ___  ___  ___

Input only zeros if you wish create a
password later
Press <OK> when finished.

FIG. 69

Password Confirmation
Please repeat your password using the
number keys on the remote.

— — — — — —

Input only zeros if you wish create a
password later.
Press <OK> when finished.

FIG. 70

Password Accepted
Please be sure you do not forget your
password.

Press <OK> to exit.

FIG. 71

APPARATUS AND METHOD FOR PARENTAL CONTROL USING V-CHIP PLUS+ AND MASTER PASSWORD

CROSS-REFERENCE TO RELATED APPLICATIONS

This application is a continuation of U.S. patent application Ser. No. 13/190,192, filed Jul. 25, 2011, which is a continuation of U.S. patent application Ser. No. 10/033,532, filed Oct. 16, 2001 (now U.S. Pat. No. 8,006,260), which is a continuation of U.S. patent application Ser. No. 09/221,615, filed Dec. 28, 1998 (now abandoned), which is a continuation-in-part of U.S. patent application Ser. No. 08/831,531, filed Apr. 1, 1997 now abandoned), which itself claims priority to the following applications: U.S. provisional Application No. 60/014,512, filed Apr. 1, 1996, entitled "User Programmable V-Chip System"; U.S. Provisional Application No. 60/022,210, filed Jul. 18, 1996, entitled "Parental Control Method and Apparatus"; and U.S. provisional Application No. 60/023,724, filed Aug. 8, 1996, entitled "Parental Control for Cable Input." U.S. patent application Ser. No. 09/221,615, which is also a continuation-in-part of U.S. patent application Ser. No. 09/190,031 filed Nov. 11, 1998 (now abandoned), additionally claims priority to the following applications: U.S. provisional Application No. 60/111,342 filed Dec. 7, 1998, entitled "Guide Oriented Parental Control Apparatus and Method" and U.S. provisional Application No. 60/100,575, filed Sep. 16, 1998, entitled "V-CHIP PLUS+: IN-GUIDE USER INTERFACE APPARATUS AND METHOD FOR PROGRAMMABLE BLOCKING OF TELEVISION AND OTHER VIEWABLE PROGRAMMING, SUCH AS FOR PARENTAL CONTROL OF A TELEVISION RECEIVER". The above-identified applications are incorporated by reference as if fully set forth herein.

FIELD OF THE INVENTION

The present invention relates generally to television systems, and more particularly, to parental control of television receivers using a master password to effectuate a variety of access control functions.

BACKGROUND OF THE INVENTION

A system has been proposed in the United States and endorsed by the U.S. Congress commonly known as the V-Chip System. The system involves using the vertical blanking interval ("VBI") of a standard television signal to include a code which indicates one or more rating factors for the program then being aired. These rating factors can include ratings similar to those promulgated by the Motion Picture Association of America (e.g. G, PG, PG-13, R, NC-17) and numerical ratings of individual categories of program nature such as violence, language, nudity and sexual content. A consumer V-Chip television system would allow a consumer to program his or her television system to exclude programs according to their preferred levels of one or more of these rating criteria or alternatively could be programmed to permit only programs having certain levels of content according to these rating categories.

A problem with the V-Chip system, as recognized in an article by T. Atherton, entitled "Living With the V-Chip," The Ottawa Citizen, Entertainment, Section F, pp. F1-F2 (Saturday, Mar. 9, 1996), is that the perceived utility of the V-Chip system to a consumer depends on whether the consumer agrees with the subjective ratings contained in the VBI for most, if not all, programs. The author of this article, who purportedly has been involved in a "Beta-test" of the V-Chip system in Canada, gives two illustrative examples in his article. First, "trash-talk" shows are rated at the lowest possible level for violence and the next lowest level for language and sex categories, even though these shows often contain verbal violence, physical confrontations and graphic verbal sexual discussions. Second, utilizing the overall rating system to exclude this type of program, such as excluding all programs with a rating above PG, results in the blocking out of many programs which the author considers appropriate for viewing and does not wish blocked out, such as the movie Forrest Gump.

Although some people may disagree with the author's judgment of the relative harm and worth of particular television programs, the article illustrates, at least, that regardless of how much the ratings providers will be able to adjust and fine tune their ratings system, based upon the majority of consumers' wishes, there will remain a significant portion of the consumer public who will disagree with the rating systems and think that whatever exclusion programming they do will block out desirable programs while not blocking out undesirable programs.

Another problem with the existing parental control systems is that the users (parents) have to re-enter a password every time they block/unblock a program or invoke a related function. This is time consuming and will quickly become annoying as well. Yet Another problem with the parental control systems using passwords is that the users (parents) forget the password. This may lead to service calls to equipment manufacturer, adding to the cost of support. Accordingly, an improvement on the V-Chip system access control is needed.

SUMMARY OF THE INVENTION

The present invention is directed to an apparatus and method that satisfies this need. There is, therefore provided, according to a preferred embodiment, an apparatus for parental control of a television receiver. A memory provides storage of information relating to television programming. A microprocessor generates a blocking command as a function of the information stored in memory including a master password. A blocking circuit, which passes a baseband television video signal to a television display, provides blocking of the video signal in response to the blocking command. The blocking can be overridden by a user-provided list in the memory.

It is understood that other embodiments of the present invention will become readily apparent to those skilled in the art from the following detailed description, wherein it is shown and described only embodiments of the invention by way of illustration of the best modes contemplated for carrying out the invention. As will be realized, the invention is capable of other and different embodiments and its several details are capable of modification in various other respects, all without departing from the spirit and scope of the present invention. Accordingly, the drawings and detailed description are to be regarded as illustrative in nature and not as restrictive.

DESCRIPTION OF THE DRAWINGS

These and other features, aspects, and advantages of the present invention will become better understood with regard to the following description, appended claims, and accompanying drawings where:

FIG. 7 is a television screen displaying a Channel Surf Menu formatted in accordance with a TV mode of the present invention;

FIG. 8 is a television screen displaying a Channel Surf Menu with sub-menu prompts formatted in accordance with a TV mode of the present invention;

FIG. 9 is a television screen displaying a Channel Surf Menu with sub-menu prompts formatted in accordance with a TV mode of the present invention;

FIG. 10 is a television screen displaying a Channel Surf Menu with sub-menu prompts formatted in accordance with a TV mode of the present invention;

FIG. 11 is a television screen displaying a VCR/V-Chip Plus+ Review List formatted in accordance with a TV mode of the present invention;

FIG. 12 is a television screen displaying a Channel Surf Menu with sub-menu prompts formatted in accordance with a TV mode of the present invention;

FIG. 23 is a television screen displaying a V-Chip Set-Up Screen with the V-Chip function disabled formatted in accordance with a TV mode of the present invention;

FIG. 26 is a television screen displaying a V-Chip Plus+ Screen for programming the frequency of the selected television program formatted in accordance with a TV mode of the present invention;

FIG. 27 is a television screen displaying a V-Chip Plus+ Selections Review List for blocked television programs formatted in accordance with a TV mode of the present invention;

FIG. 29 is a television screen displaying a Record/Watch Screen for programming the frequency of the selected television programs to be recorded formatted in accordance with a TV mode of the present invention;

FIG. 30 is a television screen displaying a Record/Watch SCREEN for programming the frequency of the selected television programs to be watch formatted in accordance with a TV mode of the present invention;

FIG. 32 is a television screen displaying a V-Chip Plus+ Selections Review List for watched television programs formatted in accordance with a TV mode of the present invention;

FIG. 33 is a television screen displaying a Babysitting Screen formatted in accordance with a TV mode of the present invention;

FIG. 34 is a television screen displaying a Babysitter Program Review Screen formatted in accordance with a TV mode of the present invention;

FIGS. 40-65 depict the operation of the VChip Plus+ and Parental Control, including selection and deletion for blocking and unblocking television programs based on different criteria in a GUIDE mode (GUIDE Plus+);

FIG. 66 is a display screen displaying the Password Dialog Box; and

FIGS. 67-72 are display screens displaying the Password Setup process.

DETAILED DESCRIPTION

A preferred embodiment of the present invention is a combination of the V-Chip system and a parental control system more oriented around programming by a user for blocking and enabling particular television programs. Such a parental control system is described in U.S. Pat. No. 5,382,983, which is hereby incorporated by reference as if set forth in full herein. The preferred embodiment adds functionality which allows the two systems to work together to form a system which is an improvement over either system. In the preferred embodiment, the user is allowed to override the operation of the V-Chip system for particular programs contained in user programmable enable override lists and blocking override lists. The parental control functions are accessed and selected in two different modes based on the preference of the user. In the TV mode, a variety of interactive television screens display functions and user choices using text and graphics. In the GUIDE mode, the function and choices are made available to the user through menus in a program guide context.

Figure 1:
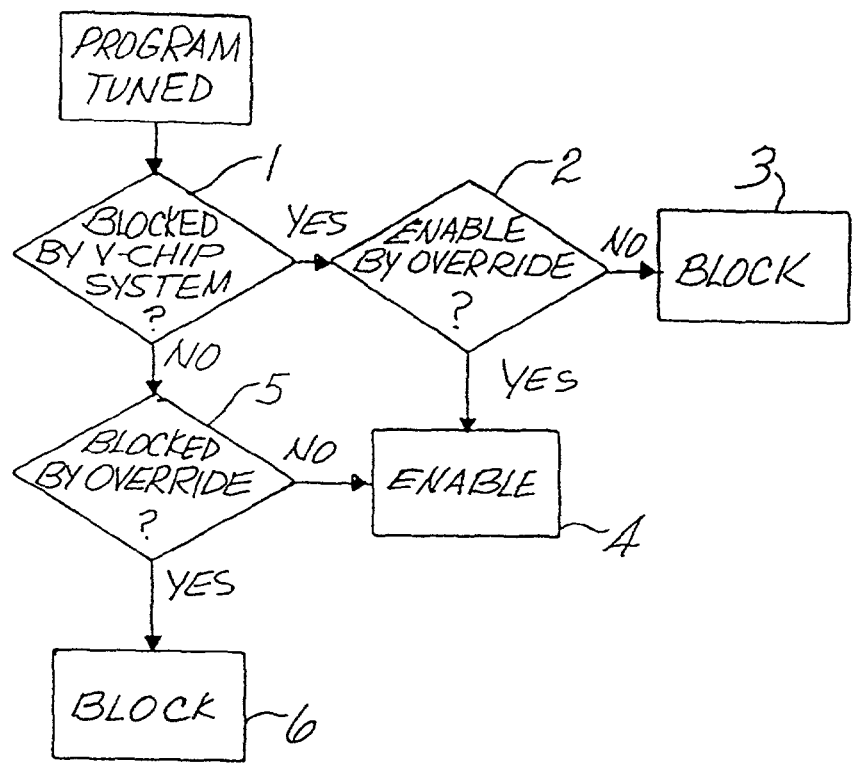
FIG. 1 is a flow diagram of the parental control apparatus used with the V-Chip system in accordance with a preferred embodiment of the present invention.

Turning to FIG. 1, a flow chart of the operation of this override system is shown. In block 1, the V-Chip system operates as originally designed: a program is tuned, resulting in an output indicating that either the program should be blocked or should not be blocked, according to the user's programming of the V-Chip system. If, according to the V-Chip system, the program should be blocked, the Yes Path from block 1 is followed to block 2. In block 2, the program being tuned is checked against a list of programs which have been specifically enabled by the user called the enable override list. If the program being tuned does not appear on the enable override list, the No Path out of block 2 is followed to block 3 in which the program being tuned is blocked. If, on the other hand, it is found in block 2 that the program being tuned is contained in the enable override list, then the Yes Path out of block 2 is followed to block 4 which enables the program to be tuned.

If the V-Chip system outputs a signal that the program is not to be blocked pursuant to the user's programming of the V-Chip system, the No Path out of block 1 is followed to block 5. In block 5, the program to be tuned is compared against a override list to block particular programs (the "blocking override list") in a similar manner as is performed in block 2 for the enable override list. If the program to be tuned is found to be contained in the blocking override list, the Yes Path out of block 5 is followed to block 6 and the program being tuned is blocked. If the program being tuned is not contained in the blocking override list in block 5, then the No Path from block 5 is followed to block 4, in which case the program is allowed to be tuned.

The blocking override list and enable override list may be defined in a number of ways. One way would be to define programs by channel, date, start time and length (or ending time). Thus, a clock and a link to the tuner would be employed to determine whether the program being tuned falls within any of the sets of channel, irate, time and length information contained in either of the override lists.

Alternatively, the lists could consist of compressed codes such as those described in U.S. Pat. No. 5,335,079. A particular implementation of this type of compressed codes are Plus-Code™ numbers used by Gemstar Development Corporation's VCRPlus+® systems that presently appear in television calendars and may be used to enter the selected programs, rather than using the more laborious and time consuming approach of inputting the uncompressed channel, date, time and length of the program that is selected.

Alternatively, the lists could be composed of the titles of television programs desired to be on the override lists. These titles could be compared against title information broadcast in the VBI with each program as part of the V-Chip coding information, using the XDS system or other similar system. Alternatively, the titles could be compared to a database which relates the channel, date, time, length to program titles, such as that contained in many electronic television guides.

A problem that arises in implementing the system described in FIG. 1 is that the blocking override list and the enable override list can be, and in most cases will be, very cumbersome to create. One solution to this problem is using a system similar to that described in co-pending U.S. application Ser. No. 08/031,246, filed Mar. 12, 1993, which is hereby incorporated by reference as if fully set forth herein. With this system, a user would call a representative on the telephone and relate various selection criteria that are important to the user to the representative. These selection criteria may include television channels, times of day, program titles, program subject matter categories, and actors and actresses appearing in the programs. The representative would have access to an extensive centralized computerized database which would include all of this type of data for each television program scheduled to be broadcast. In addition, this extensive database could include a variety of additional rating systems other than those provided by the broadcasters in conjunction with the V-Chip system. Any of a variety of third parties might provide such ratings such as religious organizations, newspapers and rating services targeted to particular segments of the user public. Based upon the selection criteria provided by the user, the representative's computer downloads the data to program the user's system, by telephone, VBI, or other available data path.

In another alternative embodiment, a database similar to the extensive centralized database described above, and containing the same types of ratings information, including third party ratings, may be stored locally in the user's system. One of the ways this embodiment would become feasible is if the system is combined with a locally stored electronic program guide which already stores the channel, date, time, length, title, category and descriptions of a large number of future scheduled television programs.

In yet another alternative embodiment, in addition to ratings prepared by the Motion Picture Association of America and the television broadcasters, the ratings of third parties are included within the V-Chip data along with an identification of the third party ratings providers, allowing the user to choose the rating provider which most closely matches their own values.

Figure 2:
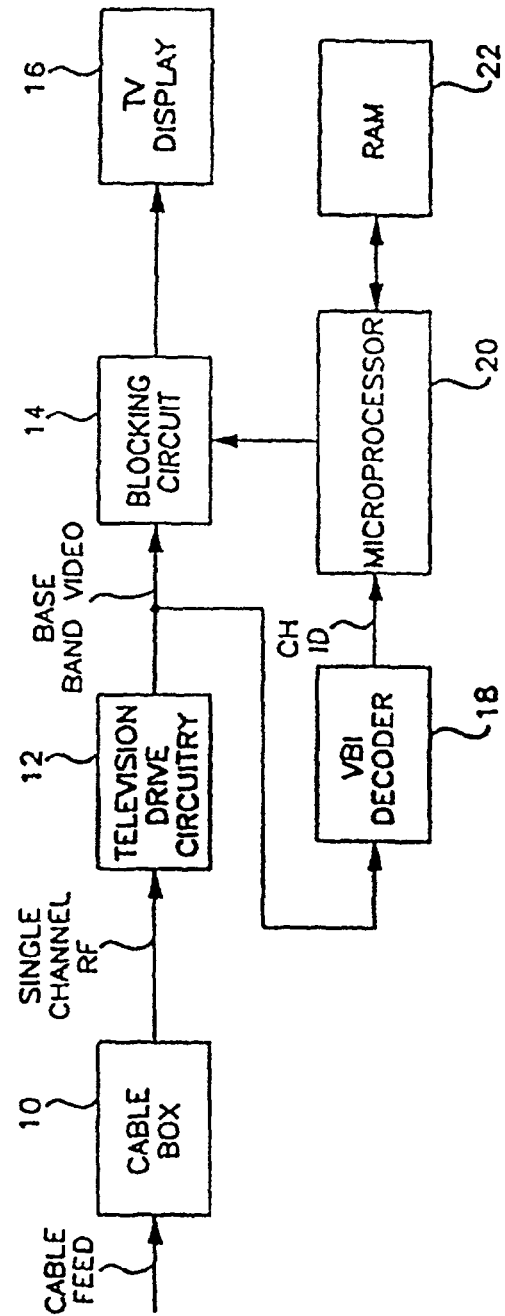
FIG. 2 is an electrical block diagram of the parental control apparatus in accordance with a preferred embodiment of the present invention.

A preferred embodiment of an override system for use with the V-Chip system described above is shown in FIG. 2. A multichannel radio frequency (RF) television signal from a cable feed is connected to the input of a cable box 10, which has a channel changing control. The output of cable box 10, which is a single channel RF television signal at the frequency of the user selected channel, is coupled to television drive circuitry 12. The output of the television drive circuitry 12 is connected by a transmission blocking circuit 14 to a television display 16. Blocking circuit 14 could be a conventional analog signal transmission gate, or any other similar device known in the art.

For the purpose of describing the operation of the override system, it is assumed that the television signal of each channel carried by the cable feed contains supplemental data, including channel identification, such as HBO, CNN, or NBC. Preferably, the channel identification is embedded in the VBI of the signal of each channel in an XDS format.

The output of the television drive circuitry 12 is also connected to the input of a VBI decoder 18, which strips the XDS signal from the baseband television signal. The output of VBI decoder 18, which includes a data signal representative of the channel identification of the channel to which the cable box 10 is tuned, is coupled to a microprocessor 20, the output of which controls the blocking circuit 14. The microprocessor 20 is coupled to a RAM 22.

The programs to be selectively blocked are stored in RAM 22. For each program the date, time, channel and program length are stored in RAM 22 in a stack arrangement as described in U.S. Pat. No. 5,382,983 ("the '983 patent") and co-pending U.S. application Ser. No. 08/684,678, the disclosures of which are hereby incorporated by reference as if set forth in full herein. The program blocking data base stored in RAM can be generated in a number of different ways. One way is to transmit groups of program data consisting of date, time, channel, and length content according to a customized rating service, as composed for example by a religious group, newspaper, or political association, and to download such data to RAM 22 from the VBI of the television signal or a telephone line. (See for example the above referenced '983 patent.) The viewer can call up an on-screen menu of choices of customized rating services that are transmitted in the VBI or telephone line, key in the selected service, and command the microprocessor 20 to download the group of program data corresponding to the selected service. Another way is to key in the data of the individual programs through a remote controller. A third way is to select the programs with a cursor from an on screen electronic program guide ("EPG"), in which the EPG data base is used both to determine the programs to be blocked and the programs to be viewed or recorded. In any case, the microprocessor 20 continuously monitors the output of a real time clock in the microprocessor 20, and the channel identification of the channel to which cable box 10 is tuned, which is recovered by VBI decoder 18 or by monitoring the tuner and using a channel map. These monitored attributes are compared with the data of the program blocking database. Preferably, this is accomplished by arranging the data base in a stack in RAM 22 as described in the '983 patent such that the top of the stack is the next program telecast to be blocked. When a match is found, the microprocessor 20 actuates the blocking circuit 14, thereby preventing the TV display 16 from showing the program.

When the override system is used in conjunction with the V-Chip system, a code is also included in the VBI which indicates one or more rating factors for the program then being aired. In this embodiment, the user programs the television system to exclude programs according to one or more of these rating criteria. The user selections are stored in RAM 22, and compared with the code transmitted in the VBI. In the event an excluded program is detected by the microprocessor 20, via the VBI decoder 18, an enable override list stored in RAM 22 is consulted. The blocking circuit 14, under microprocessor control, prevents the excluded program from being presented to the TV display 16 if the program is not contained in the enable override list. Conversely, if the program currently being aired is not excluded under the rating criteria established by the user, a blocking override list stored in RAM 22 is checked by the microprocessor 20. The blocking circuit 14, under microprocessor control, allows the program to pass to the TV display 16 if the program is not contained in the blocking override list.

In the described embodiment where the television programs comprising the blocking override list and the enable override list are defined by channel, date, start time and length (or ending time), or through the use of compressed codes such as those described in U.S. Pat. No. 5,335,079, an alternative arrangement is necessary to accommodate the addition of a cable box or video cassette recorder ("VCR").

With conventional cable box or VCR hook-ups, a cable box or VCR is connected to the front end of the television receiver. The cable box, or VCR, has a tunable bandpass filter for tuning the desired channel. The television signal from the tuned channel is modulated onto a fixed carrier frequency, by way of example channel 3, and coupled to the television receiver. The television receiver is tuned to the carrier frequency output of the cable box, or VCR, regardless of the particular channel selected. Since the television receiver is always tuned to the fixed frequency, the microprocessor of FIG. 2 will be unable to ascertain when a blocked or selected television program is selected at the cable box, or VCR.

Figure 3:
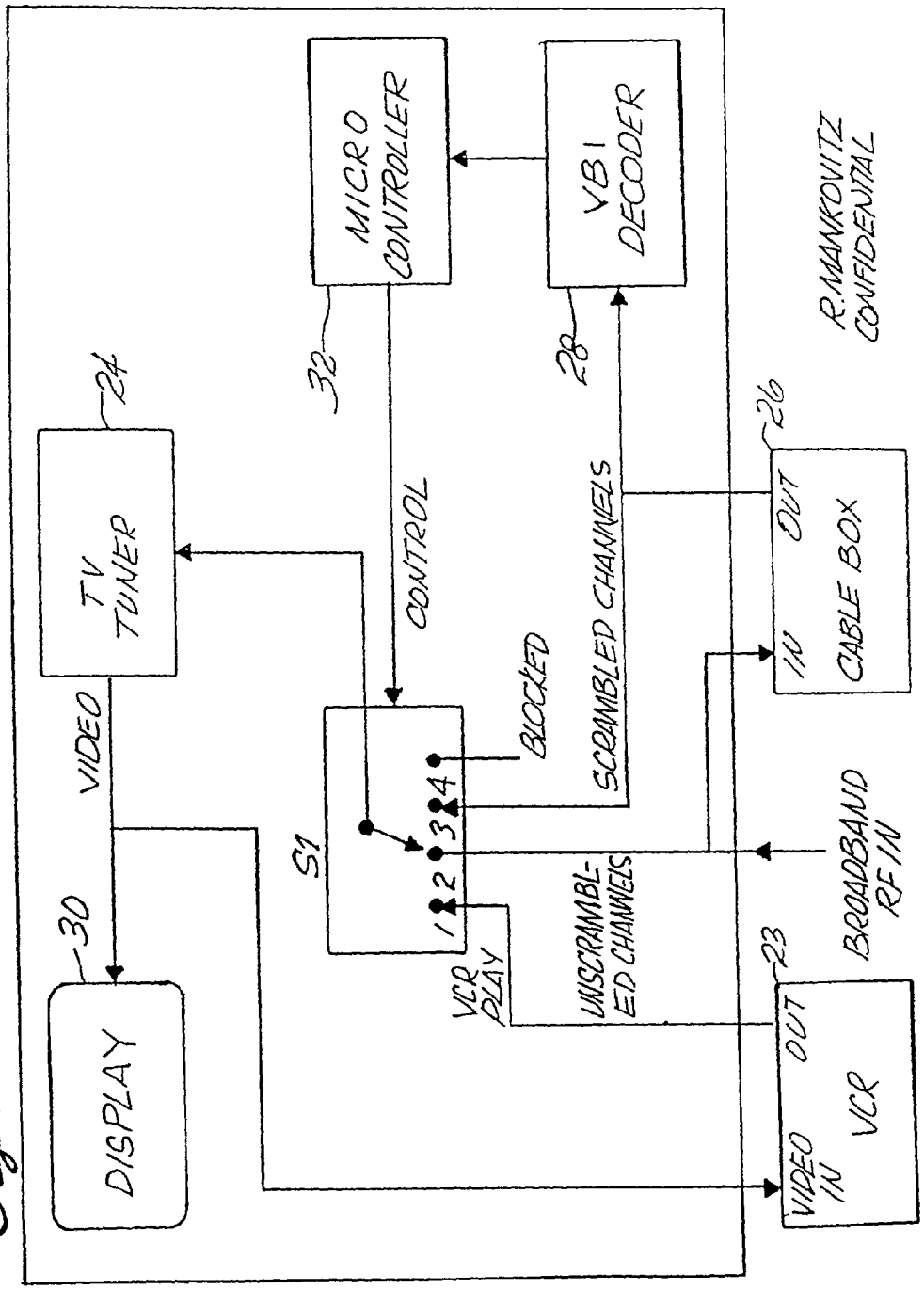
FIG. 3 is an electrical block diagram of the parental control apparatus used in a cable system in accordance with a preferred embodiment of the present invention.

Turning to FIG. 3, a preferred embodiment of the present invention is shown which accommodates a system employing both a cable box and a VCR implemented with a low cost mechanization using a simple switch S1. The VCR tuning issue is resolved by connecting the video input of the VCR 23 to the video output of the TV tuner 24, which is always tuned to a parentally enabled program. There is no reason for the VCR 23 to have broadband input.

With respect to cable box tuning, the cable box 26 is used only for tuning scrambled programs. During setup, the user identifies the scrambled (premium) channels in his or her cable lineup. This can be automated or performed manually. In this embodiment, the scrambled program providers will transmit their names (HBO ESPN, etc.) in the VBI of the television signal. Accordingly, when a scrambled channel is selected by the user, the cable box 26 is tuned to the respective channel, and the VBI is scanned for the name, via VBI decoder 28. If the name cannot be identified, the channel is blocked.

VCR recording may also be controlled by providing the VCR video input with the same signal that is provided to the display 30 by the TV tuner 24. This signal has already been processed to insure that it contains a program that has been authorized. Hence, the user can only record authorized programs.

In operation, when a user requests a non-scrambled channel, the microprocessor 32 checks to see (from setup table) if the requested channel is designated as a scrambled channel, and also checks to see (from PlusCode table) if this channel is unblocked for the particular time slot. If the television channel is unblocked and non-scrambled, switch S1 is set to position 2 and the TV tuner 24 is tuned to the requested channel. If the requested channel is to be blocked, S1 is set to position 4, so the TV tuner 24 has no input. The user may also record the displayed program (but no other program since the VCR video input comes from the TV tuner output).

If the user requests a scrambled channel, the microprocessor 32 checks to see if the requested channel is designated as a scrambled channel, and also checks to see (from PlusCode table) if this channel is unblocked for the particular time slot. If the television channel is unblocked and scrambled, S1 is set to position 3, and the cable box 26 is tuned to the requested channel. The VBI decoder 28 monitors the cable box output, looking for the channel name in the VBI (broadcast say every minute). If a name is found, it is compared to the channel name in the channel setup table. If a match is detected, the TV tuner 24 is tuned to channel 3, and the program is displayed. If no match is detected, S1 is switched to position 4, and the display 30 is blanked. Thus, if the user tries to manually change the cable box channel, the VBI name check will fail and S1 will be switched to position 4 to blank the display. The user may also record the displayed program (but no other program since the VCR video input comes from the TV tuner output).

If the user requests to play a tape in the VCR, S1 is switched to position 1, and the TV tuner 24 is tuned to channel 3. Note that in position 1, the VCR has no RF/video input. Hence the user cannot use the VCR tuner.

Figure 4:
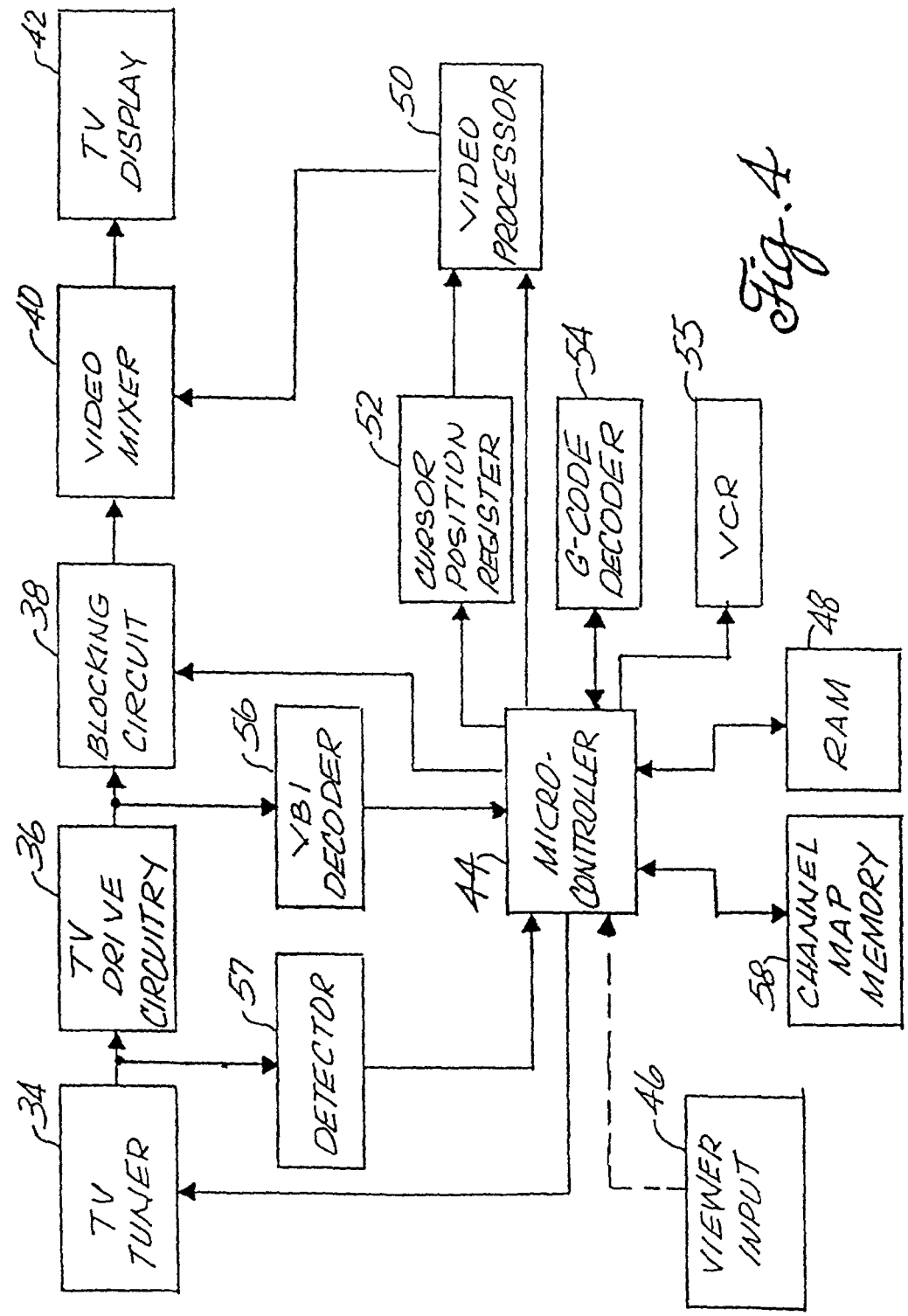
FIG. 4 is an electrical block diagram of a parental control apparatus in combination with a V-Chip system employing VCR Plus+ and automated channel mapping in accordance with a preferred embodiment of the present invention.

Turning to FIG. 4, a detailed electrical diagram of a preferred embodiment of the present invention is shown incorporating the V-Chip system with the override system ("V-Chip Plus+ system"). Preferably, the V-Chip Plus+ system is responsive to compressed codes for creating the override lists, such as those described in U.S. Pat. No. 5,335,079, and includes automatic channel mapping capability. Specifically, a TV tuner 34 is positioned at the front end of the television receiver for passing a selected channel of a multichannel RF television signal. The TV tuner 34, which can be any conventional tuner in the art, should provide amplification, downconversion to an intermediate frequency ("IF") and demodulation, as well as frequency tuning. The TV tuner 34 is coupled to television drive circuitry 36 which provides the signal processing required to amplify and downconvert the IF signal to a baseband television video signal. The output of the television drive circuitry 36 is connected to a blocking circuit 38. The blocking circuit 38 could be a conventional analog signal transmission gate, or any other similar device known in the art. The output of the blocking circuit 38 is connected to a TV display 42 through a video mixer 40 for selectively displaying the television program currently being broadcast on the selected channel.

The TV tuner 34 is tuned to the selected channel by a microprocessor 44. A viewer input device 46, preferably in the form of a remote infrared ("IR") controller, is coupled to the microprocessor 44 to provide viewer control of the television channels. The viewer input device 46 also allows the viewer to remotely program the V-Chip Plus+ system to exclude programs according to one or more rating factors, as well as compiling or modifying the V-Chip Plus+ override lists. When the viewer wishes to review the particular ratings set in the V-Chip Plus+ system or the V-Chip Plus+ override lists, the microprocessor 44 retrieves the appropriate information from RAM 48 and couples it to the video processor 50, where the information is formatted for display. Preferably, the information stored in the video processor 50 is a bit map of what is displayed on the TV display 42. The video processor 50 is connected to the video mixer 40. The video mixer 40 outputs the information as an overlay on the television program currently being viewed, although it will be understood by those skilled in the art that the information from the video mixer 40 could be presented to the TV display 42 as a window in the television program or as a full screen display instead of the television program.

Using the viewer input device 46 in conjunction with the information presented to the TV display, the viewer programs the V-Chip Plus+ system to exclude programs according to one or more rating factors. Preferably, the viewer input device 46 allows manipulation of the V-Chip Plus+ rating system and the V-Chip Plus+ override lists by moving a cursor on the TV display 42 and inputting discrete commands. Cursor control is achieved by coupling the microprocessor 44 to the video processor 50 through to a cursor position register 52.

Viewer edits to the V-Chip Plus+ override lists presented to the TV display 42 are preferably accomplished using compressed codes such as those described in U.S. Pat. No. 5,335,079. A G-code decoder 54 is employed to process the compressed codes. If the microprocessor 44 determines that a G-code has been received from the viewer input device 46, then the G-code will be sent to the G-code decoder 54 for decoding. The G-code decoder 54 converts the G-code into channel, date, time and length ("CDTL") information which is used by the microprocessor 44 to override the V-Chip Plus+ rating system for individually selected television programs.

Preferably, the V-Chip Plus+ system is integrated with Gemstar Development Corporation's VCRPlus+® system so that the CDTL information can be selectively used not only to create the V-Chip Plus+ override lists, but to activate a video cassette recorder ("VCR") 55 to record a selected television program corresponding to the CDTL information stored in RAM 48 as described in detail in U.S. Pat. No. 5,335,079 which is hereby incorporated by reference as if set forth in full herein. The CDTL information is stored in RAM 48 in a stack arrangement as described in U.S. Pat. No. 5,382,983.

The V-Chip Plus+ system is implemented by decoding the VBI of a television signal. A VBI decoder 56 connected to the output of the television drive circuitry 36 extracts the XDS signal from the baseband television signal. The output of the VBI decoder 56, which includes one or more rating factors for the television program currently broadcast, is coupled to the microprocessor 44. These rating factors extracted from the VBI of the television signal are compared with the viewer programmed rating factors in RAM 48 by the microprocessor 44. In the event that the microprocessor 44 determines that the television program currently broadcast should be blocked based on the programmed rating factors, the enable override list stored in RAM 48 is consulted. The microprocessor 44 will actuate the blocking circuit 38 to block the currently broadcast television program from the TV display 42 if the television program is not contained in the enable override list. Conversely, if the television program currently broadcast should be televised based on the programmed rating factors stored in RAM 48, the blocking override list stored in RAM 48 is consulted. The blocking circuit 38, under microprocessor 44 control, allows the television program to pass to the TV display 42 if the television program is not contained in the blocking override list. The V-Chip Plus+ override lists are consulted by the microprocessor 44 by comparing the CDTL information stored in RAM 48 with the tuner channel set by microprocessor 44 and an internal clock (not shown) in the microprocessor. Alternatively, the channel information can be striped from the XDS data by the VBI decoder 56, if available there.

In order for the compressed codes to be useful in compiling the V-Chip Plus+ override lists, the microprocessor 44 must be able to determine the channel on which the television program corresponding to the compressed code is transmitted on. Because the channel allocations vary depending on the particular television service (i.e., satellite transmission, cable service, over-the-air broadcasts) used by the viewer and the specific geographic area of service, a method of establishing a channel map is required. Such a method is described in co-pending U.S. application Ser. No. 08/694,864, which is hereby incorporated by reference as if set forth in full herein. A channel map relates the television stations (i.e., KABC, KCET) to their respective channel frequency allocations for any particular television service.

Briefly, the particular type of television service is automatically detected in an embodiment of the present invention by monitoring the channel allocations of the television stations. This accomplished by sweeping the TV tuner 34 across its RF band with the microprocessor 44. A detector 57, coupled to the TV tuner 34, detects whether a television station has been allocated to each of the channels as the TV tuner 34 is swept across the RF band by monitoring the stability of the horizontal sync pulses. The microprocessor 44 can then determine the type of television service based on the channel allocation for a given geographic area. This scheme requires only that the viewer key in his or her zip code using the viewer input device 46. Alternatively, the automatic detection of the particular television service used by the viewer can be eliminated in favor of having the viewer key in directly the information pertaining to the model and brand of the VCR and cable box using the viewer input device 46.

Once the particular type of television service used by the viewer is ascertained, the appropriate channel map can be extracted by the VBI decoder 56 from the television signal based on the geographic location of the viewer. The microprocessor 44 again sweeps the TV tuner 34 to locate a channel having channel map information transmitted in the VBI portion of the television signal. The microprocessor 44 then extracts the channel map marked with an identification code corresponding to the geographic, location entered by the viewer and stores the extracted channel map in channel map memory 58.

The described embodiment of the V-Chip Plus+ system illustrated in FIG. 4 is directed to a fully integrated system utilizing a single microprocessor. However, those skilled in the art will readily appreciate that numerous applications may arise where it would be desirable to retrofit the V-Chip Plus+ system into a television receiver with an existing V-Chip system. As a result of Congressional endorsement of the V-Chip system, it is envisioned that many television manufacturers will develop a V-Chip IC ("IC") for user programming according to a standardized rating system, and include the V-Chip capability as a standard feature. In these systems, it would be advantageous to incorporate a V-Chip Plus+ upgrade into a single IC which could be easily integrated into an existing V-Chip system. An exemplary embodiment of such a V-Chip Plus+ system is shown in FIG. 5.

Figure 5:
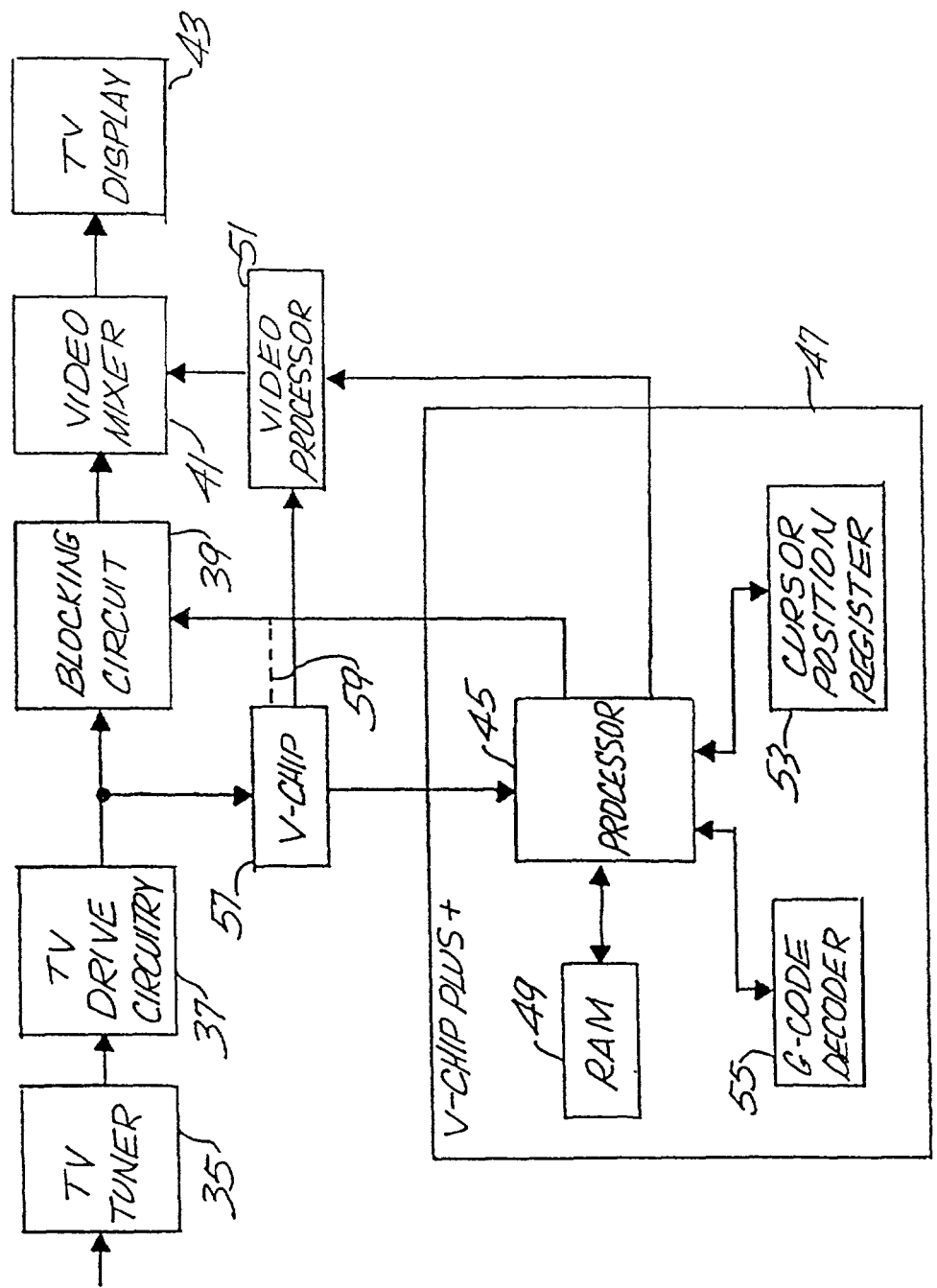
FIG. 5 is an electrical block diagram of a parental control apparatus in combination with VCR Plus+ integrated circuit retrofitted into an existing V-Chip system.

Referring to FIG. 5, the V-Chip system includes the basic television processing and drive circuitry described with reference to FIG. 4. Specifically, a TV tuner 35 is positioned at the front end of the television receiver for passing a selected channel of a multichannel RF television signal to television drive circuitry 37. The output of the television drive circuitry 37 is connected to a blocking circuit 39. The output of the blocking circuit 39 is connected to a TV display through a video mixer 41 for selectively displaying the television program currently being broadcast on the selected channel.

A V-Chip 57, connected to the output of the television drive circuitry 37, extracts the XDS signal from the baseband television signal. The rating factors for the television program currently broadcast are stripped from the XDS data and are compared with the viewer programmed rating factors stored in internal memory of the V-Chip 57. In the event that the V-Chip 57 determines that the television program currently broadcast should be blocked based on the programmed rating factors, the blocking circuit 37 is actuated by the V-Chip 57 to block the currently broadcast television program from the TV display 43. Conversely, if the television program currently broadcast should be televised based on the programmed rating factors stored in memory, the blocking circuit 39 is deactivated by the V-Chip 57 and the television program is allowed to pass to the TV display 43.

The V-Chip system provides viewer's editing of the rating factors by using an Editor. Specifically, when the viewer wishes to review the particular ratings set in the V-Chip system, the V-Chip 57, under control of the viewer input device, retrieves the appropriate information from memory and couples it to the video processor 51, where the information is formatted for display. The video processor 51 is connected to the video mixer 41. The video mixer 41 outputs the information as an overlay on the television program currently being viewed, although it will be understood by those skilled in the art that the information from the video mixer 41 could be presented to the TV display 43 as a window in the television program or as a full screen display instead of the television program. Using the viewer input device in conjunction with the information presented to the TV display 43, the viewer programs the V-Chip system to exclude programs according to one or more rating factors.

Customization of the blocking function of the V-Chip 57 is achieved with an external V-Chip Plus+ IC 47. The implementation of the V-Chip Plus+ circuitry into an IC is an economical approach, however, it will be understood by those skilled in the art that the V-Chip Plus+ function could be implemented using discrete components. Preferably, the V-Chip Plus+ IC 47 is designed for easy retrofit into an existing television receiver with V-Chip capability already installed. The V-Chip Plus+ IC 47 is inserted in line between the V-Chip 57 and the blocking circuit 39. This requires disconnecting the V-Chip 57 from the blocking by removing wire 59.

In operation, when the V-Chip 57 determines that the television program currently broadcast should be blocked based on the programmed rating factors, the blocking signal is coupled to the V-Chip Plus+ IC 47. In response to the blocking signal, the microprocessor 45 in the V-Chip Plus+ IC 47 consults an enable override list stored in RAM 49. The microprocessor 45 will actuate the blocking circuit 39 to block the currently broadcast television program from the TV display 43 if the television program is not contained in the enable override list. Conversely, if the V-Chip 57 determines that the television program currently broadcast should be televised based on the programmed rating factors, the unblocking signal is coupled to the V-Chip Plus+ IC 47. In response to the unblocking signal, a blocking override list stored in RAM 49 is consulted. The blocking circuit 39, under microprocessor 45 control, allows the television program to pass to the TV display 43 if the television program is not contained in the blocking override list.

The V-Chip Plus+ IC 47 is also connected to the video processor 51 for viewer edits to the V-Chip Plus+ override lists. In this configuration, the viewer can program the V-Chip system to exclude programs according to one or more rating factors, as well as compiling or modifying the V-Chip Plus+ override lists. When the viewer wishes to review or edit the V-Chip Plus+ override lists, the microprocessor 45 retrieves the appropriate information from RAM 49 and couples it to the video processor 51, where the information is formatted for display. The video processor 51 outputs the information, via the video mixer 41, preferably as an overlay on the television program currently being viewed. Edits to the V-Chip Plus+ override lists are accomplished using, by way of example, compressed codes. A G-code decoder 55 is employed to process the compressed codes in the same manner as described above with reference to the embodiment illustrated in FIG. 4.

Figure 6:
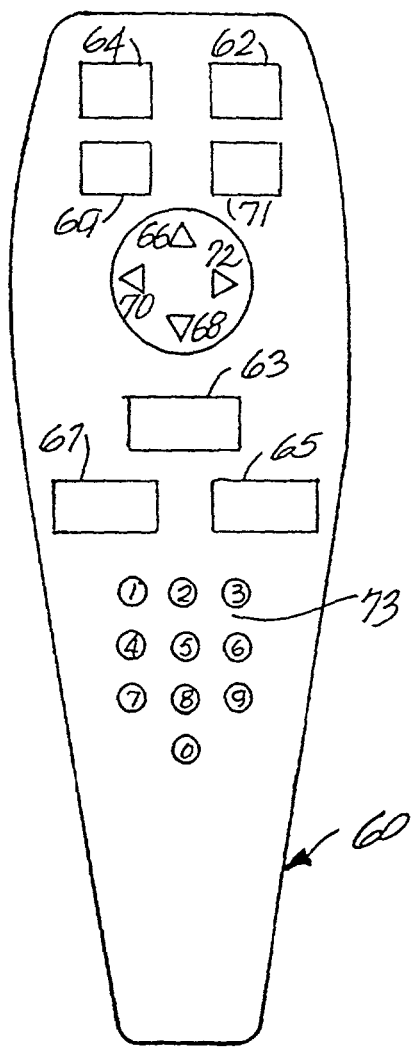
FIG. 6 is a top plan view of a remote controller for operating the system of FIG. 4 in accordance with a preferred embodiment of the present invention.

The viewer input device 46 preferably takes the form of a hand-held remote IR transmitter which communicates with an IR receiver connected to the microprocessor 44. As shown in FIG. 6, the IR transmitter has a housing 60 on which a number of control keys are mounted. A CHANNEL SURF key 62, a V-CHIP PLUS+ key 64, a REVIEW key 69, a BABYSITTER key 71, a MENU key 63, an ENTER key 65, and a CHANGE key 67 are all provided on the housing 60. Located below the REVIEW key 69 and the BABYSITTER key 71 are up, down, left and right arrow keys 66, 68, 70 and 72, respectively. A numerical keypad 73 is positioned below the ENTER key 65 and CHANGE key 67. The blocking and unblocking functions are set and selected in two different modes, a TV mode and a GUIDE mode.

TV Mode

Preferably, the user interface is fully menu driven. On-screen option are presented to the TV display for programming the V-Chip Plus+ system, and editing the V-Chip Plus+ override lists. In a TV mode, these on-screen options can be accessed from the normal television picture viewing mode by selecting either the CHANNEL SURF key 62, the V-CHIP PLUS+ key 64, or the MENU key 63 on the viewer input device.

Upon activation of the CHANNEL SURF key, a channel selection list 74 is retrieved by the microprocessor from the channel map memory and presented to the TV display by the video processor as an overlay on the television picture via the video mixer as shown in FIG. 7. This display format is called the Channel Surf Menu. The channel selection list 74 consists of a column for television station names or call letters 76, and a corresponding column identifying the allocated channel for each television station 78, with the channel currently tuned by the TV tuner highlighted by a first cursor 80. In this mode, the viewer can tune any channel on the channel selection list 74 by moving the first cursor 80 vertically with the up and down arrow keys on the viewer input device. As the first cursor 80 moves from one channel to another, the microprocessor causes the TV tuner to tune the highlighted channel for display on the TV display. The viewer may exit the Channel Surf Menu at any time and return to the normal television picture viewing mode by depressing the CHANNEL SURF key on the viewer input device.

Preferably, the microprocessor has individual channel block capability. That is, selected channels can be blocked in their entirety regardless of the rating factors established by the viewer in the V-Chip Plus+ system or the override lists created by the viewer in the V-Chip Plus+ system. Channel block indication is shown in the channel selection list 74 of the Channel Surf Menu by replacing the channel allocation for the blocked television station with an "X". In FIG. 7, both FOX and KMEX have been blocked.

Three sub-menus can be accessed from the Channel Surf Menu by depressing the right arrow key on the viewer input device from any highlighted channel. In response, three on-screen sub-menu prompts are presented to the TV display as shown in FIG. 8. These on-screen sub-menu prompts are displayed horizontally next to the highlighted channel, and may be accessed by moving a second cursor 82 with the right and left arrow keys on the viewer input device. A description of the on-screen sub-menu prompt selected by the viewer with the second cursor 82 is displayed immediately below. The viewer may remove the on-screen sub-menu prompts from the Channel Surf Menu at any time by depressing the CHANNEL SURF key on the viewer input device.

In FIG. 8, KABC is highlighted by the first cursor 80, and an icon which allows the viewer to toggle KABC between a channel block mode and a channel unblock mode is highlighted by the second cursor 82. A message, "Block this channel," describing the operation of the icon is displayed below the on-screen sub-menu prompts. With this set up, KABC can be blocked with a single touch of the ENTER key on the viewer input device. The channel block command from the viewer input device is stored in RAM by the microprocessor for controlling the blocking circuit when the viewer subsequently attempts to tune KABC on the television receiver. The microprocessor then causes the video processor to overlay, via the video mixer, the Channel Surf Menu shown in FIG. 9 on the television picture. The replacement of the channel allocation "7" for KABC with an "X" confirms that the command for blocking this channel has successfully been loaded into RAM. The on-screen sub-menu icon prompt has also been changed to indicate that KABC may be unblocked, as indicated by the message below the on-screen sub-menu prompts, again with a single stroke of the ENTER key on the viewer input device.

The V-Chip Plus+ override lists can be accessed by the viewer from the Channel Surf Menu by highlighting the "Review" on-screen sub-menu prompt with the second cursor 82 as shown in FIG. 10. The message below the on-screen sub-menu prompts reads "VCR/V-Chip Plus+ Review List." In a preferred embodiment, the enable override list and the blocking override list are combined into a single list on the VCR/V-Chip Plus+ Review List. Preferably, the VCR/V-Chip Plus+ Review List also allows viewer editing of the television programs selected for VCR Plus+ applications, a system developed by Gemstar Development Corporation which allows a timer preprogramming feature on a VCR to be programmed using compressed codes.

By depressing the ENTER key on the viewer input device while the "Review" on-screen sub-menu prompt is highlighted by the second cursor 82, the microprocessor retrieves the designated television programs for the VCR Plus+ system and the V-Chip Plus+ override feature from memory and causes the video processor to overlay a VCR/V-Chip Plus+ Review List onto the normal television picture on the TV display, via the video mixer, as shown in FIG. 11. It will be appreciated by those skilled in the art that VCR/V-Chip Plus+ Review List can be divided into two separate screens, one for the VCR Plus+ system and the other for the V-Chip Plus+ override list, and accessed by providing separate keys on the viewer input device.

The VCR/V-Chip Plus+ Review List shown in FIG. 11 comprises a list of television programs designated under either the VCR Plus+ system or the V-Chip Plus+ override feature. Each television program is displayed on the VCR/V-Chip Plus+ Review List by its respective CDTL information. It will be appreciated by those skilled in the art that the titles of the television programs could be alternately, or additionally displayed with the CDTL information by accessing an EPG data base in memory with the microprocessor as described in co-pending U.S. application Ser. No. 08/744,399, the contents of which is hereby incorporated by reference as if set forth in full herein.

To the left of each television program defined by the CDTL information is an icon indicating the function to be performed by the microprocessor. By way of example, the icon 84 to the left of the television program beginning on Saturday, January 10, at 11:15 P.M. on channel 7 indicates that this television program is to be recorded by the VCR under control of the VCR Plus+ program in the microprocessor. The icon 86 to the left of the television program beginning Wednesday, January 21, at 2:00 P.M. on channel 35 indicates that the television receiver will be automatically turned on and tuned to this television program under the VCR Plus+ program in the microprocessor. The icon 88 to the left of the television program televised weekly on Saturdays at 11:00 A.M. on channel 28 indicates that the television program is to be blocked by the blocking circuit even though the rating factors embedded in the VBI portion of the television signal meet the rating criteria established by the viewer in the V-Chip Plus+ system. The icon 90 to the left on the television program beginning Sunday, January 18, at 10:00 P.M. on channel 2 indicates that the television program will be shown despite having rating factors embedded in the VBI of the television signal that would otherwise cause the television program to be blocked by the V-Chip Plus+ system.

The lower portion of the VCR/V-Chip Plus+ Review List 92 contains instructions to assist the viewer in editing the television programs with the viewer input device. Arrow indicators 94, with accompanying text "MOVE," inform the viewer that the individual television programs can be selected by vertically moving the cursor 96 with the up and down arrow keys on the viewer input device. Once the desired television program is selected by the viewer, the viewer can then either delete the television program from the VCR/V-Chip Plus+ Review List, or alter the length of the designated function indicated by the icon to the left of the television program. As indicated in the lower portion of the VCR/V-Chip Plus+ Review List 92, the selected television program highlighted by the cursor 96 can be deleted by depressing the ENTER key on the viewer input device. Alternatively, the length of the designated function programmed in the VCR/V-Chip Plus+ system can be altered by first depressing the CHANGE key on the viewer input device, and then incrementing or decrementing the length with the right and left arrow keys, respectively, on the viewer input device. The viewer may exit the VCR/V-Chip Plus+ Review List and return to the Channel Surf Menu of FIG. 34 at any time by depressing the V-CHIP PLUS+ key on the viewer input device.

Figure 13:
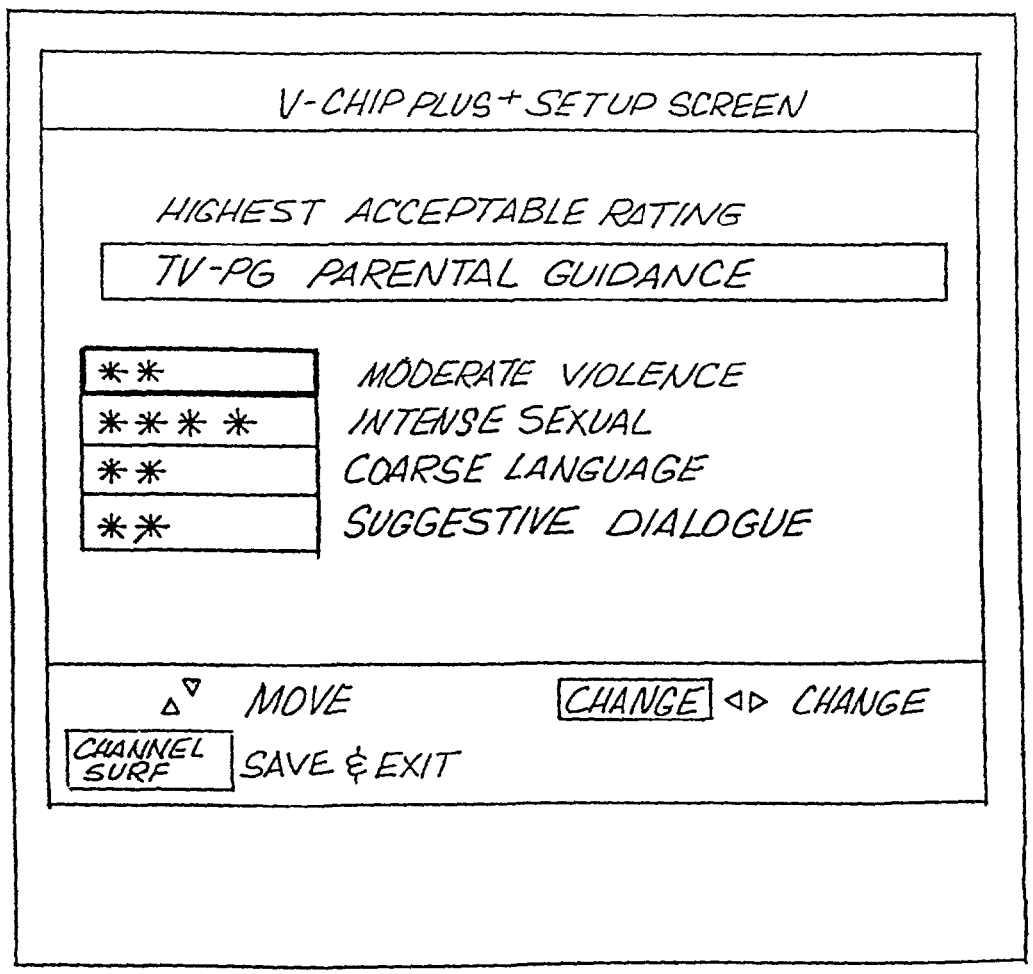
FIG. 13 is a television screen displaying a V-Chip Plus+ Setup Screen formatted in accordance with a TV mode of the present invention.

From the Channel Surf Menu of FIG. 10, the viewer can access the V-Chip Plus+ Setup Screen by highlighting the "V-Chip Plus+" on-screen sub-menu prompt with the second cursor 82 as shown in FIG. 12. A message "Go to V-Chip Plus+ Setup Screen" is displayed immediately below the on-screen prompts. By depressing the ENTER key on the viewer input device while the "V-Chip Plus+" on-screen sub-menu prompt is highlighted by the second cursor 82, the microprocessor retrieves the V-Chip Plus+ rating factors from memory and causes the video processor to overlay the V-Chip Plus+ Setup Screen onto the normal television picture on the TV display, via the video mixer, as shown in FIG. 13.

Figure 14:
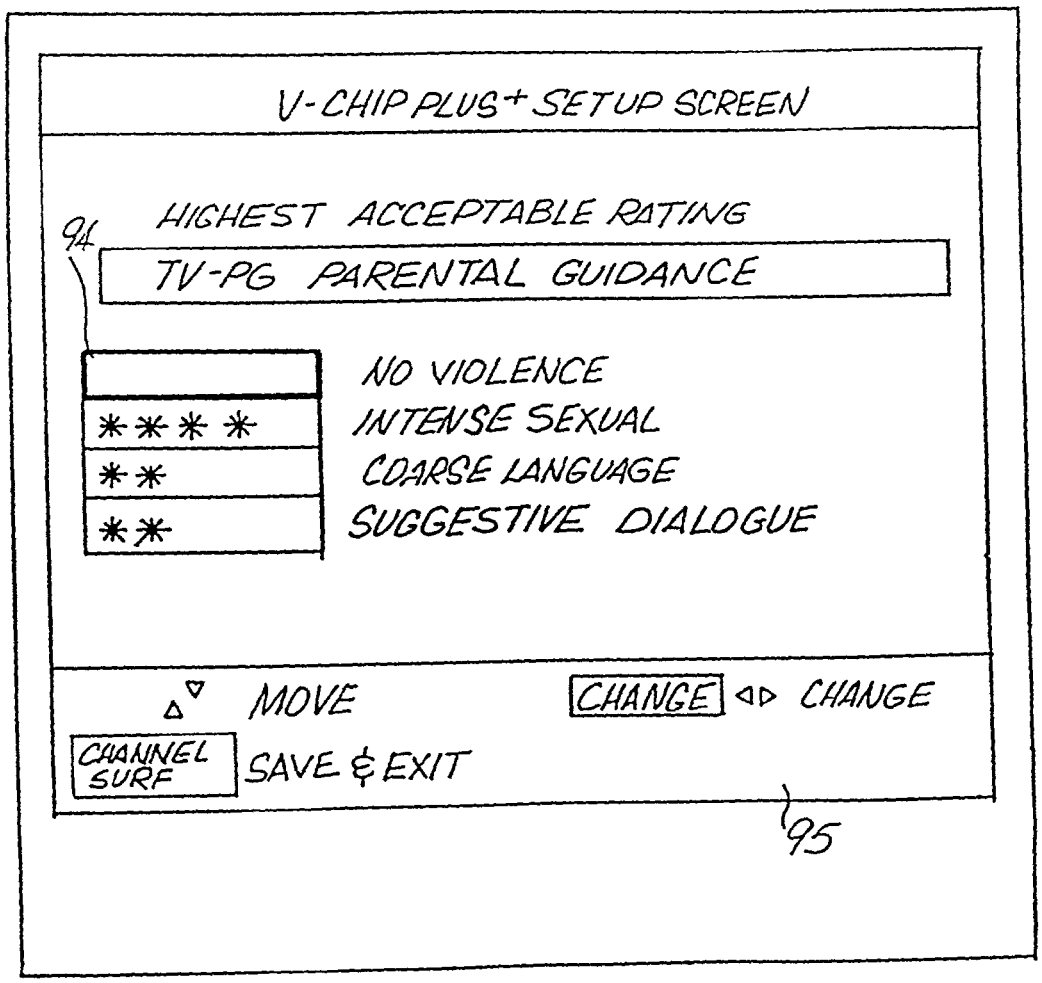
FIG. 14 is a television screen displaying a V-Chip Plus+ Setup Screen formatted in accordance with a TV mode of the present invention.

The V-Chip Plus+ Setup Screen indicates the V-Chip Plus+ system rating set by the viewer under the heading "Highest Acceptable Rating." In FIG. 13, the current V-Chip Plus+ system rating programmed into RAM is "TV-PG Parental Guidance." The individual default rating factors (i.e., violent content, sexual content, language, dialogue) for "TV-PG Parental Guidance" are listed below. In a preferred embodiment, independent control of the default rating factors by the viewer is provided. For example, the default rating factors for the V-Chip Plus+ system rating "TV-PG Parental Guidance" are moderate violence, intense sexual content, coarse language, and suggestive dialogue. However, the viewer may desire to limit viewing access to "TV-PG Parental Guidance" television programs with no violent content. In this case, the viewer would move the cursor 94 vertically using the up and down arrow keys on the viewer input device from the V-Chip Plus+ system rating to the violent content indicator immediately to the left of the descriptive text "Moderate Violence." The violent content of television programs accessible to the viewer can now be altered by first depressing the CHANGE key on the viewer input device to enable a change in the rating factor, and then using the left and right arrow keys to adjust the violent content of television programming to the desired level. As shown in FIG. 14, the viewer has successfully limited viewing of television programs to "TV-PG Parental Guidance" without any violent content.

Figure 15:
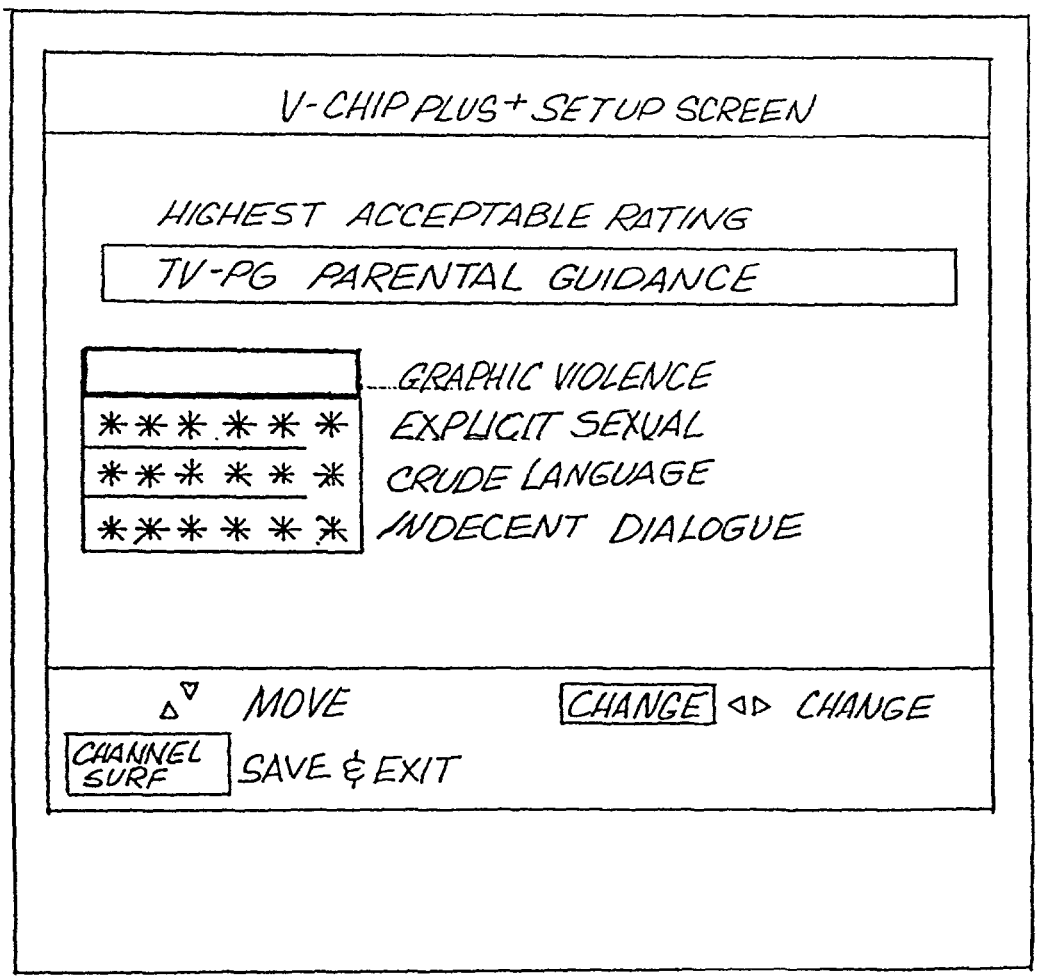
FIG. 15 is a television screen displaying a V-Chip Plus+ Setup Screen formatted in accordance with a TV mode of the present invention.

Alternatively, the entire V-Chip Plus+ system rating programmed in RAM can be altered by the viewer. This function is performed by positioning the cursor 94 on the V-Chip Plus+ system rating indicator "TV-PG Parental Guidance" by depressing the up and down arrow keys on the viewer input device. Next, the CHANGE key on the viewer input device is depressed to enable a change in the V-Chip Plus+ system rating. Then the desired V-Chip Plus+ rating can be adjusted using the left and right arrow keys on the viewer input device. These operational steps are illustrated at the bottom of the V-Chip Plus+ Setup Screen 95 to facilitate viewer editing. As shown in FIG. 15, the V-Chip Plus+ system rating programmed in RAM, via the microprocessor, has been changed to "TV-MA Mature Audience Only." The default rating factors stored in RAM allow viewing of television programs containing graphic violence, explicit sexual content, crude language and indecent dialogue. These rating factors are compared against corresponding factors transmitted in the VBI portion of the television program currently being broadcast.

In a preferred embodiment, other V-Chip Plus+ system ratings include "TV-P14 Parents Cautioned ! ! !" for television programming with moderate violence, intense sexual content, crude language and very suggestive dialogue; "TV-G General Audience" for television programming with no violence, no sexual content, no strong language and no sexual dialogue; "TV-Y7 Older Children" for television programming with no violence, no sexual content, no strong language and no sexual dialogue; and "TV-Y All Children" for television programming with no violence, no sexual content, descent language and descent dialogue. The individual rating factors for each of these V-Chip Plus+ system ratings can be independently controlled in the manner described above. It will be appreciated by those skilled in the art that other V-Chip Plus+ system ratings could be used and the individual rating factors could be different from the described embodiment depending upon the needs of the manufacturer or consumer.

The viewer may exit the V-Chip Plus+ Setup Screen and return to the Channel Surf Menu of FIG. 12 at any time by depressing the CHANNEL SURF key on the viewer input device. From the Channel Surf Menu, normal viewing of the television picture can be selected by the viewer by depressing the CHANNEL SURF key on the viewer input device a second time.

Figure 16:
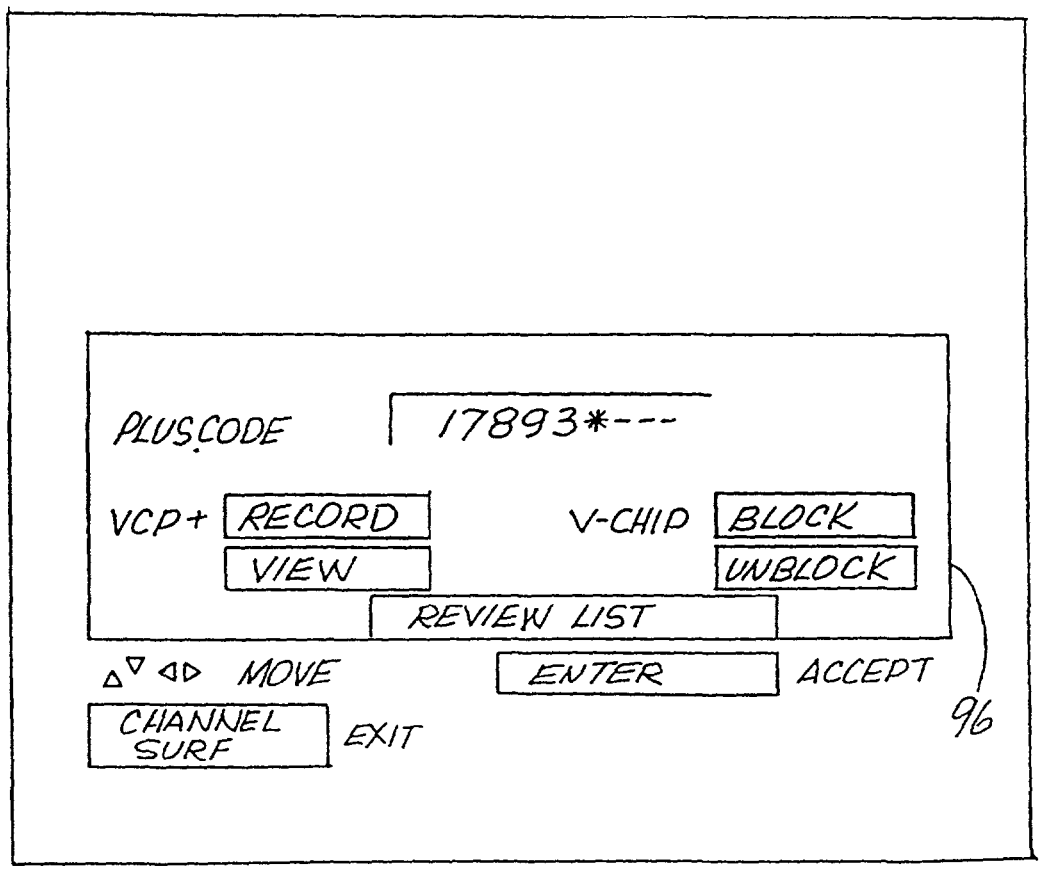
FIG. 16 is a television screen displaying a VCR/V-Chip Plus+ Main Screen formatted in accordance with a TV mode of the present invention.

From the normal picture viewing mode, the VCR/V-Chip Plus+ Main Screen can be accessed by selecting the V-CHIP PLUS+ key on the viewer input device. This causes the video processor, under microprocessor control, to overlay the VCR/V-Chip Plus+ Main Screen, via the video mixer, onto the television picture on the TV display as shown in FIG. 16. The viewer can program the VCR Plus+ system and the V-Chip Plus+ system from the VCR/V-Chip Plus+ Main Screen.

The format of the VCR/V-Chip Plus+ Main Screen includes an upper portion for viewer entry of compressed codes, such as PlusCode™ numbers used by Gemstar Development Corporation's VCRPlus+® systems that presently appear in published television schedules. Specifically, the viewer highlights the top portion of the VCR/V-Chip Plus+ Main Screen immediately to the right of the text "PLUSCODE" with a cursor 96 and enters the compressed code that appears with the program listed in the published television schedule by using the numerical keypad on the viewer input device. Once the compressed code is entered by the viewer, the cursor 96 is then moved to the desired feature listed below the compressed code entry by using the arrow keys on the viewer input device. Preferably, the left half of the VCR/V-Chip Plus+ Main Screen is dedicated to the VCR Plus+ functions, and the right half of the VCR/V-Chip Plus+ Main Screen is dedicated to the V-Chip Plus+ functions. The VCR Plus+ functions include a RECORD option for programming the VCR to automatically record a television program, and a VIEW option for automatically turning on the television receiver and tuning the selected television program when aired. The V-Chip Plus+ functions include a BLOCK option for creating the blocking override list, and an UNBLOCK option for creating the enable override list.

Figure 17:
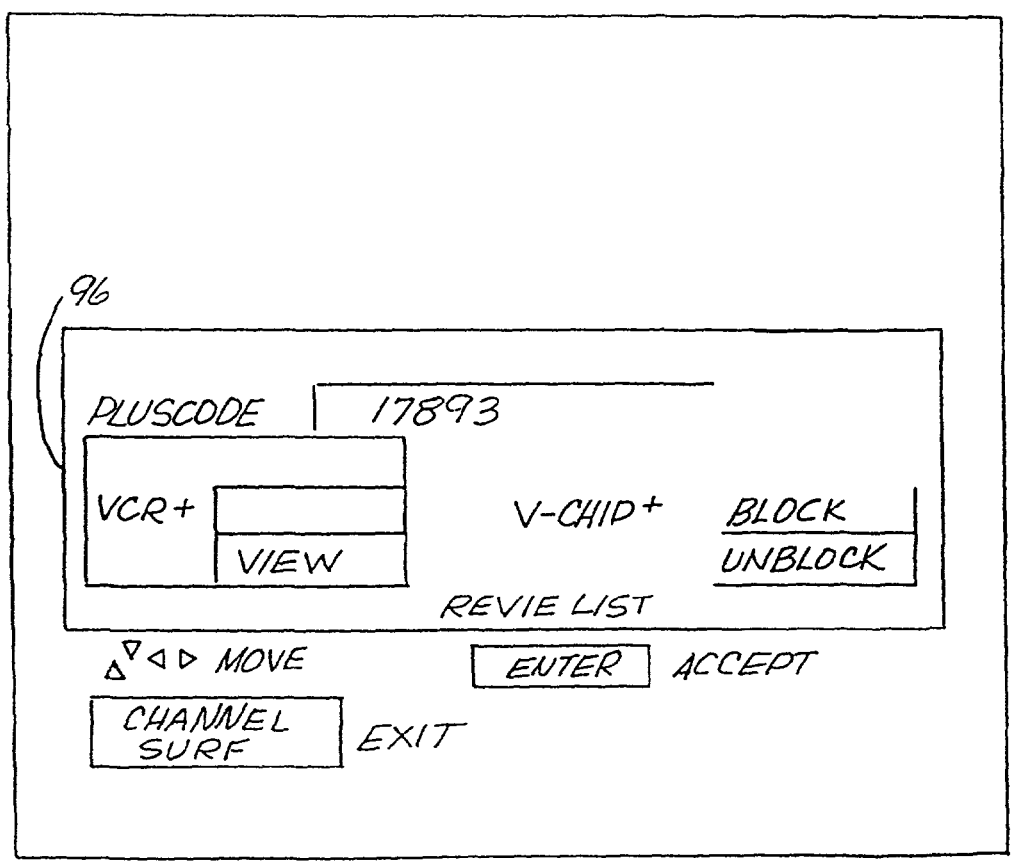
FIG. 17 is a television screen displaying a VCR/V-Chip Plus+ Main Screen formatted in accordance with a TV mode of the present invention.
Figure 18:
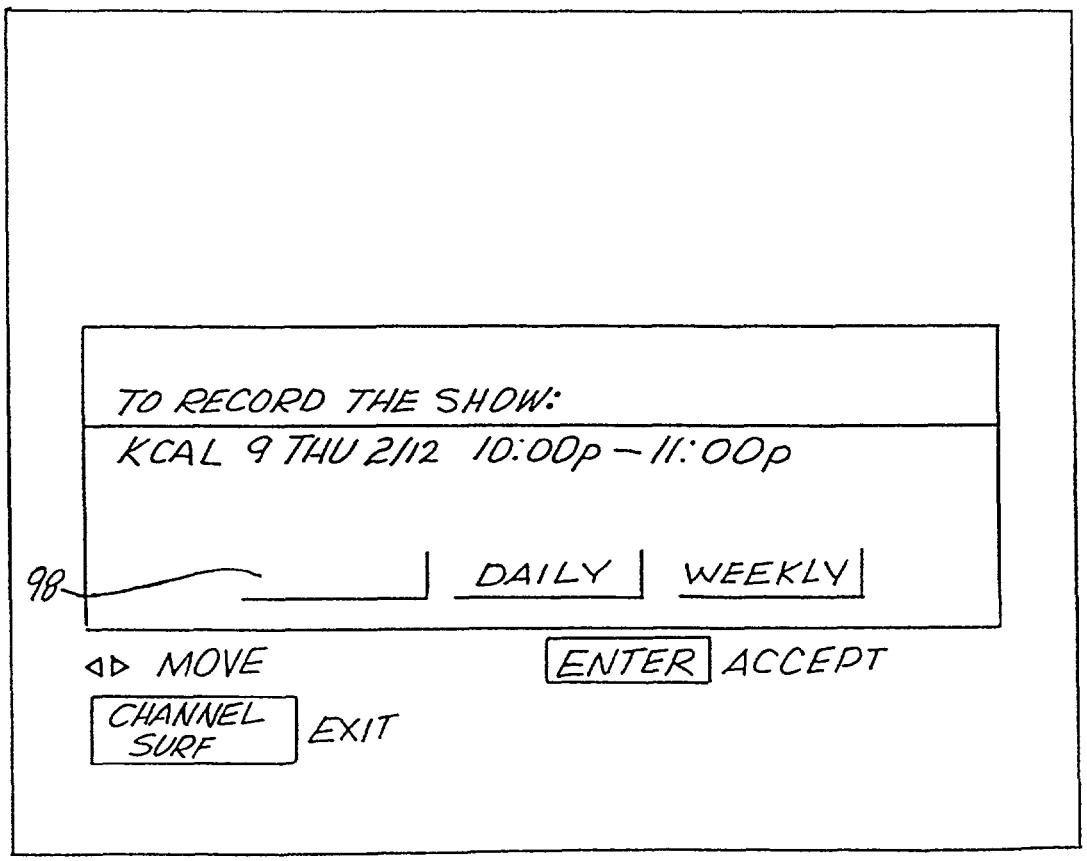
FIG. 18 is a television screen displaying a Confirmation Screen formatted in accordance with a TV mode of the present invention.

Once the viewer selects the desired option, the ENTER key on the viewer input device is then depressed causing the CDTL information of the television program corresponding to the compressed code entered by the viewer to be loaded in RAM by the microprocessor and designated for the viewer selected option. For example, referring to FIG. 17, by depressing the ENTER key on the viewer input device with the RECORD option highlighted by the cursor 96, the VCR will automatically record the television program corresponding to the compressed code "17893." A Confirmation Screen, as shown in FIG. 18, will be presented to the TV display by the video processor as an overlay on the normal television picture, via the video mixer, when the ENTER key on the viewer input device is depressed. The viewer will then have the option of recording the selected television program once, daily or weekly by highlighting the appropriate selection with a cursor 98 and depressing the ENTER key on the viewer input device. Once the frequency of recordation is selected from the Confirmation Screen, the user can return to the VCR/V-Chip Plus+ Main Screen by selecting V-CHIP PLUS+ key on the viewer input device.

The CDTL information entered from the VCR/V-Chip Plus+ Main Screen is formatted in RAM for display on the VCR/V-Chip Plus+ Review List when accessed as a sub-menu from the Channel Surf Menu (FIG. 10). In addition, the VCR/V-Chip Plus+ Review List can be accessed directly from the VCR/V-Chip Plus+ Main Screen by highlighting the "Review List" option with the cursor 96 and depressing the ENTER key on the viewer input device. The VCR/V-Chip Plus+ Review List, which is presented to the TV display by the video processor as an overlay on the normal television picture, via the video mixer, is edited in the same manner as described with reference to FIG. 11. When the VCR/V-Chip Plus+ Review List is entered from the VCR/V-Chip Plus+ Main Screen, the viewer must depress the V-CHIP PLUS+ key on the viewer input device to exit and return to the VCR/V-Chip Plus+ Main Screen. The V-CHIP PLUS+ key on the viewer input device is depressed a second time to exit the VCR/V-Chip Plus+ Main Screen and return to the normal television picture viewing mode.

Figure 19:
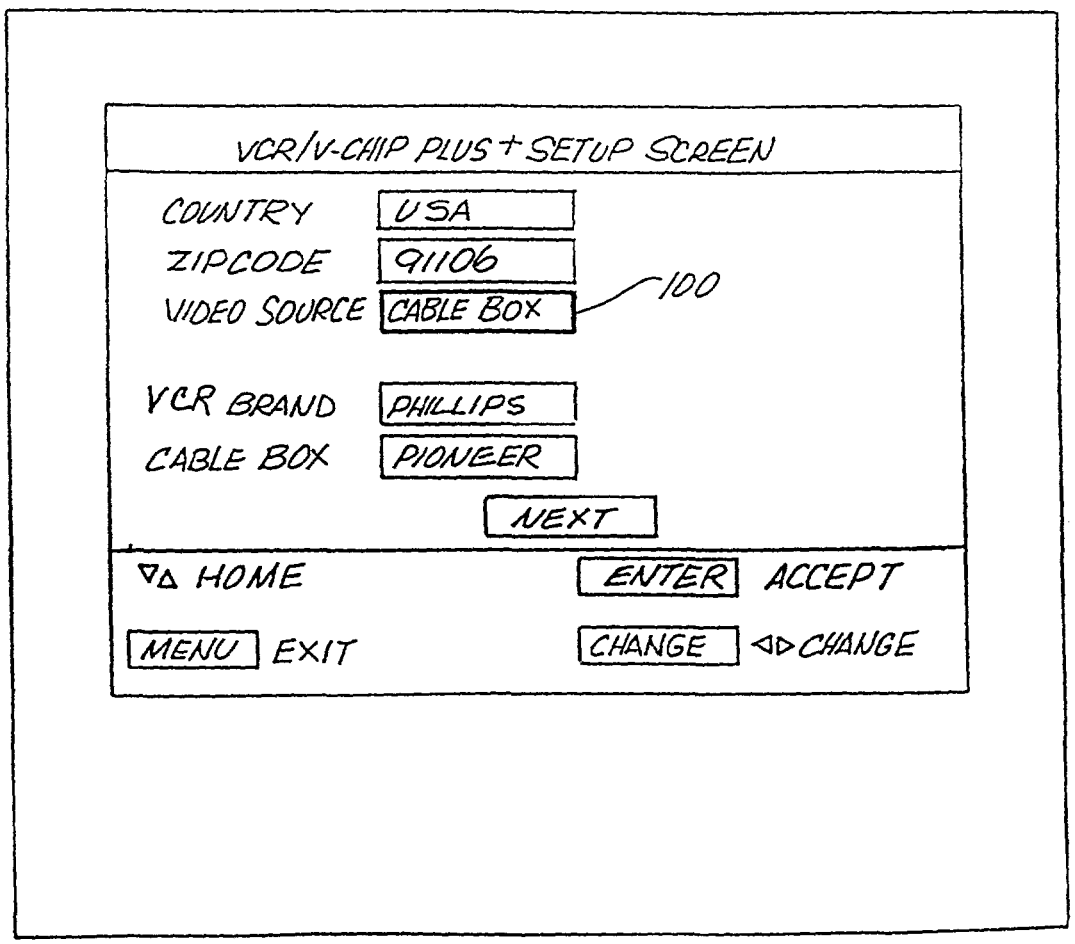
FIG. 19 is a television screen displaying a VCR/V-Chip Plus+ Setup Screen formatted in accordance with a TV mode of the present invention.

From the normal television picture viewing mode, the TV Menu (not shown) may be accessed by the viewer by depressing the MENU key on the viewer input device. The TV menu allows the viewer to perform certain functions such as activating channels, activating closed caption television and adjusting picture clarity (i.e., contrast, brightness, color). In addition, the VCR/V-Chip Setup Screen, as shown in FIG. 19, may be accessed from the TV Menu.

The VCR/V-Chip Plus+ Setup Screen permits the viewer to define certain parameters which allow automated channel mapping according to the television signal source and the geographic location of the viewer. In the preferred embodiments without television signal source detection (i.e., monitoring the channel allocations of the television stations) the video source, the VCR brand and the cable box brand used by the viewer are entered directly into the VCR/V-Chip Plus+ Setup Screen with the viewer input device. From the VCR/V-Chip Plus+ Setup Screen shown in FIG. 18, the viewer, residing in the United States at zip code 91106, utilizes a Pioneer cable box with a Phillips VCR. From the zip code information, the appropriate channel map can be downloaded by the microprocessor from the VBI of the television signal to RAM as described in co-pending U.S. application Ser. No. 08/694, 864, which is hereby incorporated by reference as if set forth in full herein. From the other information the proper IR codes for operating the VCR and cable box are selected.

Figure 20:
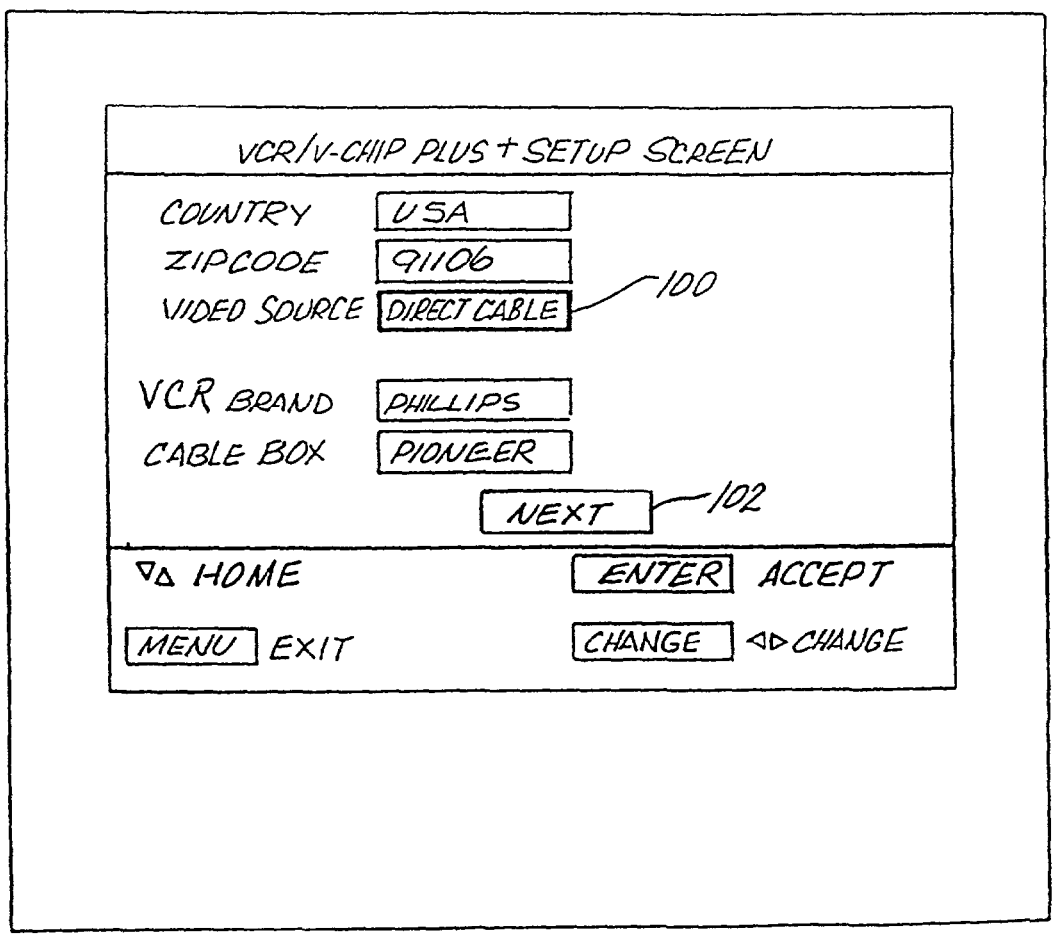
FIG. 20 is a television screen displaying a VCR/V-Chip Plus+ Setup Screen formatted in accordance with a TV mode of the present invention.

The information on the VCR/V-Chip Plus+ Setup Screen can be edited by the viewer by moving a cursor 100 vertically between the on-screen prompts with the up and down arrow keys on the viewer input device. For example, in the event that the viewer switches from cable box service to direct cable, a new channel map may be required for VCR/V-Chip Plus+ operation. The new channel map can be downloaded into RAM with minimal viewer effort by accessing the VCR/V-Chip Plus+ Setup Screen, highlighting the text "Cable Box" immediately to the right of the "Video Source" prompt with the cursor 100, depressing the CHANGE key on the viewer input device to enable a change in the video source, and then depressing the left and right arrow keys on the viewer input device to select the appropriate video source. In this case, the viewer will operate the arrow keys on the viewer input device until the text "Cable Direct" appears on the VCR/V-Chip Plus+ Setup Screen next to the "Video Source" prompt. With this entry, the "Cable Box" prompt is removed from the VCR/V-Chip Plus+ Setup Screen as shown in FIG. 20.

The VCR/V-Chip Plus+ Setup Screen also includes a "Next" on-screen prompt 102. If a cable box service is entered into the VCR-V-Chip Plus+ Setup Screen by the viewer, or automatically detected by the microprocessor, the proper cable box codes must be set to operate the cable box. This is accomplished by positioning the cursor 100 on the "Next" on-screen prompt 102 with the up and down arrow keys on the viewer input device, and then depressing ENTER. This sequence causes the microprocessor to retrieve IR codes compatible with the cable box from memory and store them in RAM. This step is necessary to give the microprocessor control over the tuner in the cable box for VCR/V-Chip Plus+ system operation.

Those skilled in the art will readily recognize that the user interface described above is merely an exemplary embodiment of the present invention and that numerous other user interfaces may be utilized within the scope of the present invention. By way of example, an alternative embodiment of the user interface will be described with reference to a user interface screen map shown in FIG. 21. In this alternative embodiment, the viewer may enter the either a "V-Chip Plus+ Features" screen 106 or a "Channel Surf" screen 108 from the normal television viewing mode 104.

The viewer may exit the VCR/V-Chip Setup Screen and enter the TV Menu at any time by depressing the MENU key on the viewer input device. The normal picture viewing mode can then be accessed from the TV Menu by depressing the MENU key on the viewer input device a second time.

Figure 22:
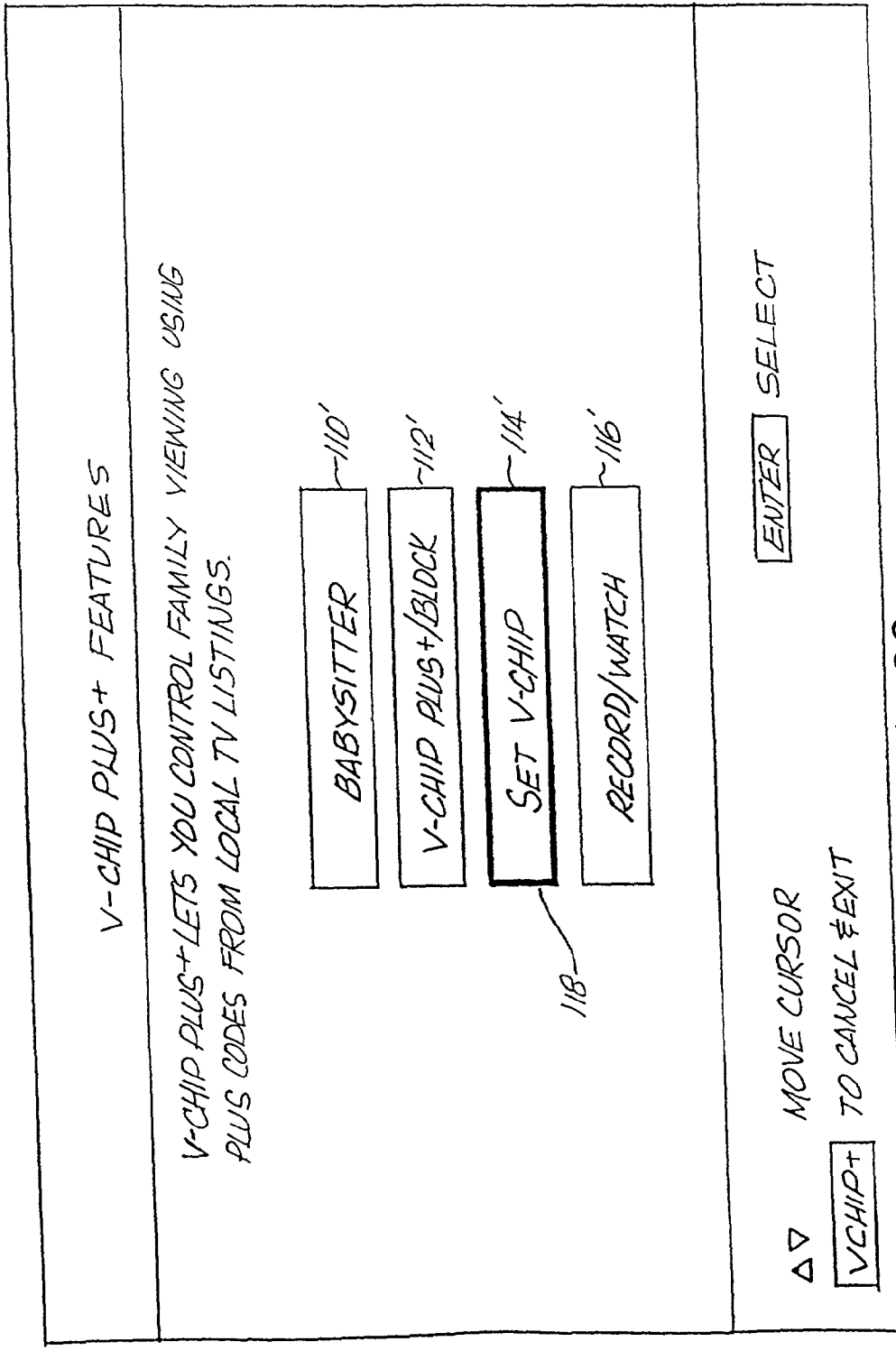
FIG. 22 is a television screen displaying a V-Chip Plus+ Features Screen formatted in accordance with a TV mode of the present invention.

The V-Chip Plus+ features screen 108 can be pulled up by selecting the V-CHIP PLUS+ key on the viewer input device. Upon activation of the V-CHIP PLUS+ key, the V-Chip Plus+ features screen is retrieved by the microprocessor from RAM and presented to the TV display by the video processor as an overlay on the television picture via the video mixer. Another exemplary V-Chip Plus+ features screen in accordance with the described embodiment is shown in FIG. 22. Referring to FIG. 22, four sub-menus can be accessed from the V-Chip Plus+. The four sub-menu selections include a BABYSITTER feature 110, a V-CHIP PLUS+ blocking feature 112, a V-CHIP set feature 114, and a RECORD/WATCH feature 116. From the V-Chip Plus+ features screen (see FIG. 22) any sub-menu can be selected by the viewer by positioning a cursor 118 on the desired sub-menu selection with the up and down arrow keys on the viewer input device and then depressing the ENTER key.

In the described embodiment illustrated in FIG. 22, the V-CHIP set feature 114' is highlighted by the cursor 118. As described above with reference to other embodiments of the present invention, the V-CHIP set feature allows the viewer to program his or her television system to exclude programs according to a selected rating criteria. From this sub-menu selection, the viewer can either review or edit the rating criteria by depressing the ENTER key on the viewer input device. As a result, the V-Chip set screen is retrieved by the microprocessor from RAM and presented to the TV display by the video processor as an overlay on the television picture via the video mixer. An exemplary V-Chip set screen is shown in FIG. 23.

Initially, from the V-Chip set screen, the viewer has the option of deactivating the V-Chip system. This is accomplished by positioning a cursor 122 on the OFF prompt 120 with the arrow keys on the viewer input device and then depressing the ENTER key. In response, a message indicating that the V-Chip feature is disabled will appear on the message screen 124. As a result, the blocking circuit will be controlled by the microprocessor independently of the rating factors contained in the VBI.

To activate the V-Chip system, the viewer merely positions the cursor 122 over the ON prompt 126 with the arrow keys on the viewer input device and depresses the ENTER key. Once activated, the rating factors extracted from the VBI of the television signal will be compared with the current rating factors stored in RAM and used to determine whether the blocking circuit, under microprocessor control, will allow television programs to pass to the TV display.

Once the V-Chip system is activated, the current rating set by the viewer will be displayed on the message screen 124. In the described embodiment, the V-Chip system can be programmed using movie ratings, such as those promulgated by the Motion Picture Association of America, as well as TV ratings. Preferably, the V-Chip system should be programmed with both TV and movie ratings to accommodate television programming utilizing different rating systems. Viewing and editing of either the TV or movie ratings is accomplished by selecting the appropriate prompt 128, 130 on the V-Chip set screen with the viewer input device.

Figure 24:
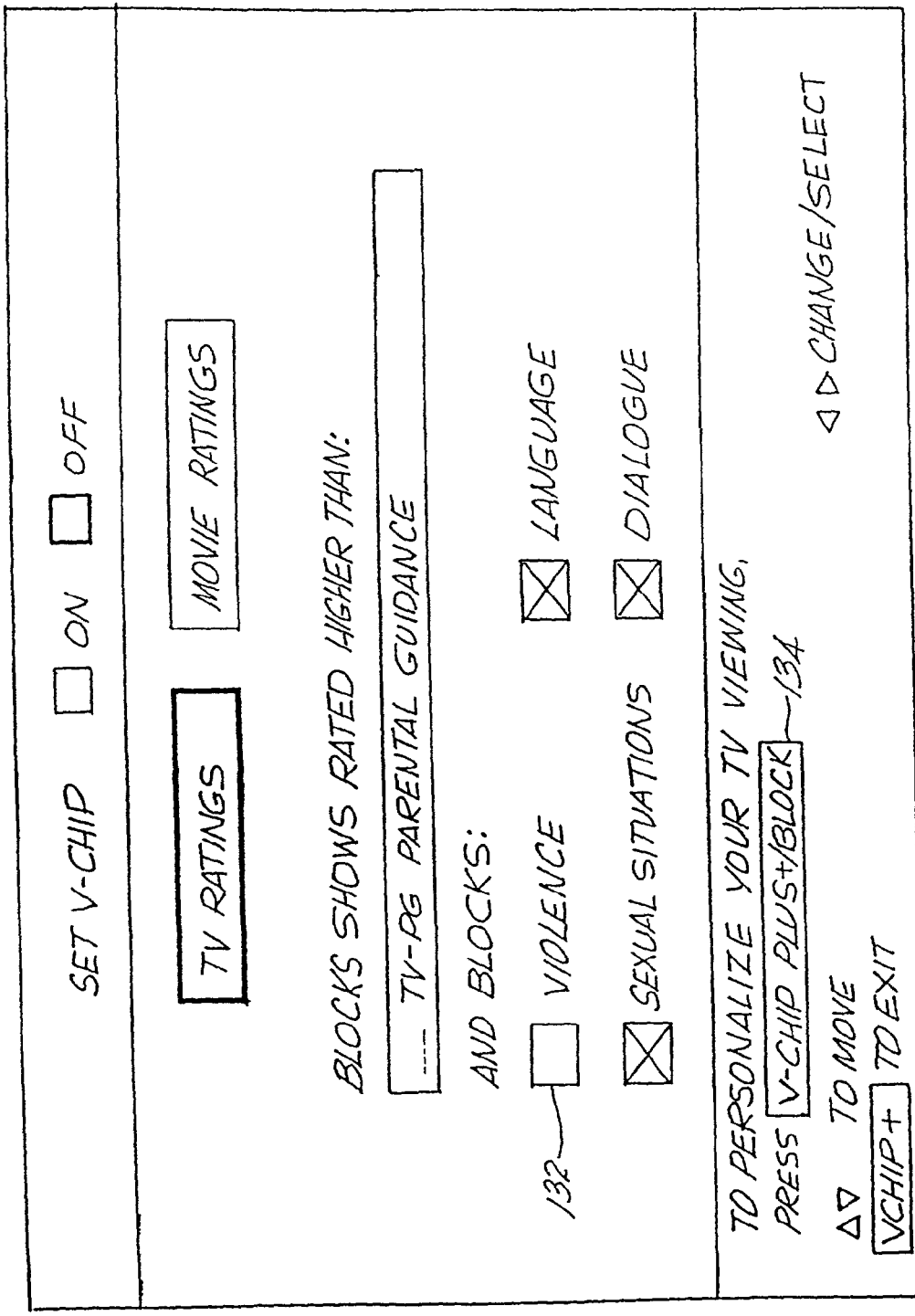
FIG. 24 is a television screen displaying the V-Chip Set-Up Screen with the V-Chip function enabled formatted in accordance with a TV mode of the present invention.

Referring to FIG. 24, the current V-Chip rating for TV programs in RAM is "TV-PG Parental Guidance." In a preferred embodiment, the "TV-PG Parental Guidance" allows viewing of television programs with moderate violence, some sexual situations, some coarse language and suggestive dialogue. Each of these rating factors can be individually activated or deactivated by positioning the cursor 122 on the appropriate prompt, by way of example, "Violence" 132, and depressing the right or left arrow key on the user input device. As a result, the violent content of television programming will not be used to determine whether the current televised show should be blocked.

Alternatively, the overall V-Chip system rating programmed in RAM for either TV or movies can be altered by the viewer. This function is performed by positioning the cursor 122 on the message screen 124 with the up and down arrow keys on the viewer input device. Next, the right and left arrow key are used to peruse the different V-Chip system ratings until the desired rating appears on the message screen 124 at which time the viewer can select that rating by depressing the ENTER key on the viewer input device. The particular V-Chip system ratings for movies and TV programs may vary depending upon the needs of the manufacturer or consumer. Exemplary V-Chip system ratings for TV programs are described above with reference to other embodiments of the present invention.

Figure 21:
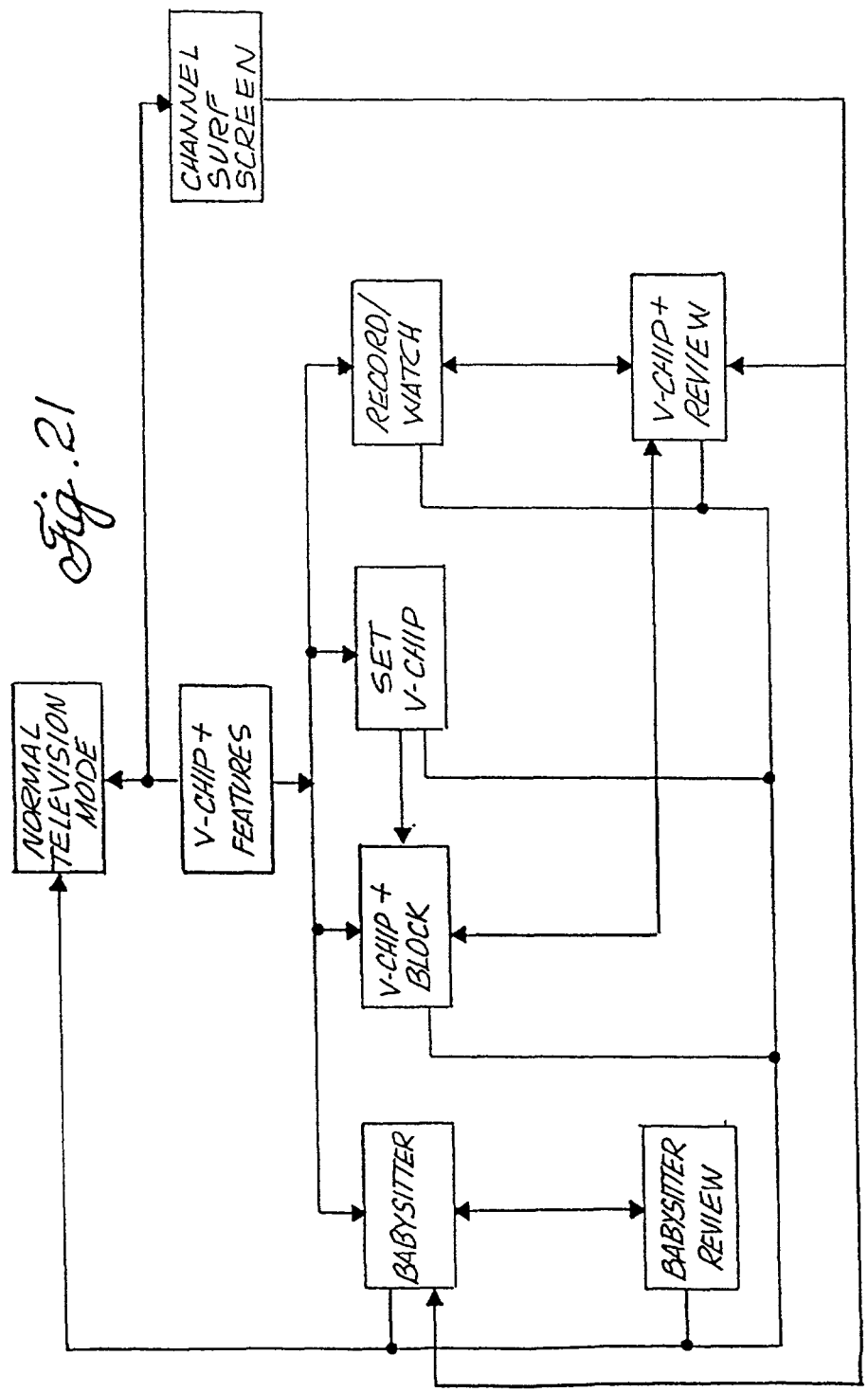
FIG. 21 is a block diagram of a user interface screen map in accordance with an embodiment of the present invention.

The V-Chip Plus+ block list can be accessed from the V-Chip set screen by positioning the cursor 122 on the V-CHIP PLUS+/BLOCK prompt 134 with the up and down arrow keys on the viewer input device and depressing the ENTER key. The ability to directly access the V-Chip Plus+ block list from the V-Chip set screen is shown in FIG. 21 by path 136. Alternatively, the viewer can exit the system and return to normal television viewing 104 by depressing the V-CHIP PLUS+ key on the viewer input device. From the normal television screen 104, the viewer can depress the V-CHIP PLUS+ key on the viewer input device a second time to pull up the V-Chip Plus+ features screen 106, and select the V-CHIP PLUS+ blocking feature 112 in the manner described above with reference to FIG. 22.

Figure 25:
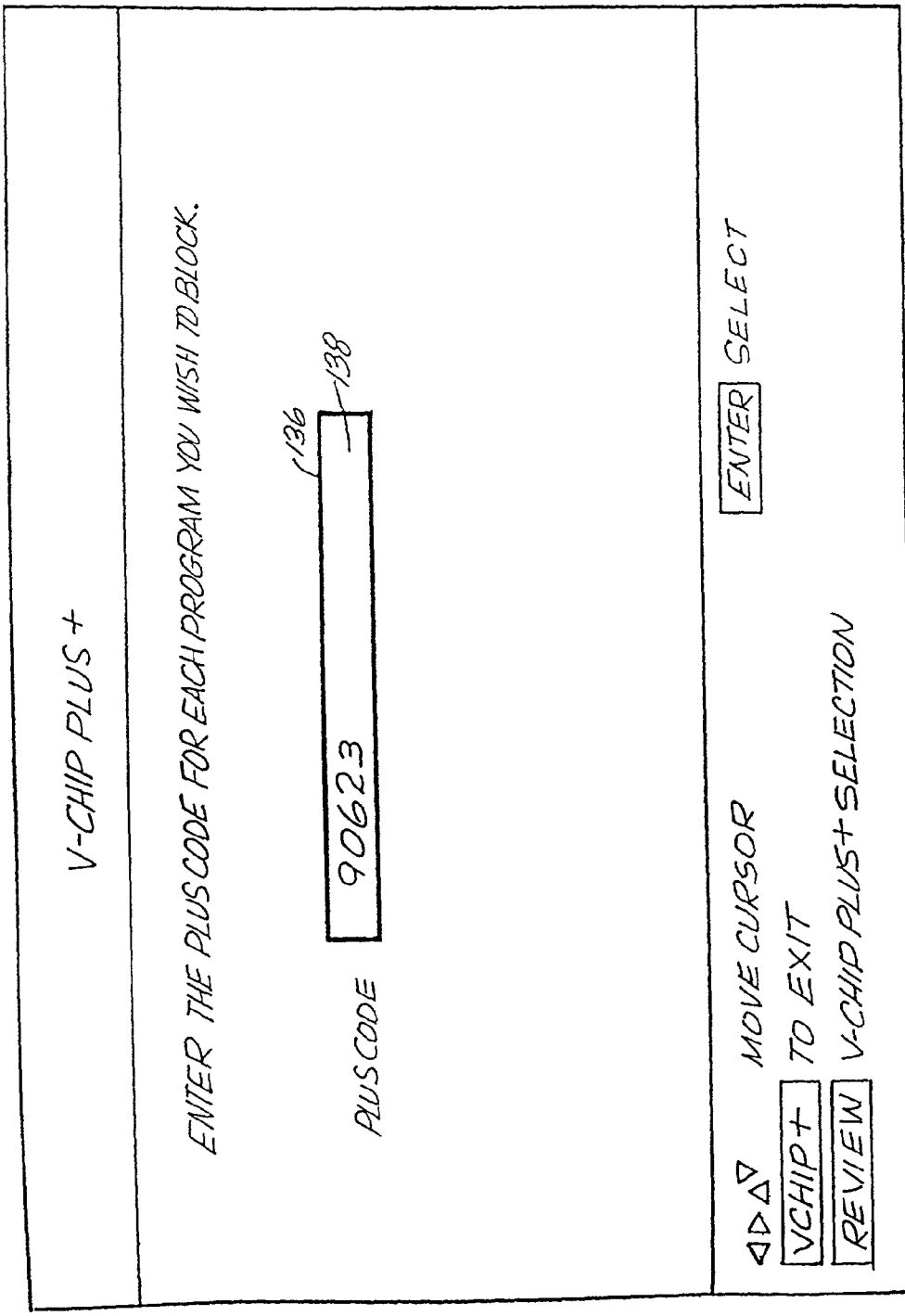
FIG. 25 is a television screen displaying a V-Chip Plus+ Screen for selecting television programs formatted in accordance with a TV mode of the present invention.

Once the V-CHIP PLUS+ blocking feature is selected by the viewer, the V-Chip Plus+ screen is retrieved by the microprocessor from RAM and presented to the TV display by the video processor as an overlay on the television picture via the video mixer. An exemplary V-Chip Plus+ screen is shown in FIG. 25. From the V-Chip Plus+ screen the viewer can both review and edit the V-Chip Plus+ blocking list. To edit the V-Chip Plus+ blocking list, the viewer positions a cursor 136 on the PlusCode entry line 138, enters the compressed code that appears with the program listed in the published television schedule by using the numeric keypad on the viewer input device, and depresses the ENTER key. As described above with reference to other embodiments of the present invention, the use of PlusCodes to create the V-Chip Plus+ blocking list is a convenient method, although it will be understood by those skilled in the art that other methods could be used such as program title entries or selection from an electronic program guide.

Once the ENTER key is depressed, a sub-menu is retrieved by the microprocessor from RAM and presented to the TV display. The sub-menu, shown in FIG. 26, allows the user to block the selected television program once, or alternatively, on a daily or weekly basis. The blocking frequency is set by positioning a cursor 140 over the desired prompt. In FIG. 26, the ONCE prompt 142 is highlighted for illustrative purposes, and once entered into the system with the viewer input device, will produce the message shown in the message display 144. The V-Chip Plus+ blocking screen of FIG. 25 is then re-entered by depressing the V-CHIP PLUS+ key on the viewer input device.

To review the television programs that have been selectively blocked, a V-Chip Plus+ blocking list is consulted by depressing the REVIEW key on the viewer input device. As a result, the V-Chip Plus+ selections list is retrieved by the microprocessor from RAM and presented to the TV display by the video processor as an overlay on the television picture via the video mixer. An exemplary V-Chip Plus+ selections list is shown in FIG. 27. Next, the viewer positions a cursor 144 on the BLOCK prompt 146 and depresses the ENTER key on the viewer input device. A list of television programs selected by the viewer for blocking, that would otherwise be passed to the TV display by the V-Chip system, is presented to the screen. Each television program is displayed on the V-Chip Plus+ blocking list by its respective CDTL information. It will be appreciated by those skilled in the art that the titles of the television programs could be alternately displayed, or additionally displayed with the CDTL information, by accessing an EPG data base in memory with the microprocessor.

The V-Chip Plus+ selection screen also provides limited editing features. For example, any television program may be deleted from the V-Chip Plus+ blocking list by positioning the cursor 144 over the CDTL information corresponding to the desired television program and depressing the ENTER key on the viewer input device to delete the highlighted television program. In addition, the length of the blocking function programmed in the microprocessor for the highlighted television program can be altered by first depressing the CHANGE key on the viewer input device, and then incrementing or decrementing the length with the right and left arrow keys, respectively, on the viewer input device.

To exit the V-Chip Plus+ selection screen, the viewer depresses the V-CHIP PLUS+ key on the viewer input device. As shown in FIG. 21, the normal viewing television screen 104 is entered from the V-Chip Plus+ selection screen 148. From the normal television screen 104, the viewer can then depress the V-CHIP PLUS+ key on the viewer input device a second time to pull up the V-Chip Plus+ features screen 106.

The V-Chip Plus+ features screen 106 includes a Record/Watch 116 option. The "Record" option provides a means for programming the VCR to automatically record a television program, and the "Watch" option allows the television receiver to be turned on automatically and tuned to a selected television program when aired.

Figure 28:
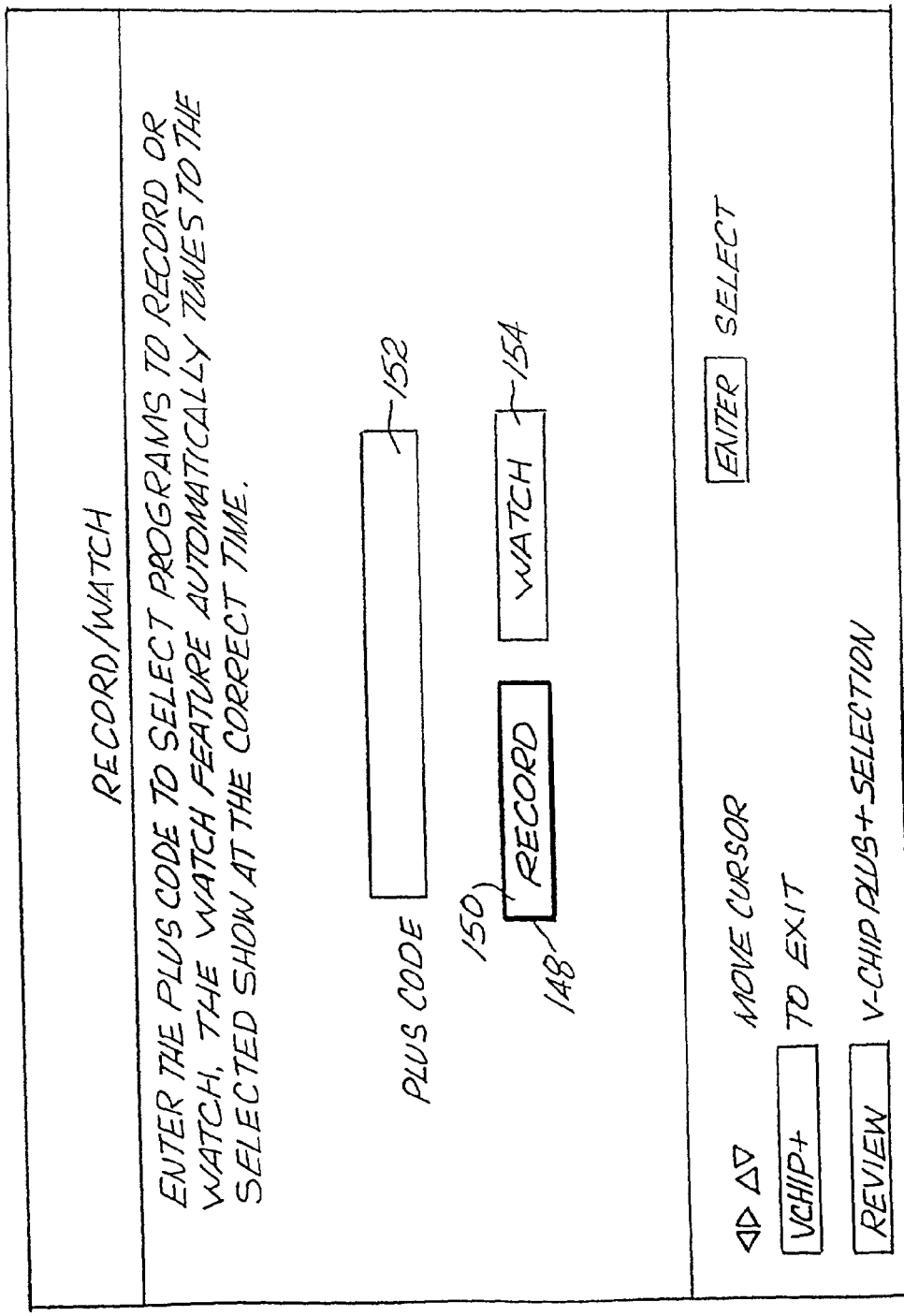
FIG. 28 is a television screen displaying a Record/Watch Screen for selecting television programs formatted in accordance with a TV mode of the present invention.

The Record/Watch Option 116 can be accessed from the V-Chip Plus+ features screen 106 by positioning the cursor 118 on the RECORD/WATCH prompt 116' with the arrow keys on the viewer input device and depressing the ENTER key (see FIG. 22). Once the RECORD/WATCH feature is selected by the viewer, the Record/Watch screen is retrieved by the microprocessor from RAM and presented to the TV display by the video processor as an overlay on the television picture via the video mixer. An exemplary Record/Watch screen is shown in FIG. 28. From the Record/Watch screen, the viewer can review and edit the television programs he or she wishes to record or view. To edit the Record list, the viewer first positions a cursor 148 over the RECORD prompt 150 and depresses the ENTER key on the viewer input device. Next, the cursor 148 is positioned on the PlusCode entry line 152 and the compressed code from the published television schedule is entered with the numeric keypad on the viewer input device much in the same way the V-Chip Plus+ blocking list is created. Once the PlusCode is keyed in, the ENTER key is depressed on the viewer input device. The Watch list can also be edited in the same manner except that the WATCH prompt 154 is highlighted with the cursor 148 prior to entering the PlusCode.

Once a new television program is entered for either recording or watching, a sub-menu similar to the one used to edit the V-Chip Plus+ blocking list is retrieved by the microprocessor from RAM and presented to the TV display. The sub-menu, shown in FIG. 29, allows the user to record or watch, whatever the case may be, the selected television program once, or alternatively, on a daily or weekly basis. The blocking frequency of the selected television program is set by positioning a cursor 156 over the desired prompt. In FIG. 29, the ONCE prompt 158 is highlighted for illustrative purposes, and once entered into the system with the viewer input device, will produce the message for recording the selected television program shown in the message display 158. FIG. 30 is an example of a sub-menu screen for editing the watch list. Upon completion of editing the record or watch list, the Record/Watch screen of FIG. 28 is then re-entered by depressing the V-CHIP PLUS+ key on the viewer input device.

Figure 31:
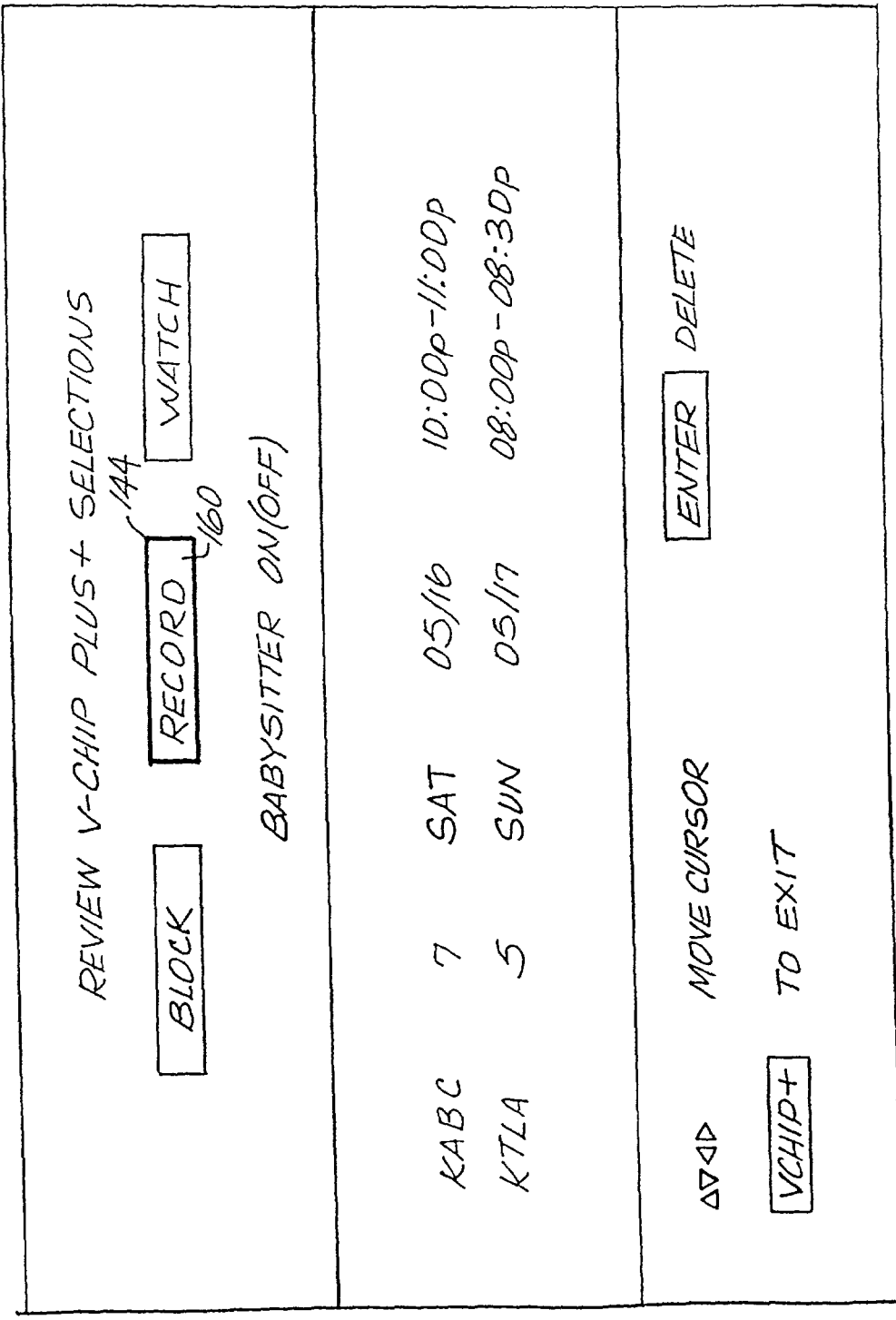
FIG. 31 is a television screen displaying a V-Chip Plus+ Selections Review List for recorded television programs formatted in accordance with a TV mode of the present invention.

To review the television programs selected for recordation or watching, the V-Chip Plus+ selection screen (see FIG. 27) is retrieved from the microprocessor and presented to the TV display by depressing the REVIEW key on the viewer input device. To review the record list, the viewer positions the cursor 144 on the RECORD prompt 160 and depresses the ENTER key on the viewer input device. A list of television programs selected by the viewer for recordation is presented to the screen in a CDTL format as shown in FIG. 31. Conversely, the watch list can be viewed by positioning the cursor 144 on the WATCH prompt 162 (see FIG. 27) and depresses the ENTER key on the viewer input device. A list of television programs selected by the viewer for watching is presented to the screen in a CDTL format as shown in FIG. 32. Preferably, the same limited editing features described with reference to the V-Chip Plus+ blocking list is also available for the record and watch lists.

As described above, to exit the V-Chip Plus+ selection screen, the viewer depresses the V-CHIP PLUS+ key on the viewer input device. As shown in FIG. 21, the normal viewing television screen 104 is entered from the V-Chip Plus+ selection screen 148. From the normal television screen 104, the viewer can then depress the V-CHIP PLUS+ key on the viewer input device a second time to pull up the V-Chip Plus+ features screen 106.

The V-Chip Plus+ features screen also provides a BABYSITTER function to control the unsupervised television viewing of children. The BABYSITTER operates independently of the V-Chip Plus+ system and blocks all television programs from the TV display except for those shows placed on a BABYSITTER list.

To enter the BABYSITTER function from the V-Chip Plus+ features screen (see FIG. 22), the viewer positions the cursor 118 on the BABYSITTER prompt 110' with the arrow keys on the viewer input device and then depresses the ENTER key. As a result, the Babysitter screen is retrieved by the microprocessor from RAM and presented to the TV display by the video processor as an overlay on the television picture via the video mixer. An exemplary Babysitter screen is shown in FIG. 33.

To activate the BABYSITTING feature, the viewer positions a cursor 160 on the ON prompt 162 with the arrow keys on the viewer input device and then depresses the ENTER key. In response, the television picture background to the overlaid Babysitter screen will be blacked out, unless a television program contained in the Babysitter list is currently being televised. Conversely, to deactivate the Babysitting feature, the cursor 160 is positioned over the OFF prompt 164 and the ENTER key is then depressed, causing the television picture to reappear in the background portion of the babysitting screen overlay.

From the Babysitter screen the viewer can edit and review the Babysitting list. To edit the Babysitting list, the viewer positions the cursor 160 on the PlusCode entry line 166 and enters the compressed code that appears with the program listed in the published television schedule by using the numeric keypad on the viewer input device. Then the viewer selects the frequency in which the television show is allowed to be watched (i.e., once, daily, or weekly) by positioning the cursor 160 over the appropriate prompt, and depresses the ENTER key. As described above with reference to other embodiments of the present invention, the use of PlusCodes to create the V-Chip Plus+ blocking list is a convenient method, although it will be understood by those skilled in the art that other methods could be used such as program title entries or selection from an electronic program guide.

To review the television programs that have been selected for viewing by the babysitter, a Babysitter Program Review list is consulted by depressing the REVIEW key on the viewer input device. As a result, the Babysitter Program Review list is retrieved by the microprocessor from RAM and presented to the TV display by the video processor as an overlay on the television picture via the video mixer. An exemplary Babysitter Program Review list is shown in FIG. 34. The Babysitter Program Review list comprises a list of television programs that have been selected for viewing by the Babysitter. Any television program not contained on the Babysitter Program Review list will be blocked by the microprocessor from the TV display when the Babysitting feature is activated regardless of the V-Chip Plus+ rating factors programmed into RAM. Similar to the other television lists described above, the Babysitting Program Review list displays the selected television programs by their respective CDTL information. It will be appreciated by those skilled in the art that the titles of the television programs could be alternately displayed, or additionally displayed with the CDTL information, by accessing an EPG data base in memory with the microprocessor.

The Babysitting Program Review screen also provides limited editing features. For example, any television program may be deleted from the Babysitter Program Review list by positioning a cursor 168 over the desired CDTL information corresponding to the desired television program and depressing the ENTER key on the viewer input device to delete the highlighted television program. Alternatively, the length of the viewing time for the highlighted television program can be altered by first depressing the CHANGE key on the viewer input device, and then incrementing or decrementing the length with the right and left arrow keys, respectively, on the viewer input device. Preferably, the Babysitting feature can be activated or deactivated from this screen by positioning the cursor 168 over the appropriate prompt and depressing the ENTER key on the viewer input device. The Babysitting feature can be also activated or deactivated from VChip Plus+ menu by selecting an entry for the Babysitting feature (not shown).

To exit the Babysitter Program Review screen, the viewer either depressed the BABYSITTER key on the viewer input device to return to the Babysitter screen of FIG. 33, or depresses the V-CHIP PLUS+ key on the viewer input device to return to the normal viewing television screen.

Figure 35:
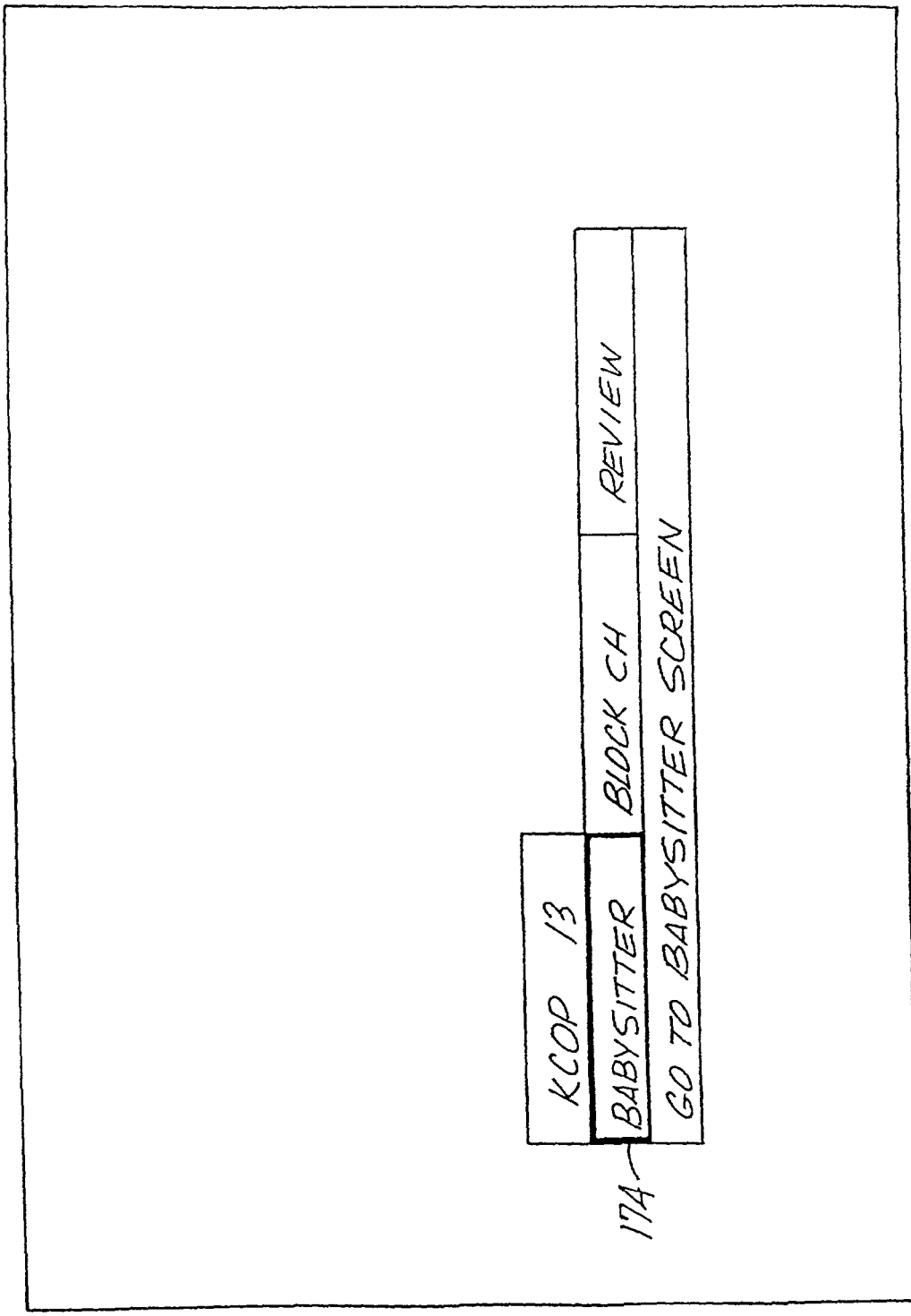
FIG. 35 is a television screen displaying a Channel Surf Screen set for Babysitter selection formatted in accordance with a TV mode of the present invention.

In addition to accessing the V-Chip Plus+ features screen from the normal television viewing mode 104, a channel surf option provides direct access to certain features. By way of example, the viewer can access directly from the channel surf screen 108 the V-Chip Plus+ Program Review list 148 and the Babysitter Program Review list 170. The channel surf screen is retrieved by the microprocessor from RAM and presented to the TV display by the video processor as an overlay on the television picture via the video mixer by depressing the CHANNEL SURF key on the viewer input device. An exemplary channel surf screen is shown in FIG. 35. In a preferred embodiment, the channel surf screen is also presented to the TV display for a short period of time every time a new channel is tuned.

Referring to FIG. 35, the tuned channel is presented to the TV display for viewer information. In a preferred embodiment, three on-screen sub-menu prompts are displayed horizontally below the channel indicator, and may be accessed by moving a cursor 174 with the right and left arrow keys on the viewer input device. A description of the on-screen sub-menu prompt selected by the viewer with the cursor 174 is displayed immediately below. In the embodiment illustrated in FIG. 35, the viewer has selected the Babysitter feature, and the message "Go to Babysitter Screen" appears below the sub-menus. This approach allows the viewer to directly access the Babysitter function without having to first go through the V-Chip Plus+ features screen. The viewer merely depressed the ENTER key on the viewer input device and the Babysitter screen shown in FIG. 33 is retrieved by the microprocessor from RAM and presented to the TV display as an overlay. From this screen, the viewer may either pull up the Babysitter Program Review list (see FIG. 34) or return to the normal television viewing mode in the same manner described above with reference to the V-Chip Plus+ features screen.

Figure 36:
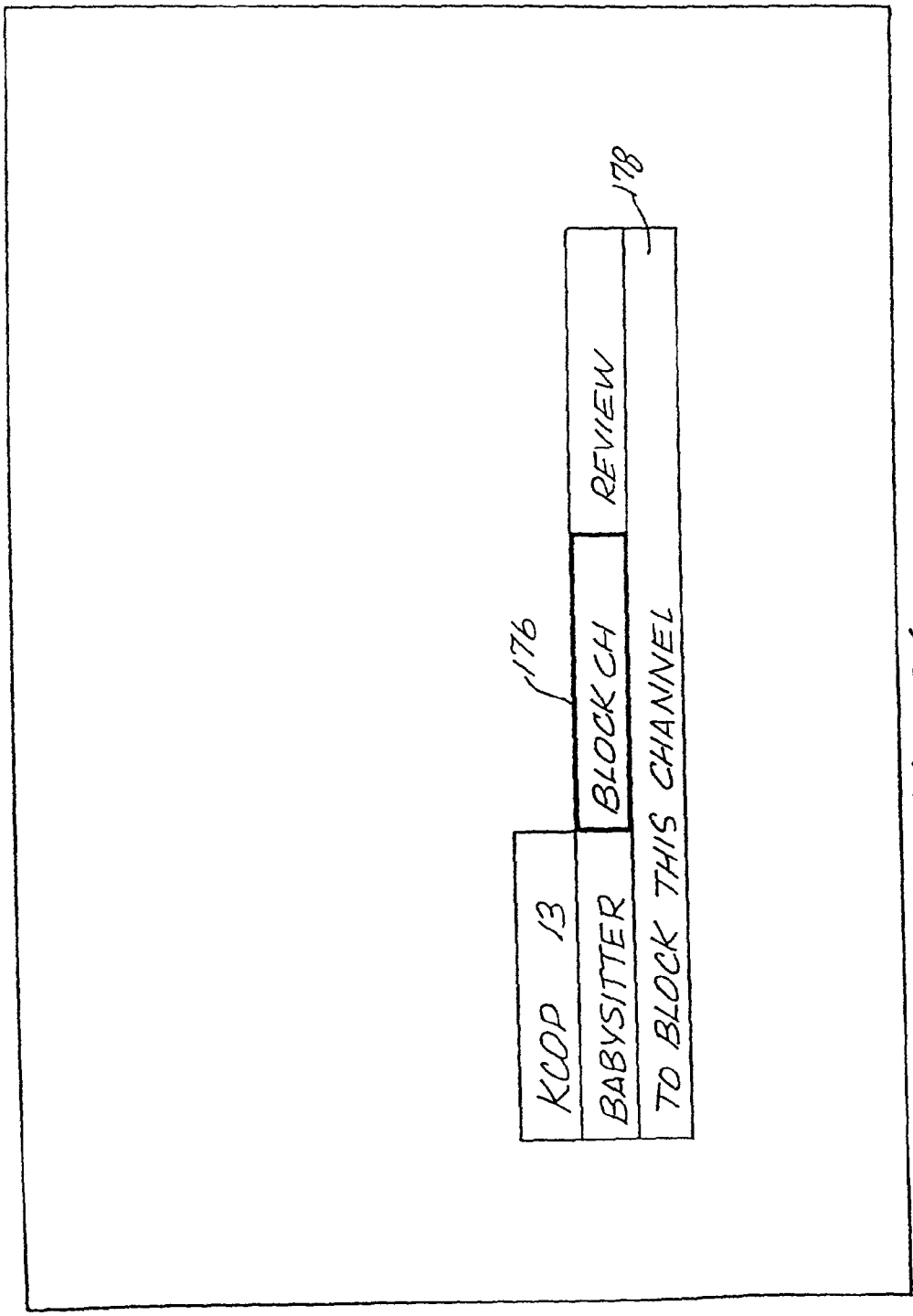
FIG. 36 is a television screen displaying a Channel Surf Screen set for blocking the tuned channel formatted in accordance with a TV mode of the present invention.
Figure 37:
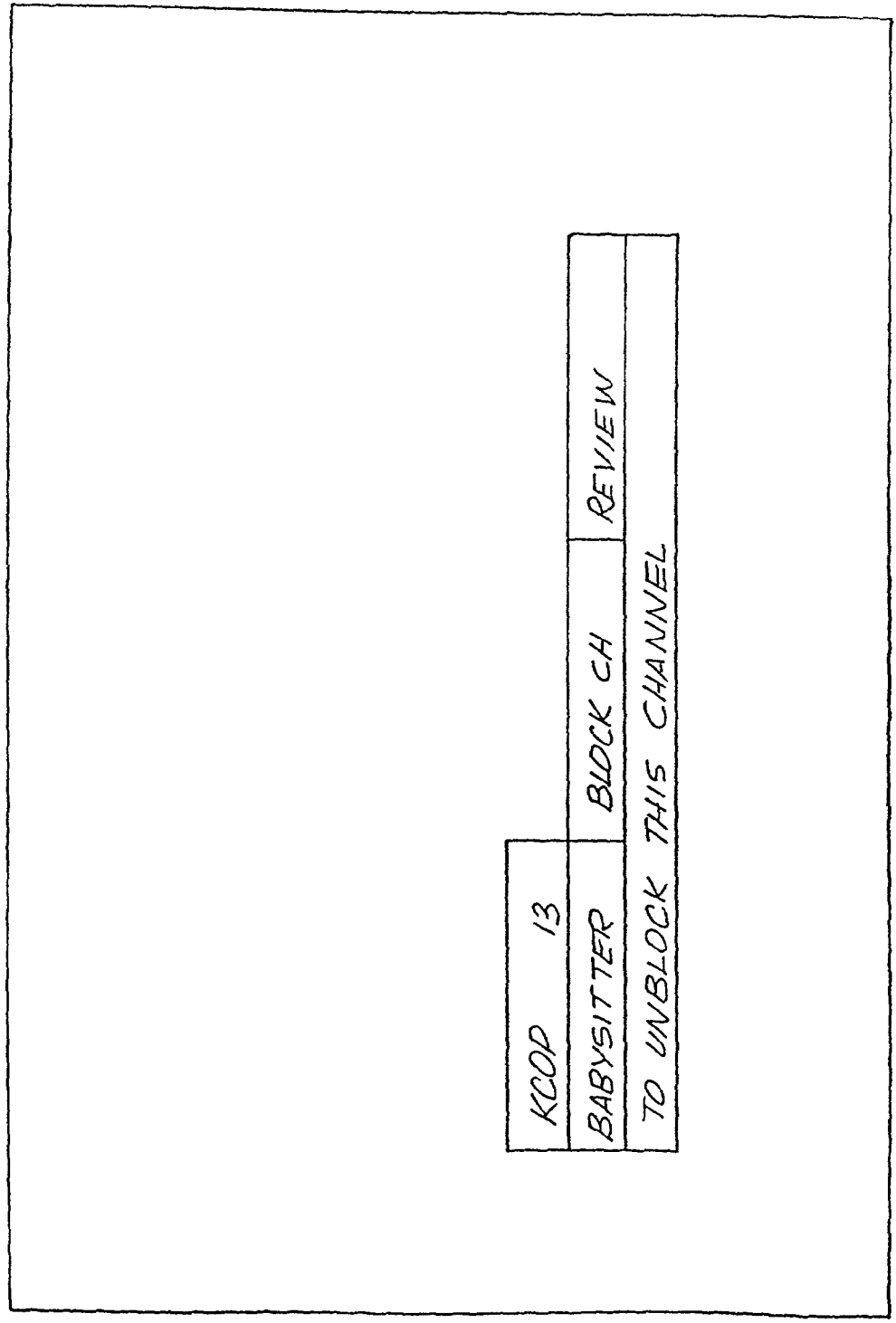
FIG. 37 is a television screen displaying a Channel Surf Screen set for unblocking the tuned channel formatted in accordance with a TV mode of the present invention.

The channel surf screen also provides the capability to block or unblock the channel tuned by the microprocessor. This is achieved by positioning the cursor 174 over the BLOCK CH prompt 176 as shown in FIG. 36. In response, a message "To Block this Channel" appears in the message display 178. The ENTER key on the viewer input device is then depressed to block the entire channel. This approach allows, by way of example, KCOP to be blocked with a single touch of the viewer input device. The channel block command from the viewer input device is stored in RAM by the microprocessor for controlling the blocking circuit. A new message, "To Unblock this Channel," is retrieved by the microprocessor and presented to the TV display in the message screen 178 as shown in FIG. 37. The channel can now be unblocked by simply depressing the ENTER key on the viewer input device a second time.

Figure 38:
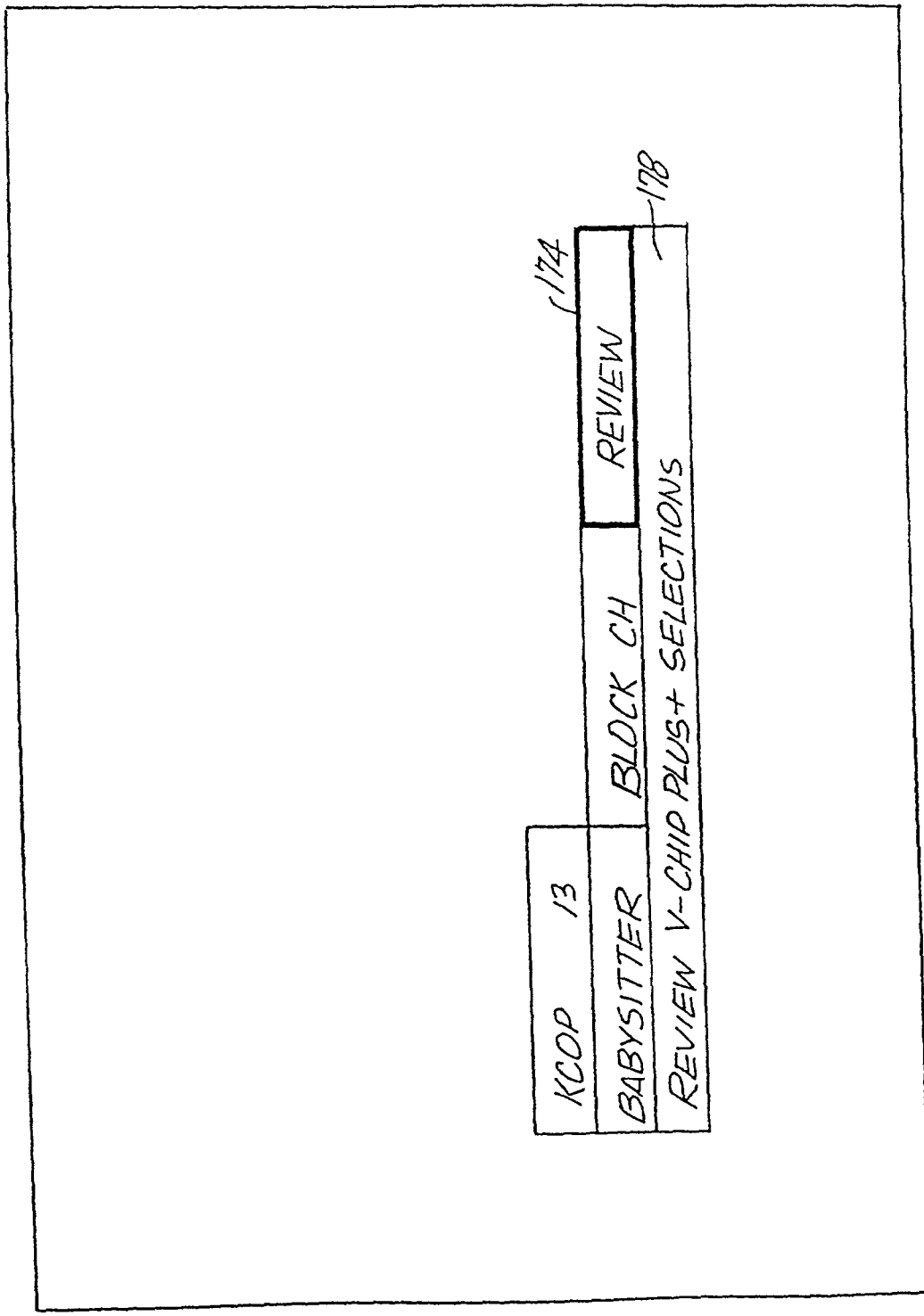
FIG. 38 is a television screen displaying a Channel Surf Screen set for reviewing the V-Chip Plus+ selections formatted in accordance with a TV mode of the present invention.

The V-Chip Plus+ Program list can also be accessed directly by the viewer from the channel surf screen by positioning the cursor 174 on the "Review" on-screen sub-menu prompt causing a message, "Review V-Chip Plus+ Selections," on the message display 178 as shown in FIG. 38. The ENTER key on the viewer input device is then depressed to call up the V-Chip Plus+ Program Review list on the TV display. Once the V-Chip Plus+ Program Review list is retrieved, the list can be edited and reviewed in the tame manner described above. To exit the V-Chip Plus+ Program Review list and return to the normal television viewing mode, the viewer depresses the V-CHIP PLUS+ key on the viewer input device.

Guide Mode

Figure 43:
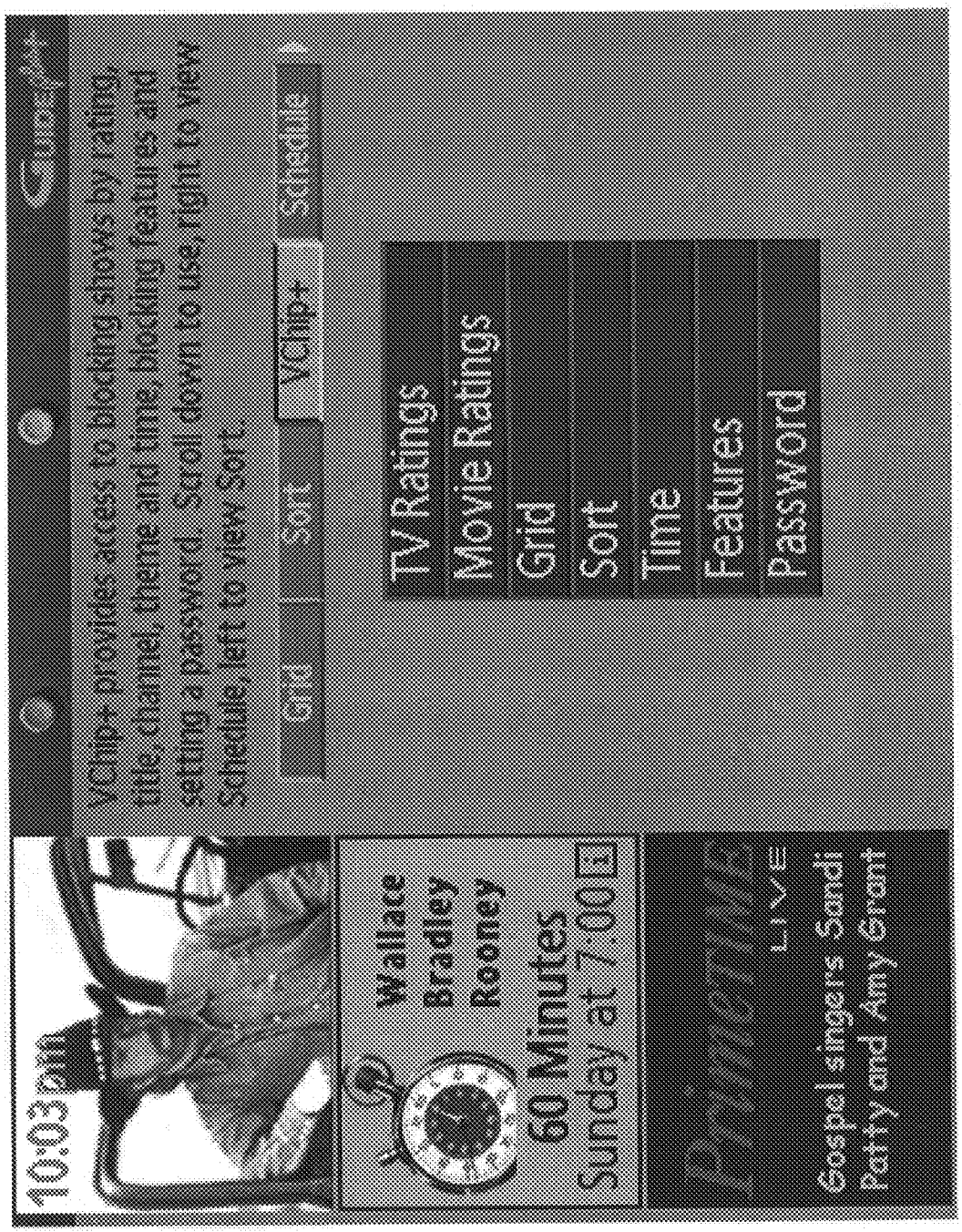
Figure 51:
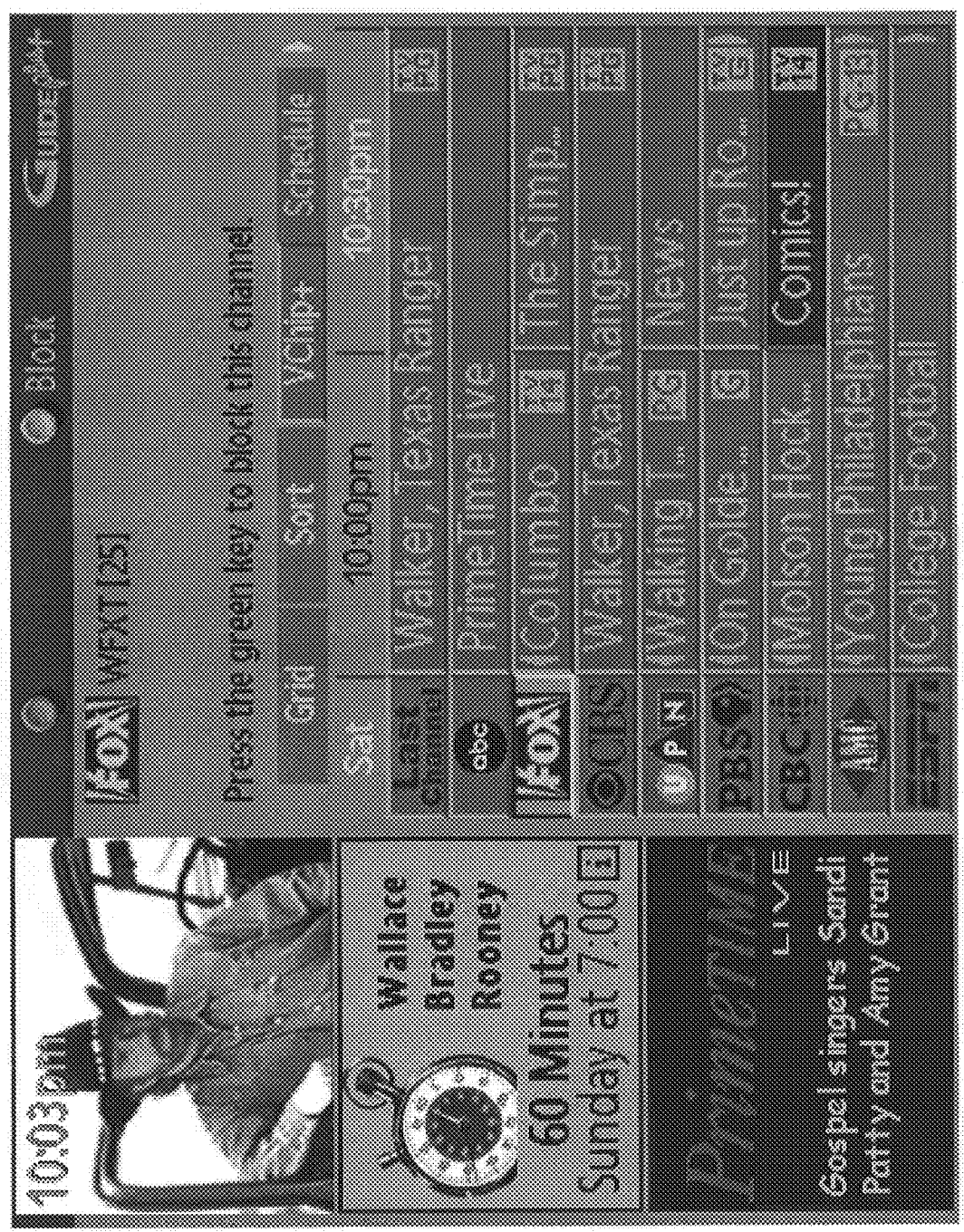
Figure 52:
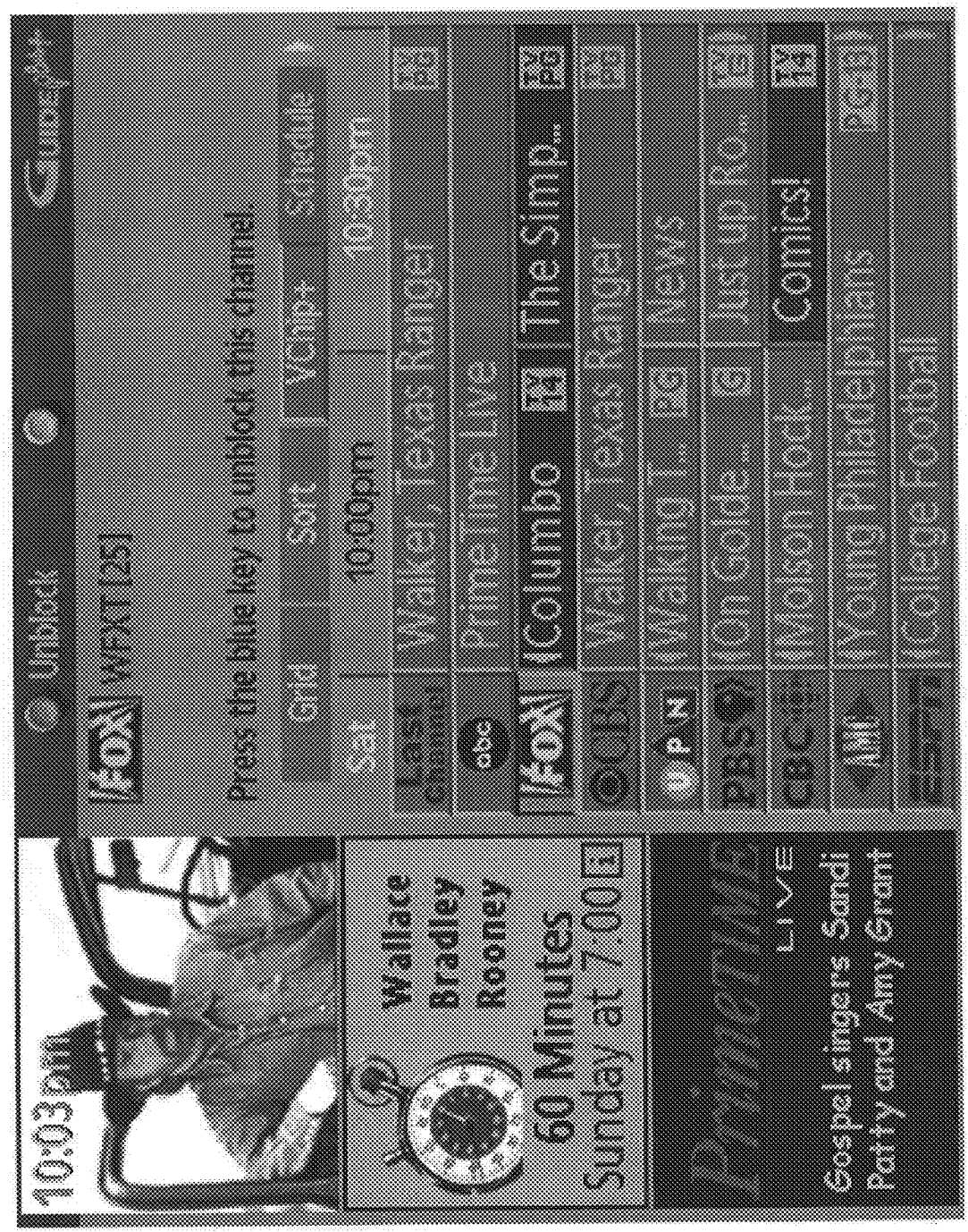

Referring to FIG. 43, the several VChip Plus+ screens are accessed from the Menu bar; the user highlights the "VChip Plus+" button on the menu bar, and then scrolls down to select from the menu of VChip Plus+ functions. Throughout the VChip Plus+ screens, an (blue) action button is used to unblock and a different (green) action button is used to block shows, times. channels, etc. As shown in FIGS. 51 and 52, when the highlighted tile is currently unblocked, the blue action button label is blank and the green action button is labeled "Block." When the highlighted tile is blocked, the blue action button is labeled "Unblock" and the green action button label is blank, except if the highlighted tile is a show title. If a blocked show title tile is highlighted, the green action button is labeled "Schedule," providing access to the Schedule screen to modify the blocking frequency from the default of once to daily or weekly.

Once a show is blocked, an info. box displays a message of: "<Show title> has been Blocked on <day, date>. Press the <key> to enter the Schedule to block <Show title> Daily or Weekly."

Pressing the VCR Plus+ key on the remote displays the VCR Plus+ interface in the Guide's Schedule screen. The user may input a Plus Code and then select the action they wish to take on the program: record (the default), watch, or block. These options will appear as tiles in the Plus Code entry area.

Similar to the watch and record features, a blocked show may be set to be blocked once, daily or weekly. This is accomplished by placing any individual show (this does not apply to all shows set to be blocked by channel, time or rating) that is set to be blocked into the Schedule queue. These blocked shows will be mixed in with the shows set to record or watch in chronological order. By entering the Schedule, either by pressing the green action button while highlighting a blocked show in the VChip Plus+ or the GUIDE Plus+ screens or from the Schedule button on the menu bar, the user may modify the frequency of the block in the same way they may do so for shows set to record or watch, by pressing an action button labeled "Change." This will cycle through the frequency choices. Modifying the frequency can only be done while the guide is in Master Mode.

Scheduled events (shows scheduled to record, watch or blocked) can be stored in a non-volatile memory such as an EEPROM. Thus, if a power outage occurs, the Scheduled events will be saved.

VChip Plus+ in GUIDE mode uses two data sources in combination to determine whether a show should be blocked: data downloaded and stored in the guide (channel lineups, show schedules, show ratings), and rating data transmitted over the VBI. Ordinary V-Chip devices use the data transmitted over the VBI to determine whether or not to block a show by rating. These ratings are sent a minimum of every 15 seconds. Thus, a show a parent may wish blocked, may be seen for up to 15 seconds before the blocking takes effect. VChip Plus+ in GUIDE mode will use show rating data already stored in the Guide to determine whether a show should be blocked as soon as it begins, and use the VBI data to confirm if the show was properly blocked. If it was blocked in error, then the block will be removed. In the event the Guide does not have rating data stored on a given show, the show will be accessible, until the VBI data is obtained and a blocking decision made.

Shows of participating networks. except news and sports programming. will be rated with either a TV Parental Guideline rating or an MPAA rating (for movies that have not been modified for TV). Networks using the ratings will also transmit the ratings during network commercials. Local commercials will most likely not carry the ratings of the contiguous show. VChip Plus+ will provide the ability for the user to block unrated programming. The intent is to give parents control over whether they wish their children to watch the potentially objectionable content of some news and sports programs. As a side effect, local ads which do not carry ratings will be blocked. In the circumstance where a local ad is surrounded by a rated show and unrated shows have been blocked, the user may find they are able to watch the show. However, the ad is blocked within about 15 seconds of appearing. The show will be re-displayed after the rating has been interpreted by VChip Plus+, potentially up to about 15 seconds after the show recommenced. Ads linked to shows that have been blocked by the blocking of the individual show, show channel, show theme, show rating, or show time slot will deny access to the show (as with any blocked show) until the Master Password is input. When an ad linked to a show is highlighted, the blocking message will appear in the PIP.

Additionally, turning a channel off in the Editor does not result in blocking all access to that channel. Specifically, if an ad with a show linked to channel turned off in the Editor is displayed, the user can still schedule that show for recording or watching, or tune to its related channel by pressing the OK button. Additionally, the PIP will tune to the channel related to the ad when the ad is highlighted, even though that channel has been turned off.

The EPG requests that the user provide certain profile information, including but not limited to: the user's zip code; television, cable, and satellite services to which the user subscribes; the length of said subscriptions; the type of television; the age of the television; where the television was purchased; the user's top favorite channels; the user's favorite types of programs; and the times during which the user is most likely to watch television. If the user declines to provide this information, the EPG will attempt to "learn" the information as described in a co-pending patent application Ser. No. 09/120,488 ("SYSTEMS AND METHODS FOR DISPLAYING AND RECORDING CONTROL INTERFACE WITH TELEVISION PROGRAMS, VIDEO, ADVERTISING INFORMATION AND PROGRAM SCHEDULING INFORMATION"), filed Jul. 21, 1998, the disclosures of which is incorporated herein by reference, as if fully stated here, for all purposes.

When the TV is powered on, the display will depend upon whether Auto-Guide-On is activated, the entry show has been blocked, or the TV remote or front panel was used to turn on the TV. If Auto-Guide-On is activated, the Guide will always appear when the TV is turned on using the remote. If a Master Password has been set, the user will have access to shows. features and screens provided by the User Profile. If the entry show has not been blocked, the show video will appear in the PIG. All shows, channels, times, etc. that are blocked will be so marked within the Guide. The user will have access to all unrestricted shows and features and screens of the Guide without the need to enter a password. Upon attempting to access a restricted show (by pressing the OK or Guide key), feature (recording via action buttons, any enabled buttons on the remote—likely the record button—and via the VCRPlus+ key) or screen (scrolling into or pressing OK from menu bar), a password dialog box will appear in the info. box (see FIG. 66). If the user correctly inputs the Master Password, they obtain access to all shows, areas of the guide and features. If the user does not input the Master Password, they will maintain access as defined by the User Profile. If the entry show has been blocked. the PIG will be black and contain the following message: "Show Blocked by VChip Plus+."

If Auto-Guide-On is not activated, the Guide will not appear when the TV is turned on using the remote. If a Master Password has been set, the user will have access to shows, features and screens provided by the User Profile. If the entry show has not been blocked, the show video will appear on screen. If the entry show has been blocked, the TV video will be covered with a password dialog box (see FIG. 66). Again, if the users correctly inputs the Master Password, they obtain access to all shows, areas of the guide and features. If the users do not input the Master Password, they will maintain access as defined by the User Profile.

In the event that the TV is turned on from the front panel of the TV, Auto-Guide-on is not active. VChip Plus+ in-Guide will operate as restricted by the User Profile, until the Master Password is input via the remote. There is no way to enter the Master Password without the remote control.

A user, intending on circumventing the VChip Plus+ blocking, may attempt to remove power from the TV with the hope that the blocking settings will be lost. Due to limitations in available EE ROM, not all settings can be stored in EE ROM. Following is a desired set of setting to be stored, in order of priority if EE ROM space permitting:

1. Master Password
2. blocking by ratings
3. blocking by channel
4. blocking by time
5. blocking by individual show in the Schedule (the next several items in the Schedule will be saved. This will be a combination of shows scheduled to record, watch or block.)
6. blocking features (recording, watch).

In the event of a power failure that exceeds the supercap power capabilities, the user will have the choice of two power outage settings (the default is number I below, the Master will select a setting in the VChip Plus+Feature screen):

1. deny all access to the TV until the Master Password is input. Access to the Guide will be permitted with access denied to Setup. Editor and VChip Plus+ screens.

2. allow access to everything not saved in EE ROM.

In setting, a power failure notice will present itself on screen every time the TV is powered on by the remote or by the front panel until the Master Password is input. This will inform the users of the power outage.

A child attempting to thwart the blocking of a specific show or channel by VChip Plus+ by tuning with the cable box will be unsuccessful due to the implementation of a Child Guard feature within VChip Plus+. The Child Guard feature monitors the video sync. of the signal coming into the TV. If a video interrupt is identified by the Child Guard mechanism without the Guide sending an IR. command to the cable box, the Guide will simply redial the cable box to the channel it was on before detecting the video interrupt. This will hinder a child from working around VChip Plus+.

Figure 44:
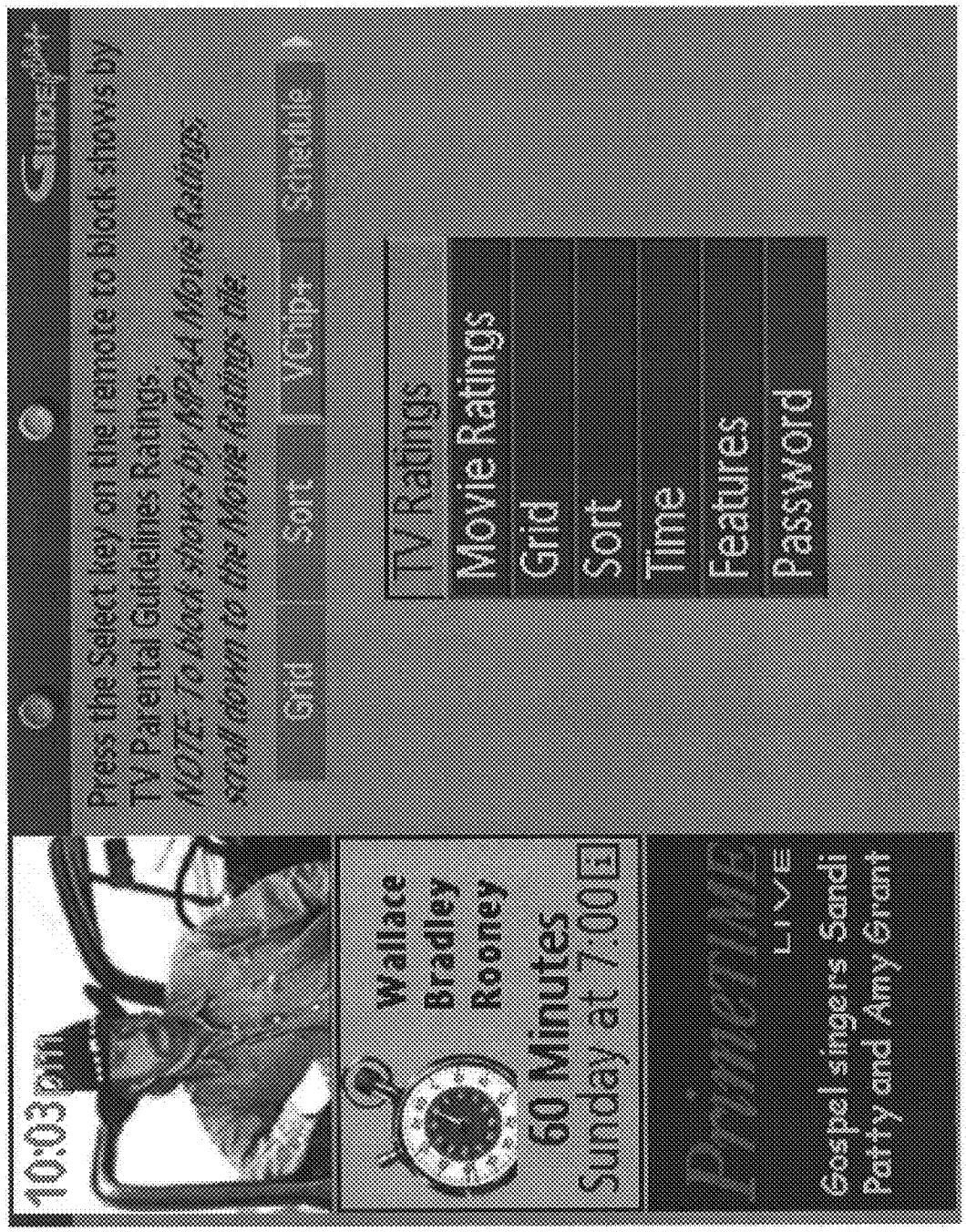

A VChip Plus+ Menu, with different features selected, is shown in FIGS. 43, 44, 46, 48, 49, 53, 56, 57, and 63. The VChip Plus+ Menu screen provides access to all the VChip Plus+ screens. These screens can only be accessed in Master Password Mode. The user scrolls down off the menu bar to highlight the tile of the desired feature. FIG. 44 shows the selection of TV Ratings. The user presses the OK/Select key to enter the screens related to the highlighted VChip Plus+ feature. Any user attempting to access these screens when not in Master Password mode will be prompted to enter the Master Password. If not in Master Mode, these menu tiles would be dark and unaccessible.

Figure 45:

FIG. 45 shows the VChip Plus+ TV Parental Guidelines Ratings. From this screen the user may block all instances of shows with any given TV Parental Guideline Ratings, block an entire content rating or a combination of TV Parental Guidelines and content ratings. Blocking unrated programs is executed from this screen as well. The screen is divided into 3 areas: 1. Programs for children, 2. Programs for the entire audience, and 3. Unrated programs. The green action key is used to block and the blue action key is used to unblock the ratings. When a rating is blocked, that rating and all higher ratings in the same group are blocked. When a rating is unblocked, only that rating is unblocked.

Figure 46:
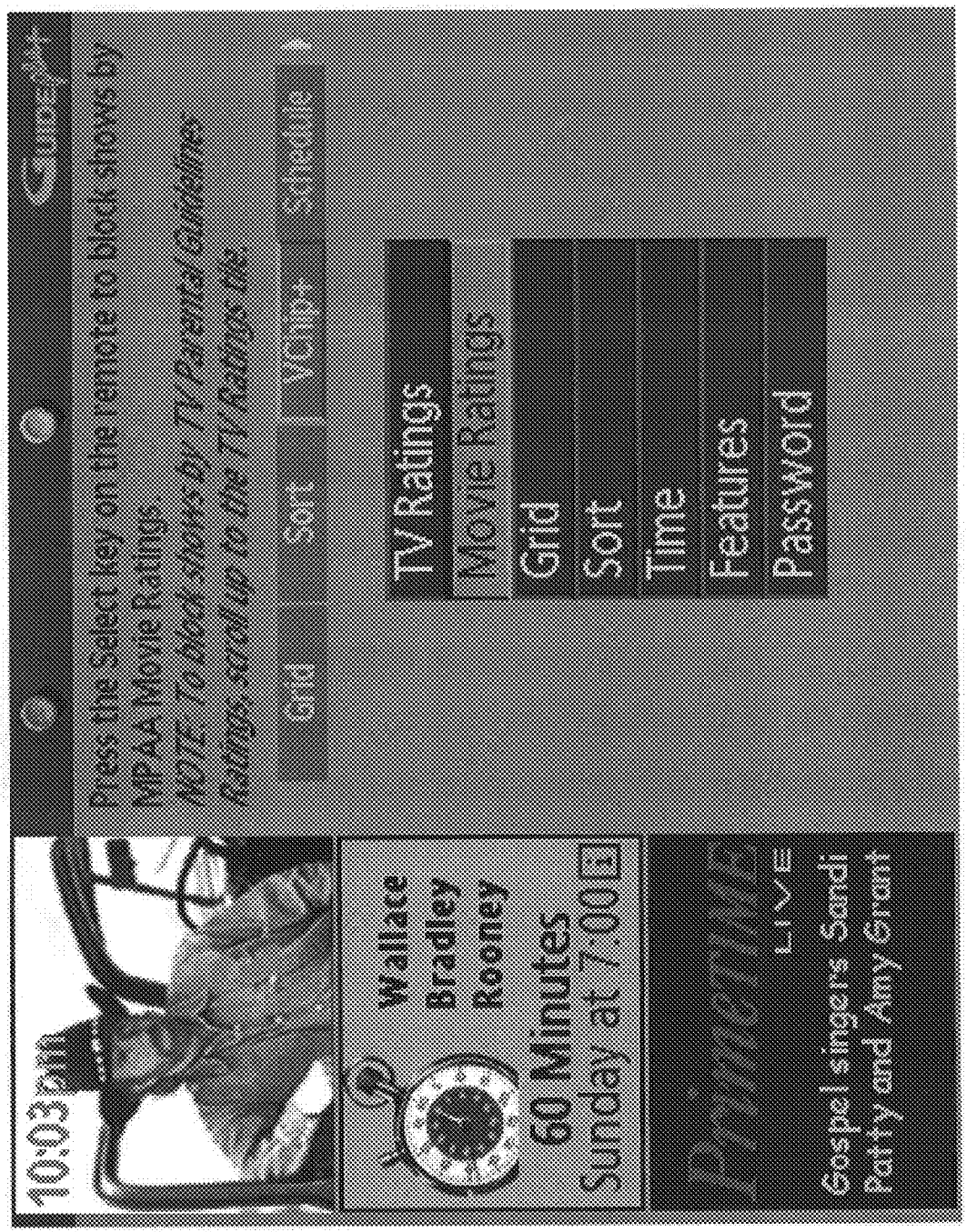
Figure 47:
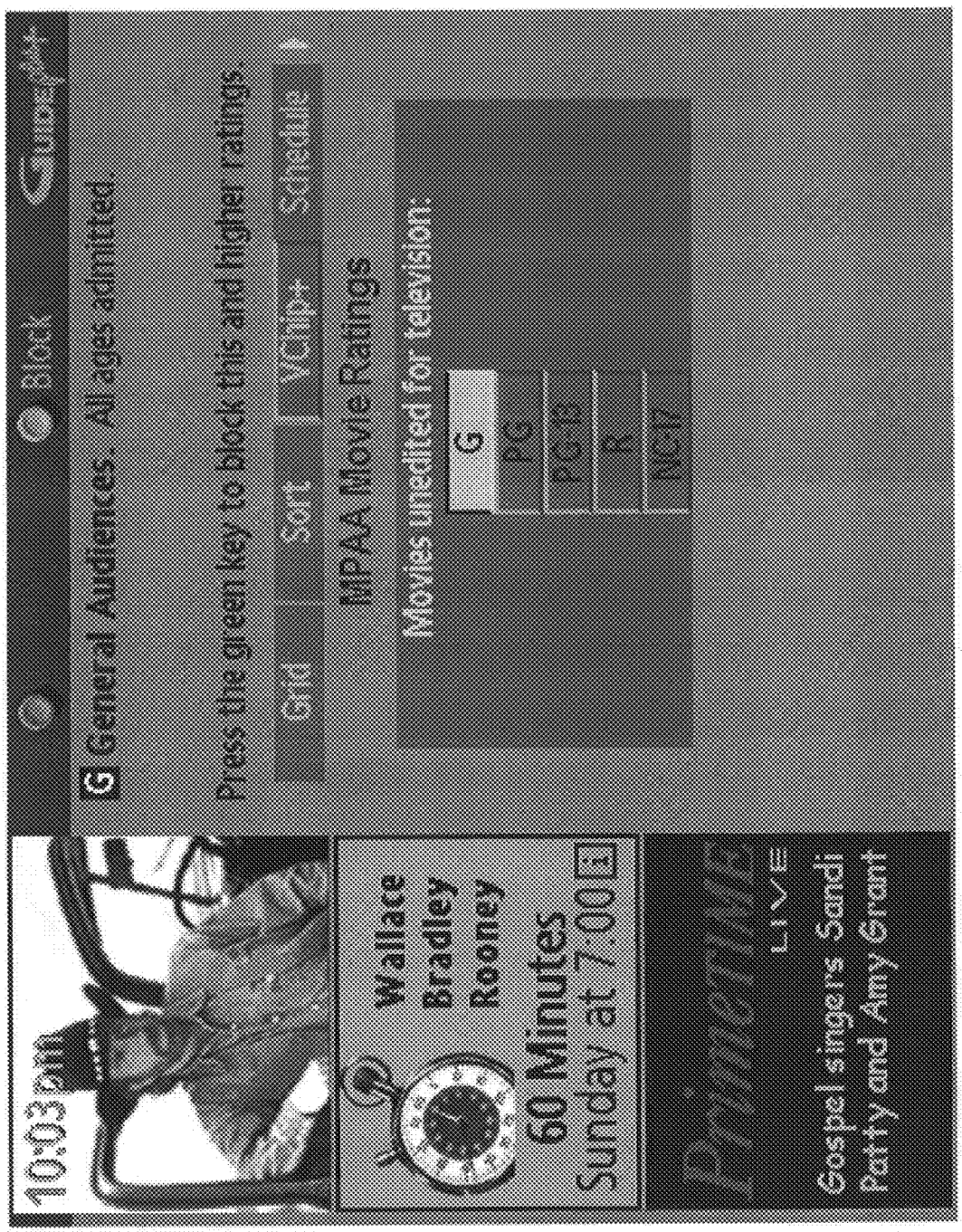
Figure 48:
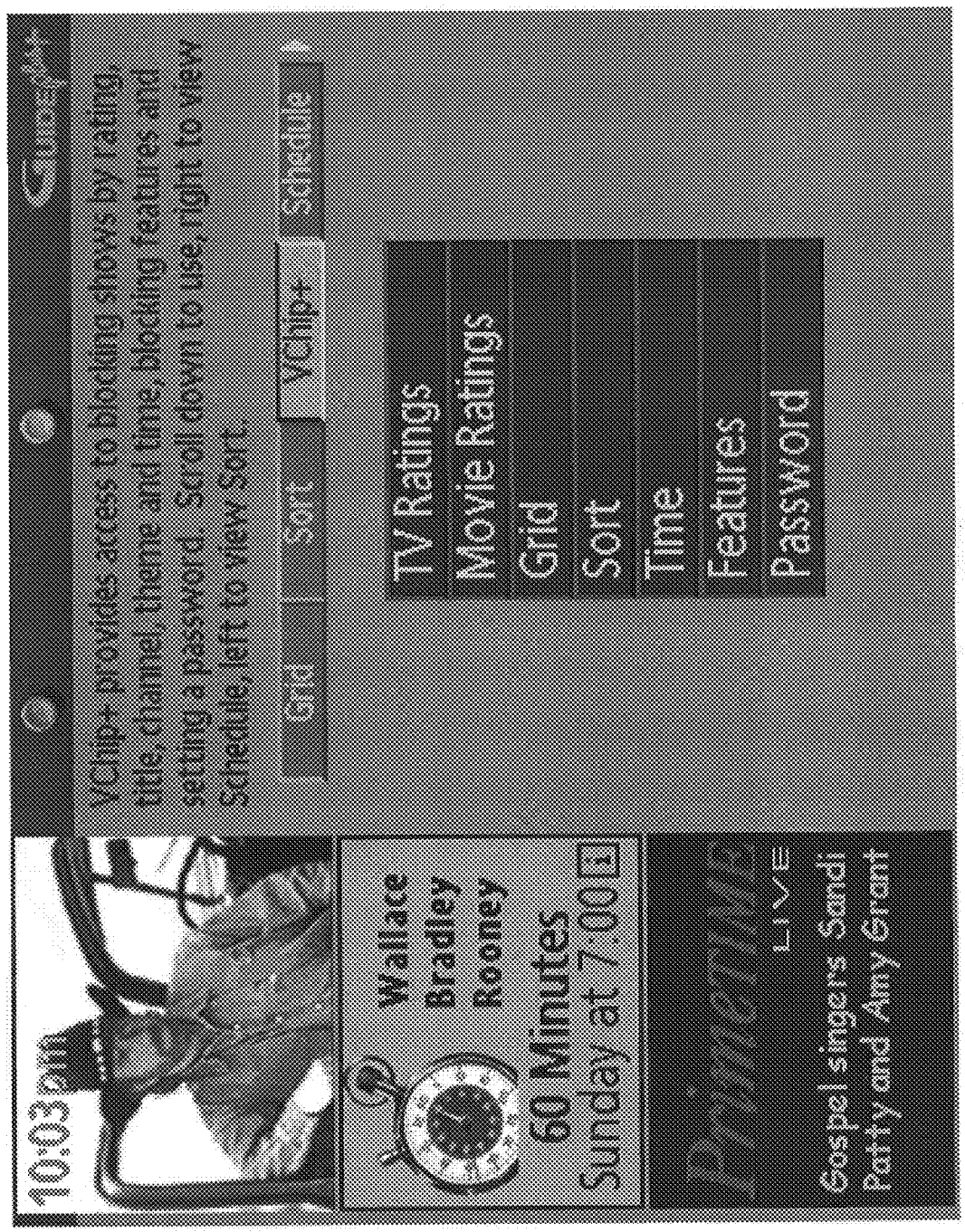

VChip Plus+ MPAA Ratings is selected from the feature menu of FIG. 46 by highlighting Movie Ratings feature. FIG. 47 shows the movie Ratings screen responsive to the selection of the Movie Ratings feature in FIG. 46. From this screen the user may block all instances of shows with any given MPAA Ratings. When a rating is blocked, that rating and all higher ratings are blocked. When a rating is unblocked, only that rating is unblocked. In this example, all the movies with rating G are unblocked.

Figure 49:
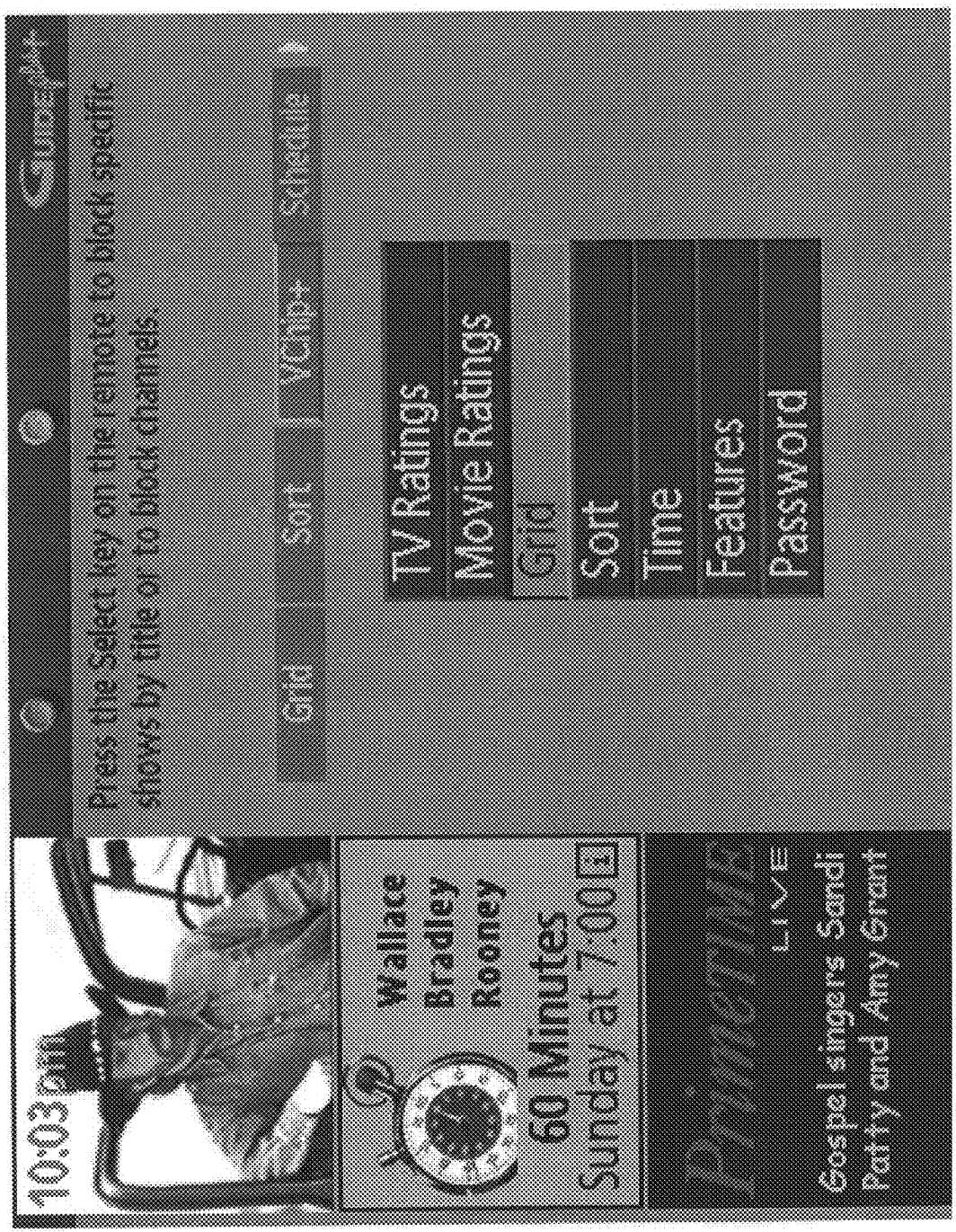
Figure 50:
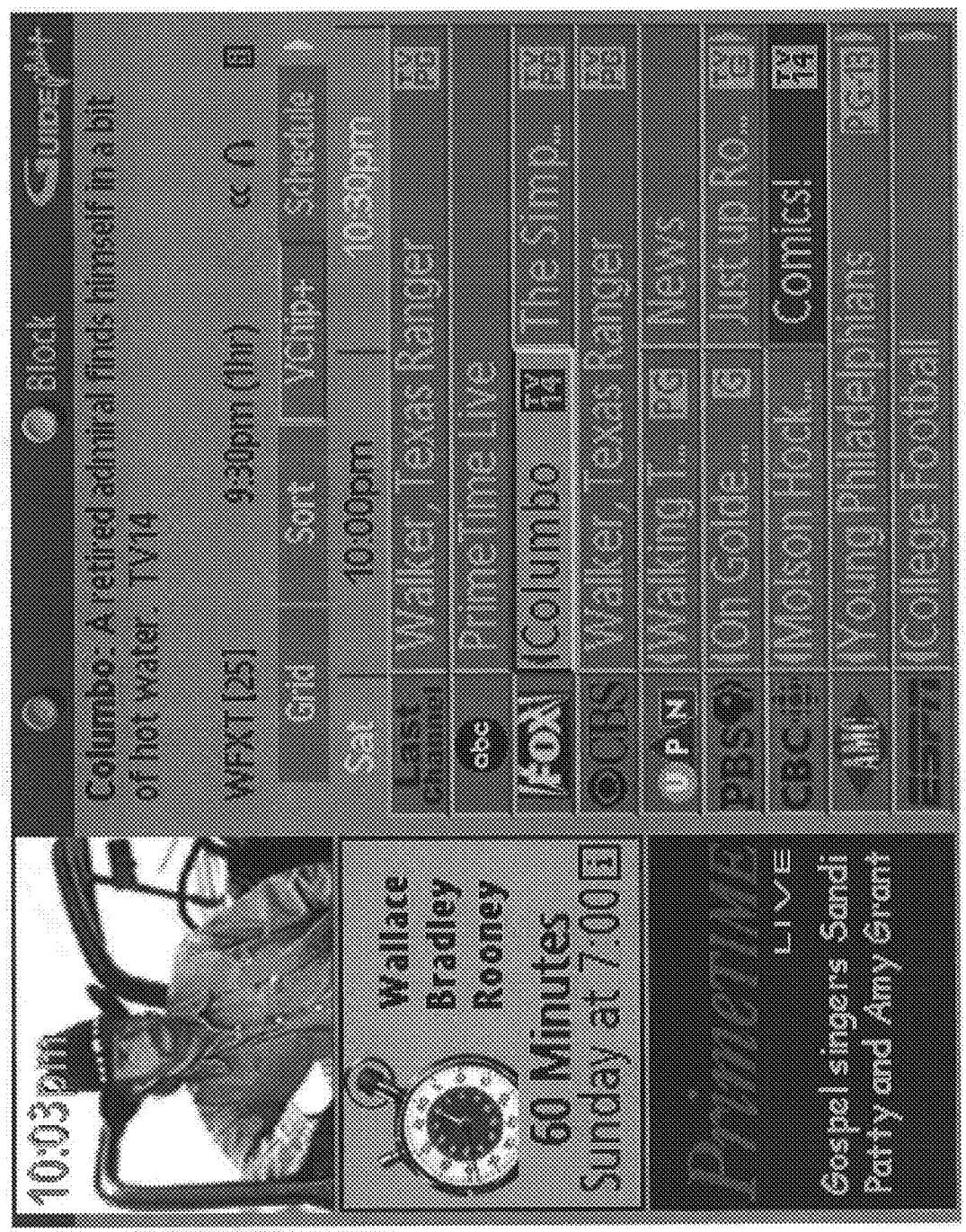

After the VChip Plus+ Grid feature is selected as shown in FIG. 49, the screen of FIG. 50 is displayed. The VChip Plus+ Grid is in gray tones except for the PIG, ads, logos and the action bar. This is intended for differentiating it from the Guide's Grid Screen. This screen displays ALL channels, whether or not they are turned off in the Editor. Individual shows or entire channels may be blocked from this screen as shown in FIGS. 51-52. All blocked shows or channels are in dark gray. However, channel ads do not appear in this grid. When blocked show title is highlighted in Master mode, the blue and green action buttons are labeled "Remove" and "Change" respectively. When not in Master mode, the action button labels are blank.

Figure 53:
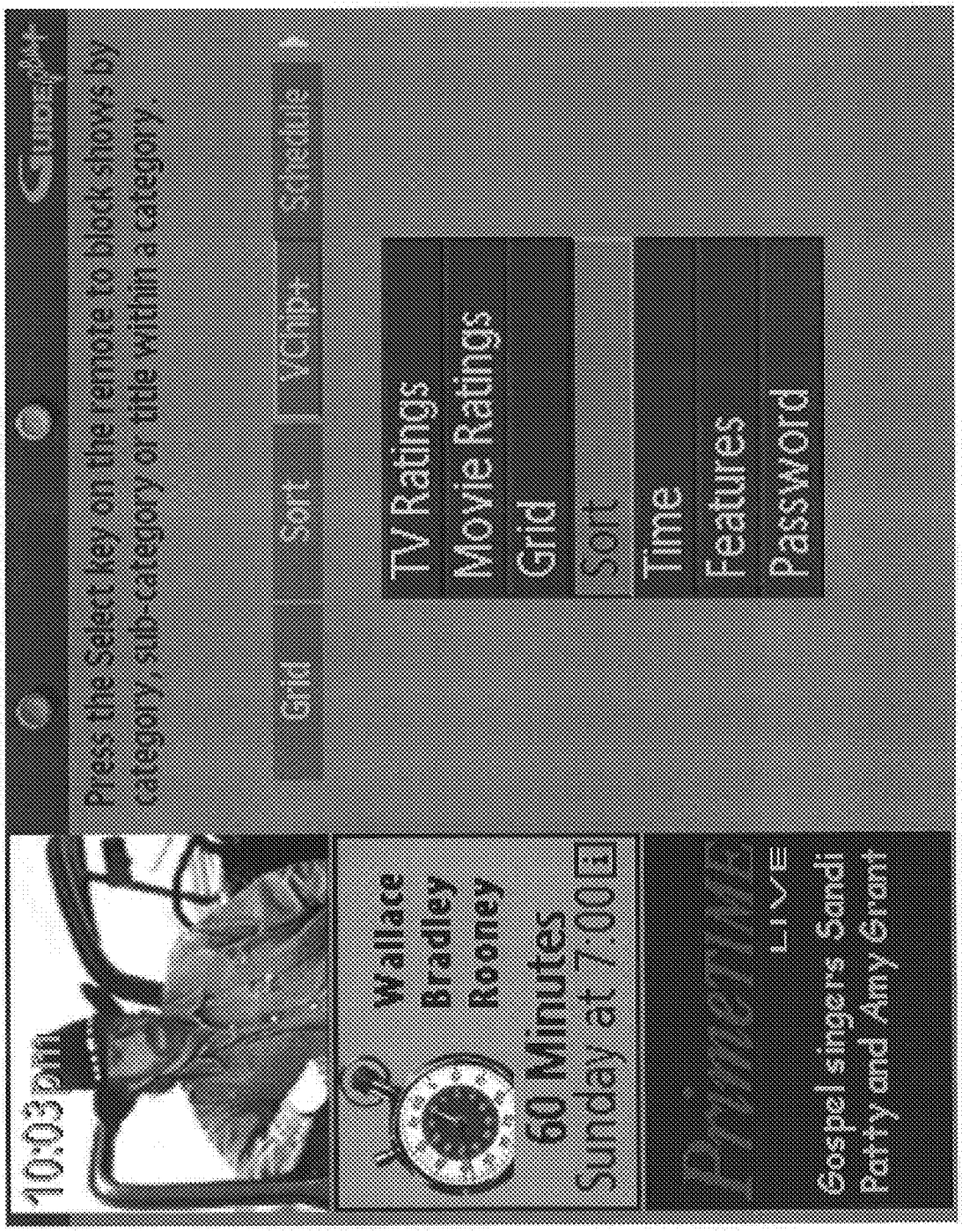
Figure 54:
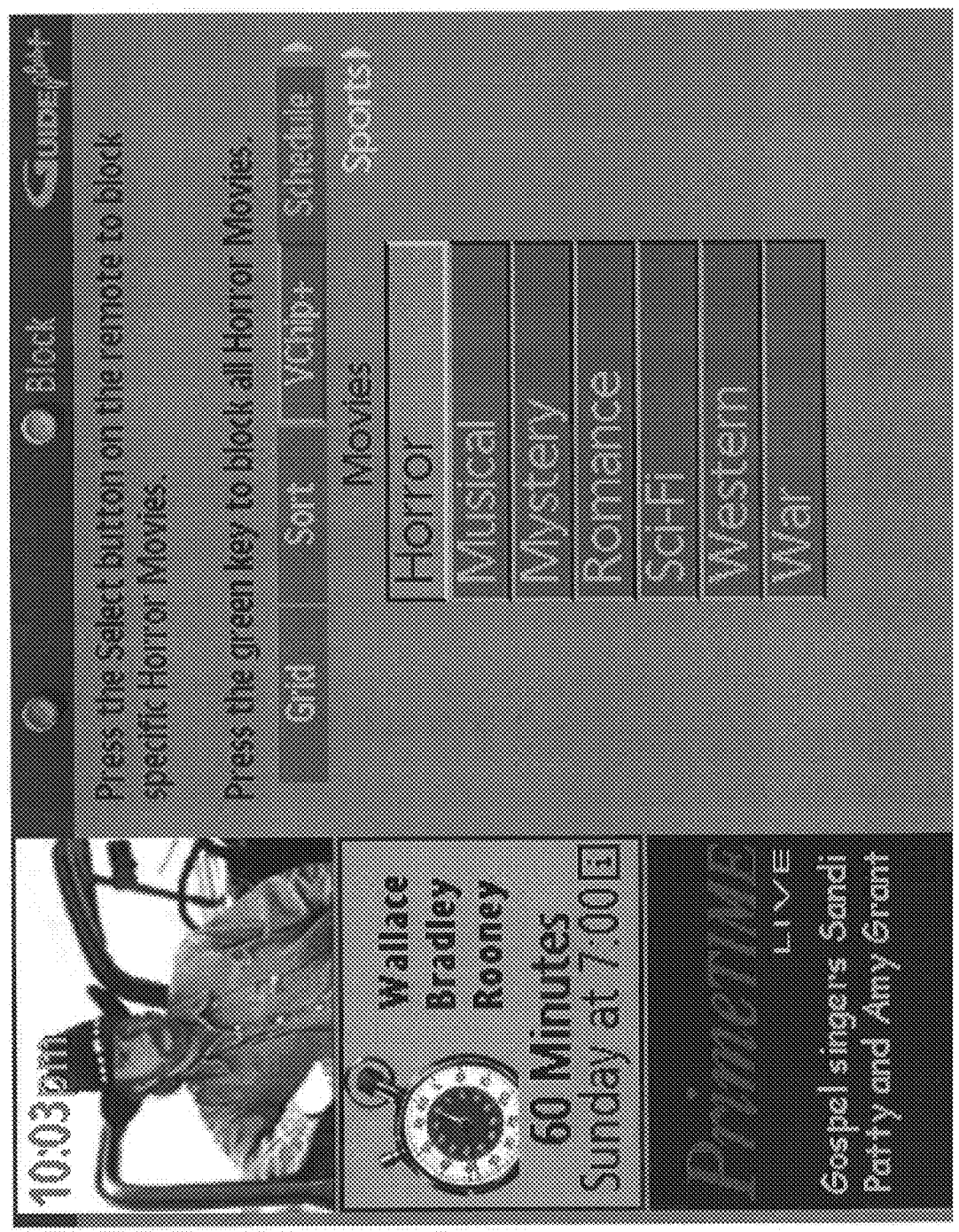
Figure 55:
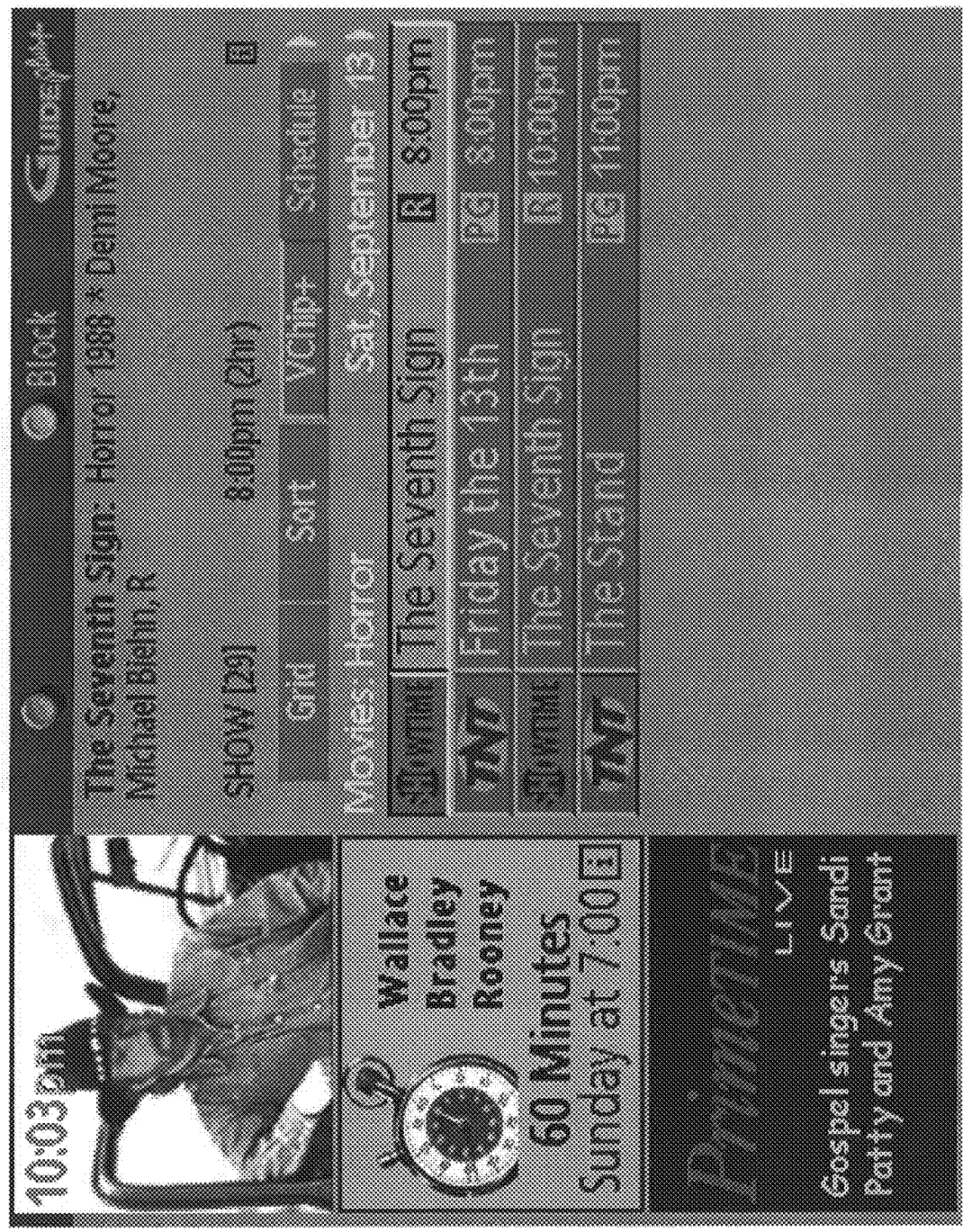
Figure 56:
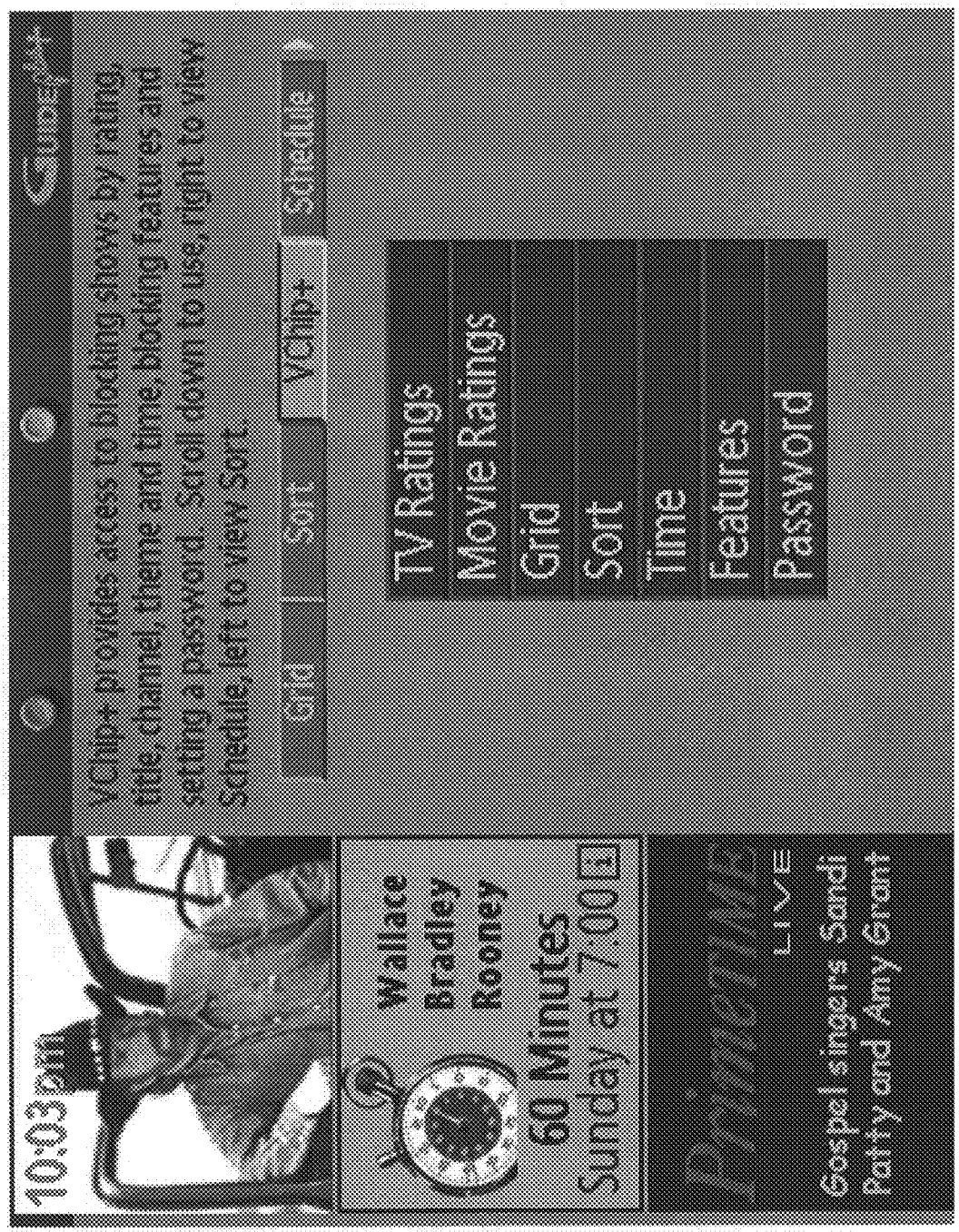

After the VChip Plus+ Sort feature is selected as shown in FIG. 53, the screens of FIGS. 54 and 55 are displayed. From the Sort screen the user may block all shows in a category, e.g. Movies, Sports or Children's programs. From the first level Sort screen of FIG. 54, the user may block all shows in a subcategory, e.g. Horror, Mystery, Baseball, Basketball, etc. From the second level Sort screen of FIG. 55, the user may block any individual show in a subcategory.

VChip Plus+ Time Settings

Figure 57:
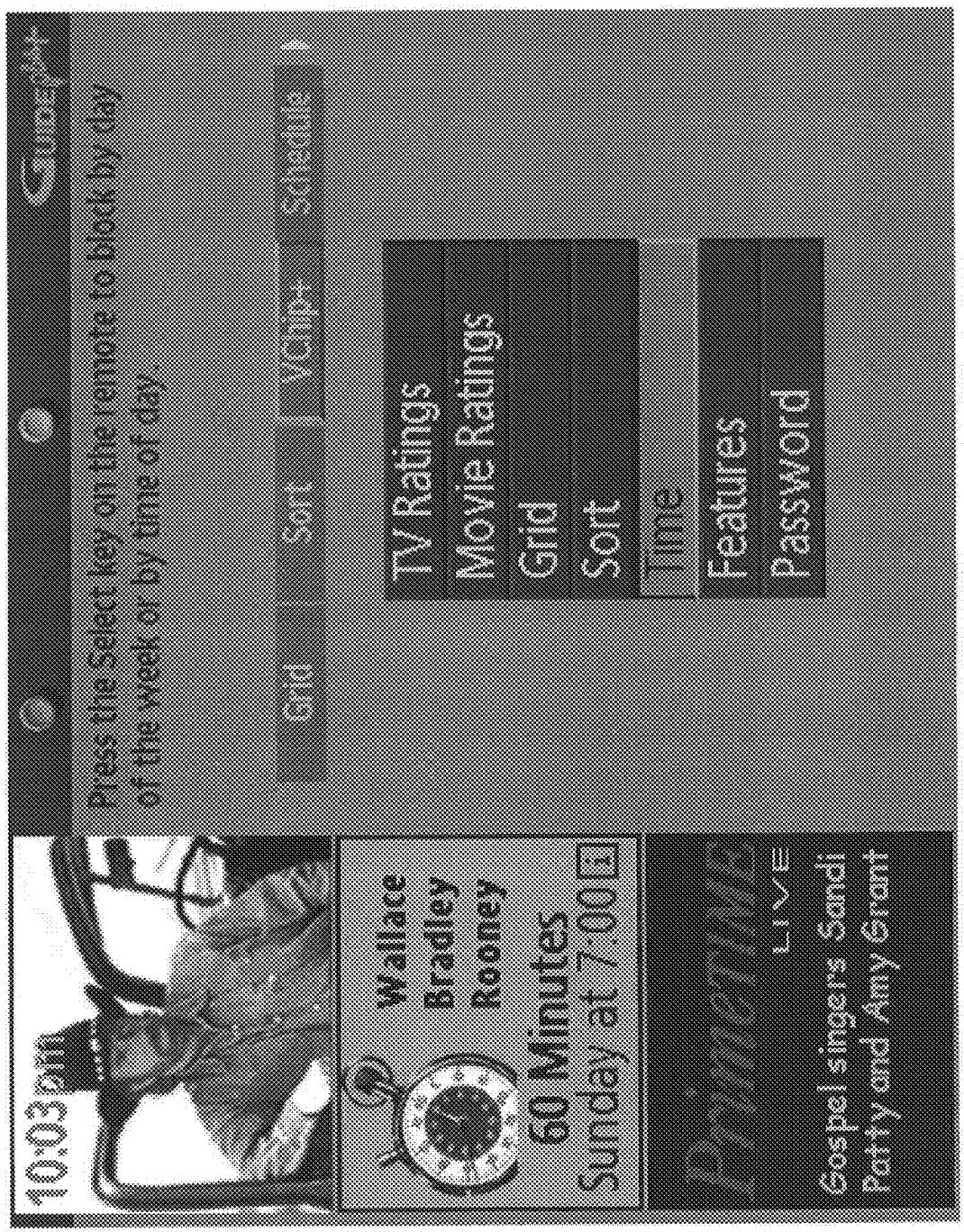
Figure 58:
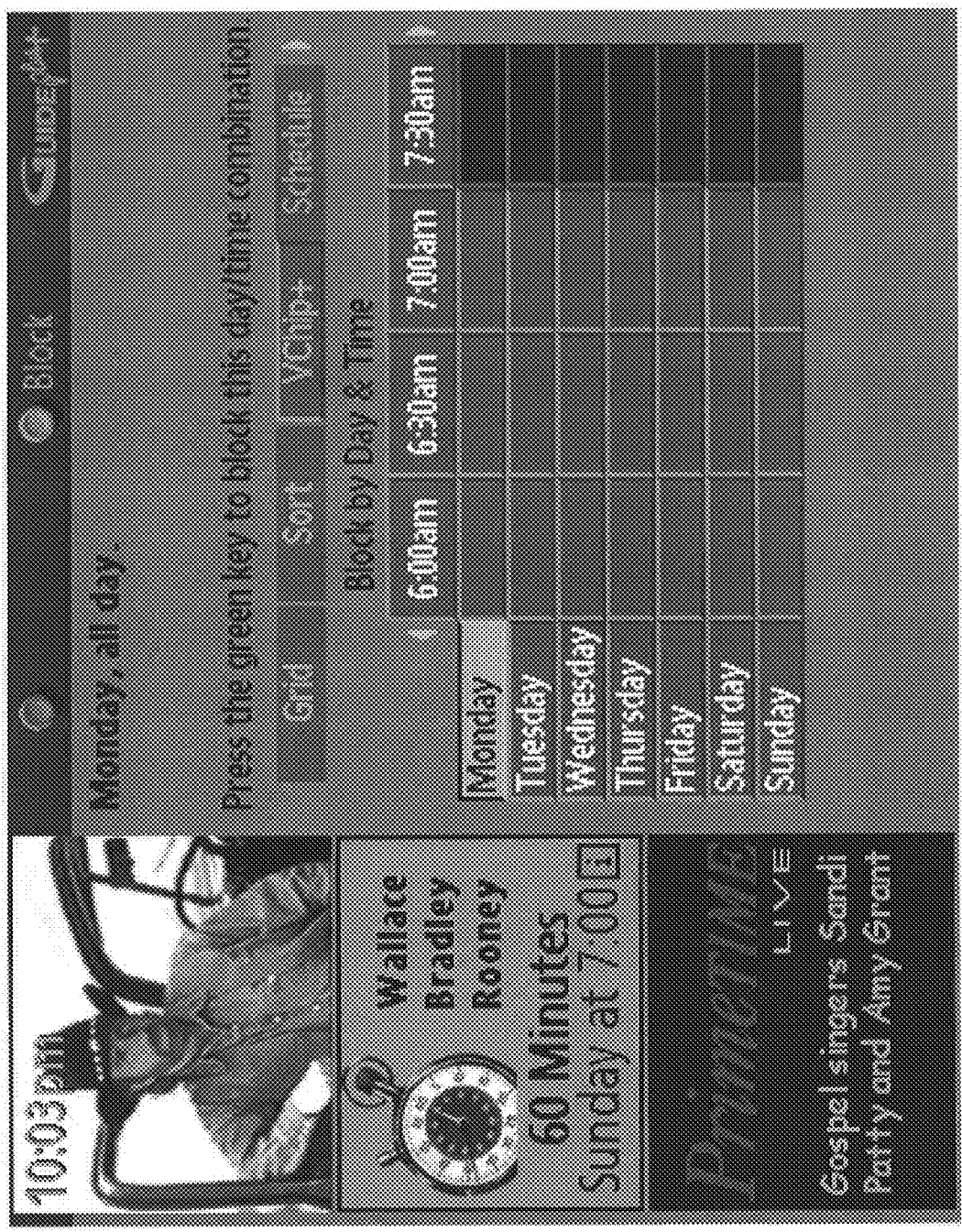
Figure 59:
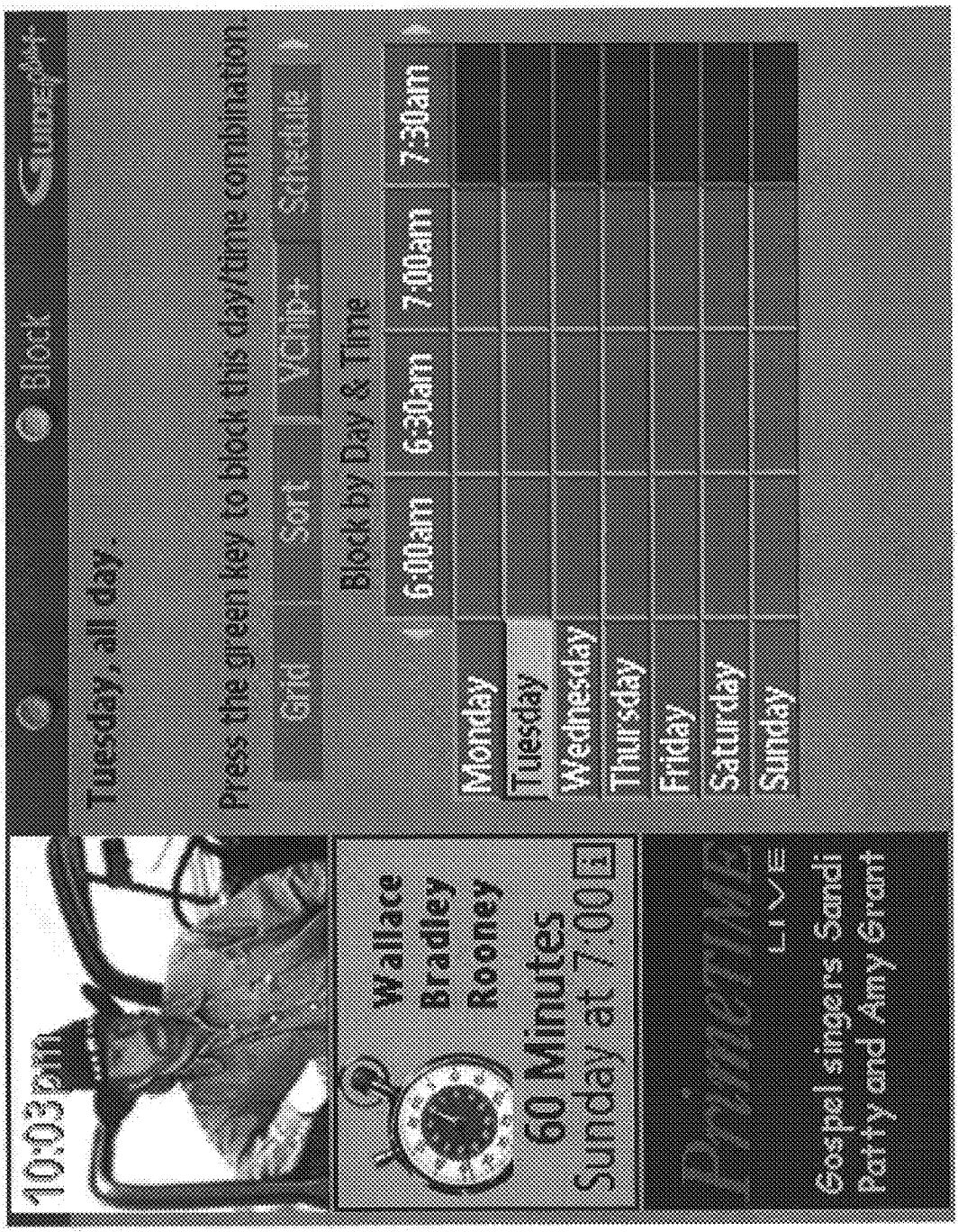
Figure 50:
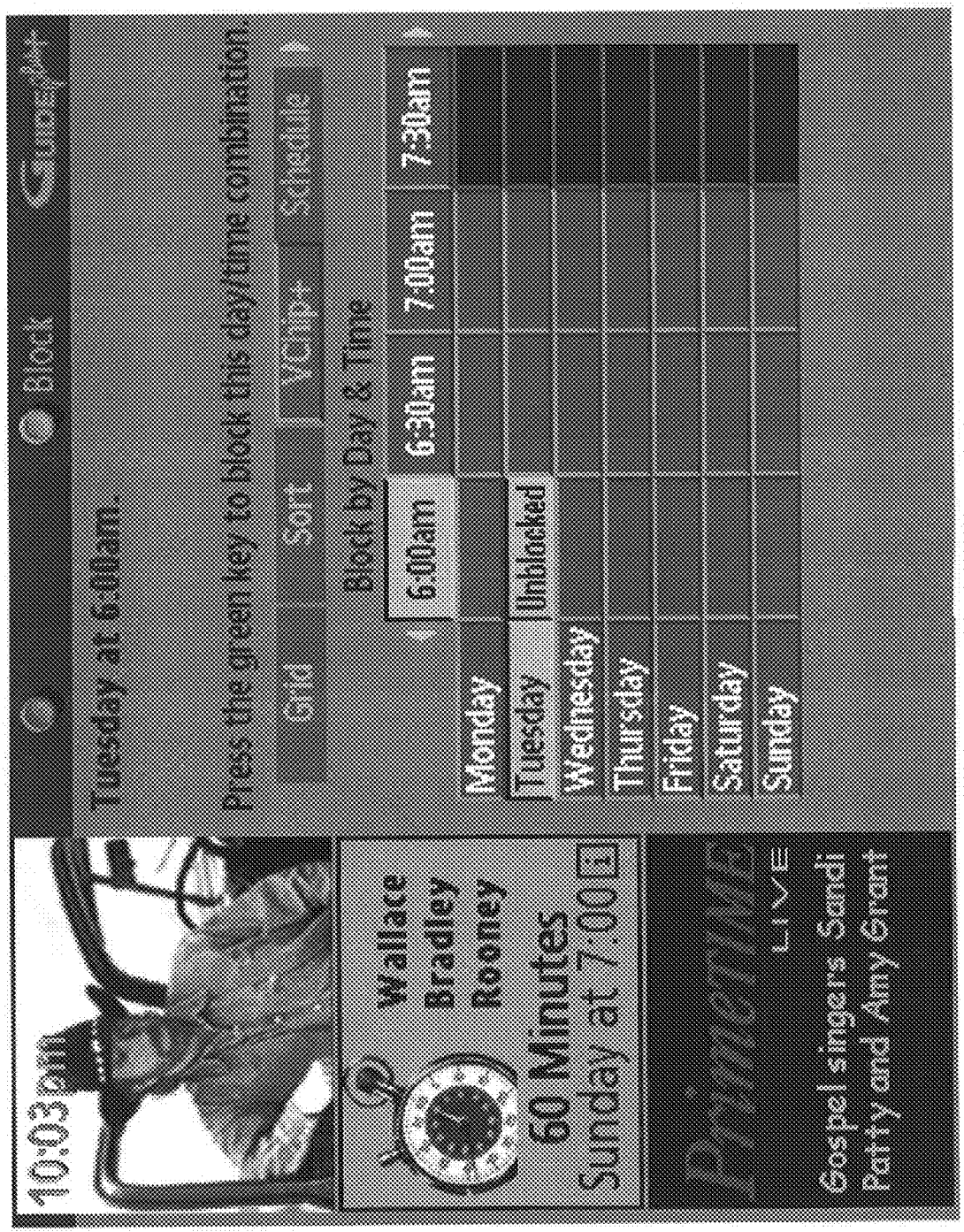
Figure 61:
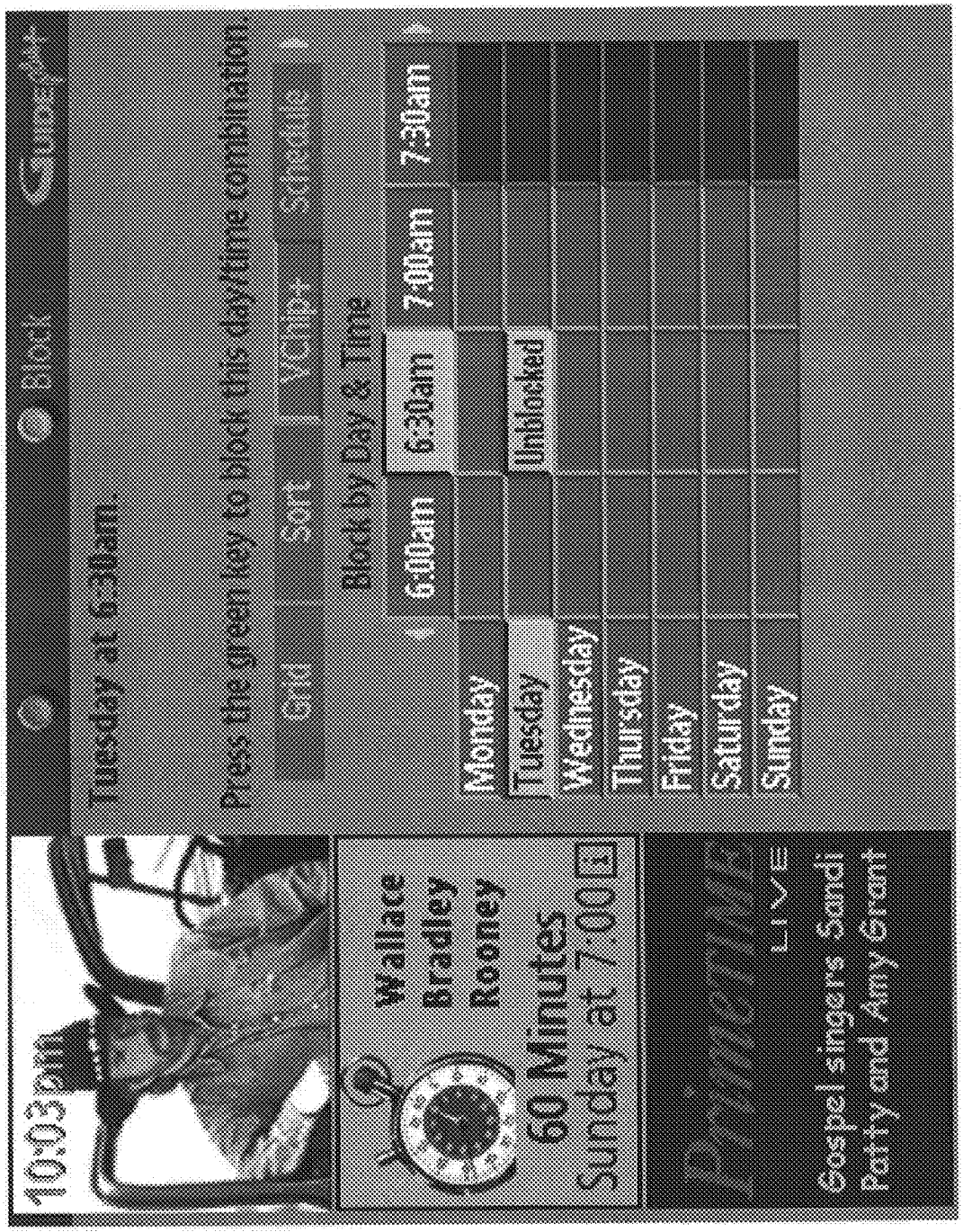
Figure 62:
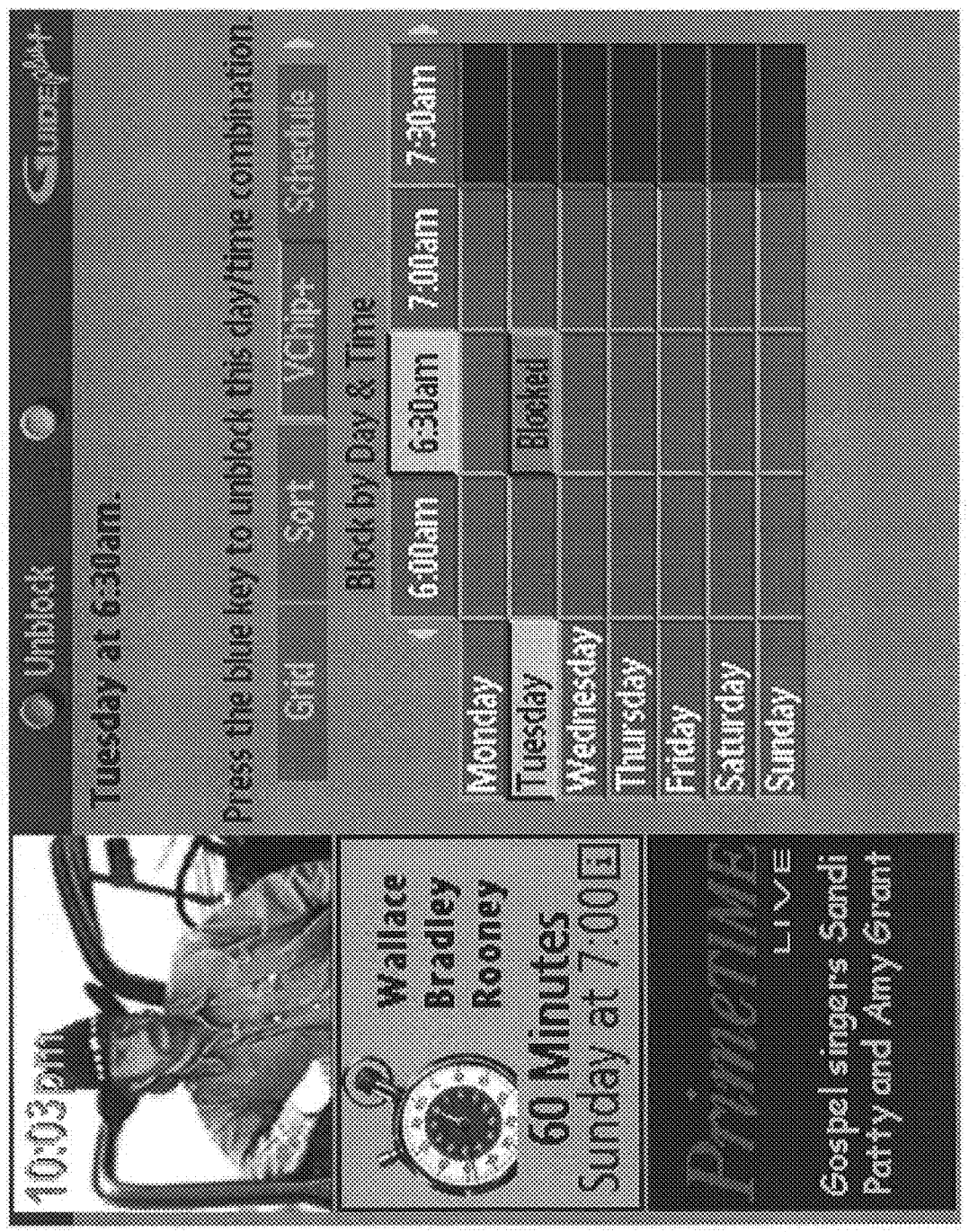
Figure 63:
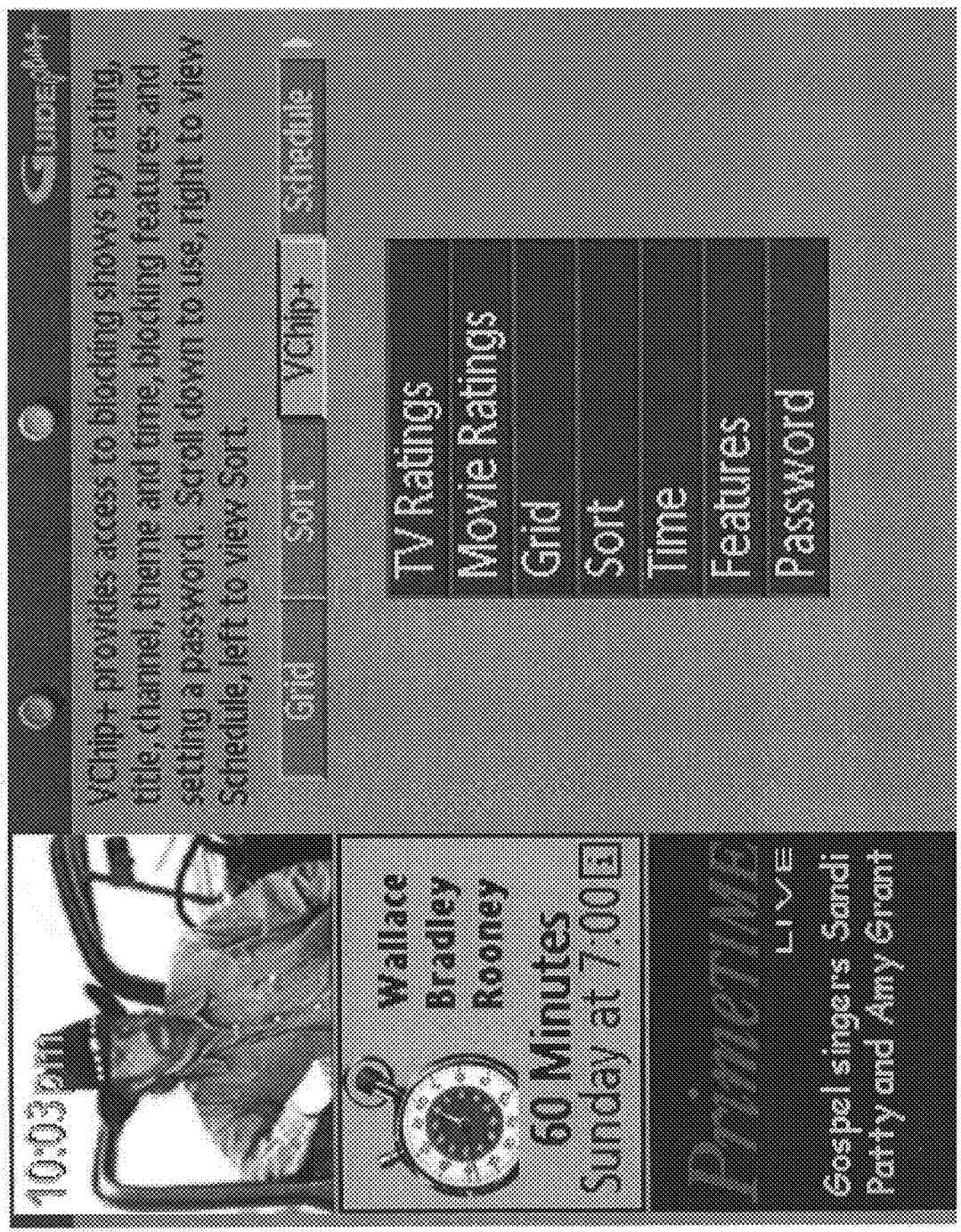
Figure 64:
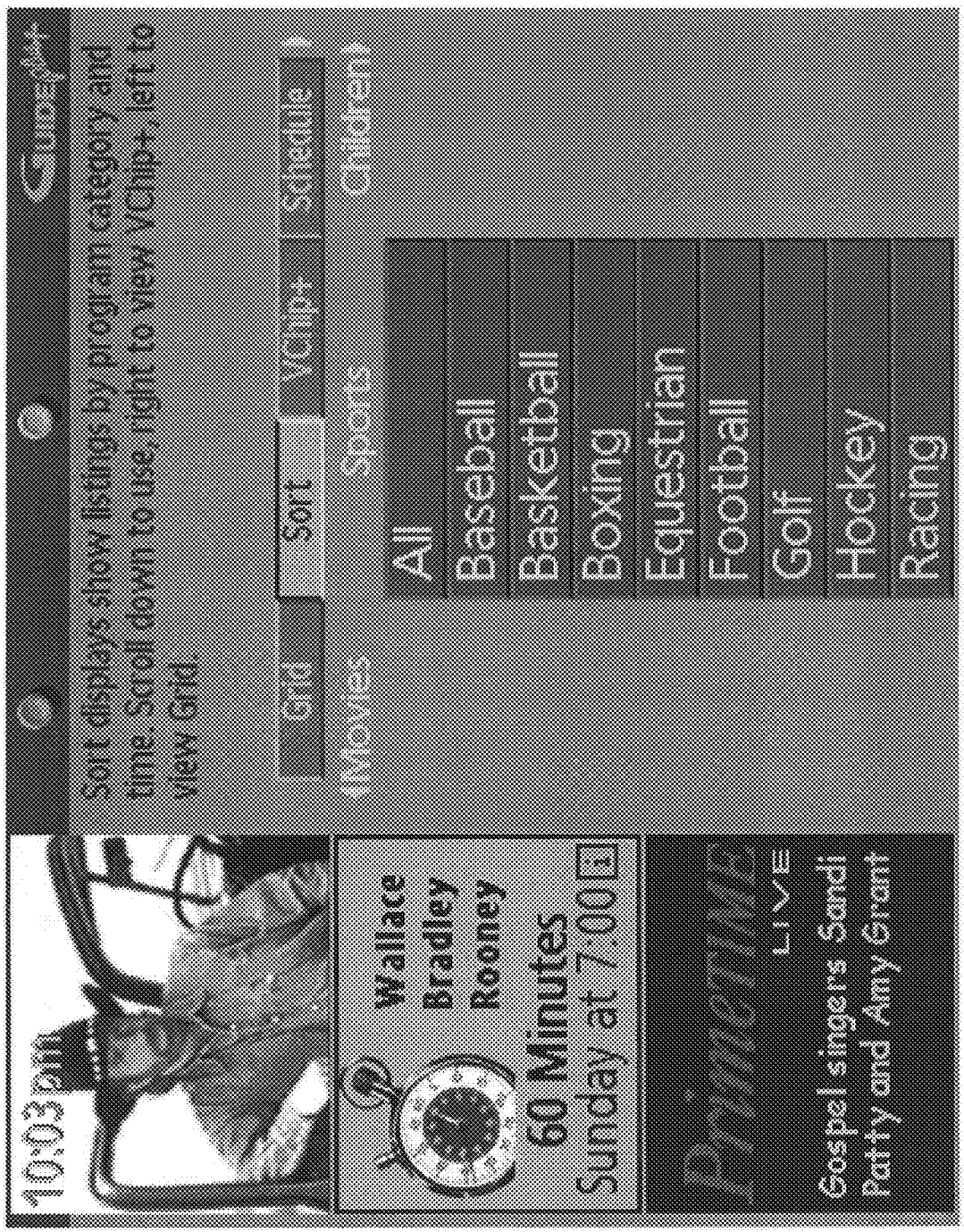

After the VChip Plus+ Time feature is selected as shown in FIG. 57, the screens of FIGS. 58-62 are displayed. From these Time Settings screens, the user may block viewing by times of the day and/or days of the week. The user may highlight a day or time tile and block that entire day or that time for all days. Alternatively the user may block certain hours on any individual day.

After the VChip Plus+ Features function is selected, a features screen is displayed. From this Features screen, the user may block access to the record and/or watch functions. Additionally, the user may select a Power Outage setting from this screen. After the VChip Plus+ Password feature is selected a Password screen is displayed. From this Password screen the user may set up the Master Password for the first time (if not done during initial setup) or may modify the current Master Password.

Figure 65:
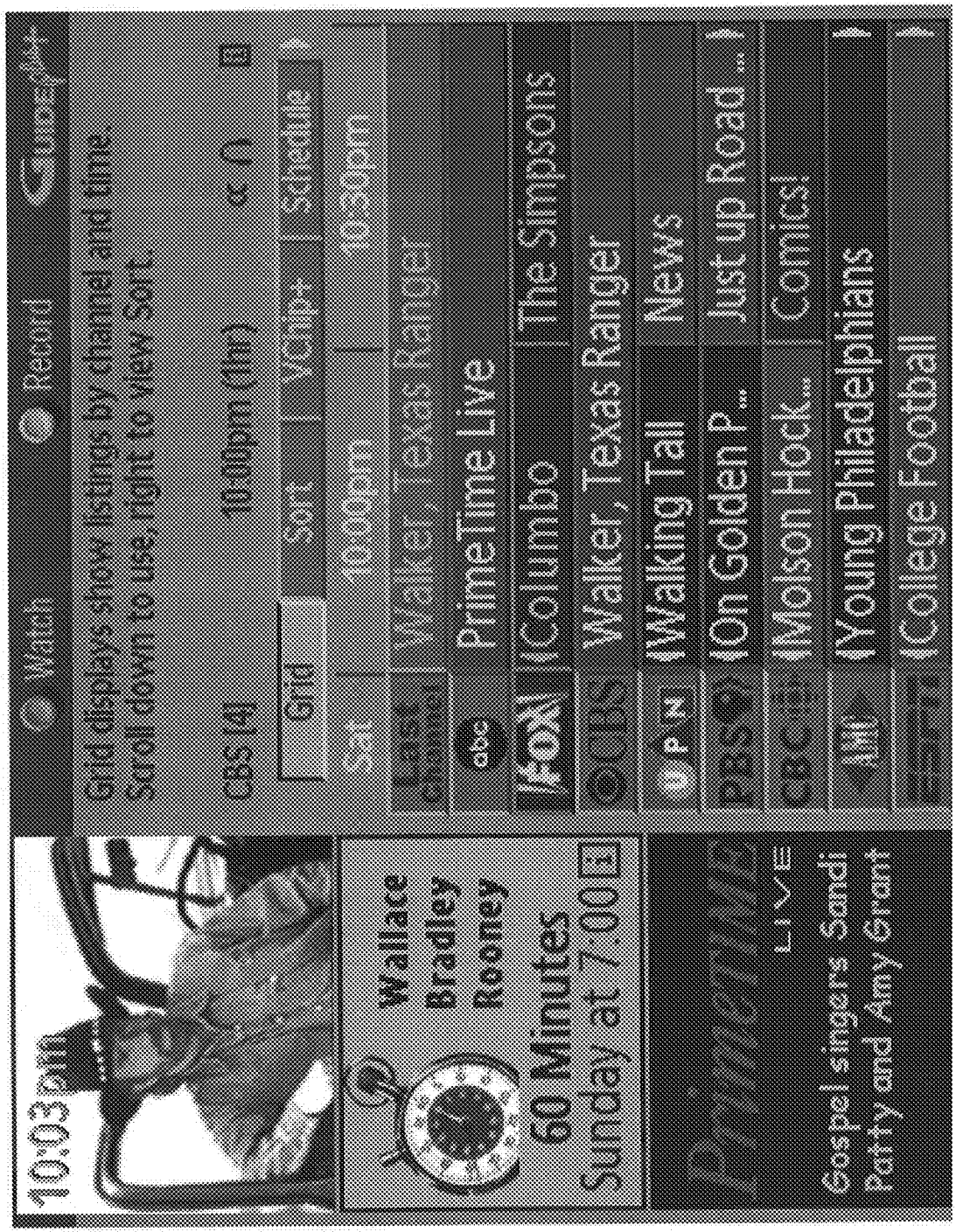

When a show, channel, time-slot, etc. is blocked, the title(s) identifying the show, channel, time slot, etc. are modified to have different background colors as shown in FIG. 65. In this screen, The Simpsons, Young Philadelphians and the 10:00 p.m. time slot are indicated as blocked by the dark gray background.

Master Password Control

In one embodiment of the present invention, a 4 digit numeric Master Password scheme is used to enable the establishment of a User Profile and provide unlimited access to the Guide screens and shows once a Master Password is established. Only one Master Password can be established. It is established either during initial setup (see FIG. 67) or later by entering the Password screen from the Guide menu (see FIG. 43) or the TV mode. Once a Master Password is established, the Master Password must be entered to execute blocking or unblocking. The Master Password must also be entered to access the Setup, Editor, and VChip Plus+ screens. Once entered, the TV is in Master Password mode until the TV is turned off, the user exits VChip Plus+ mode, or a certain time delay, which starts from the time when the user correctly enters the password, has expired.

Figure 39:
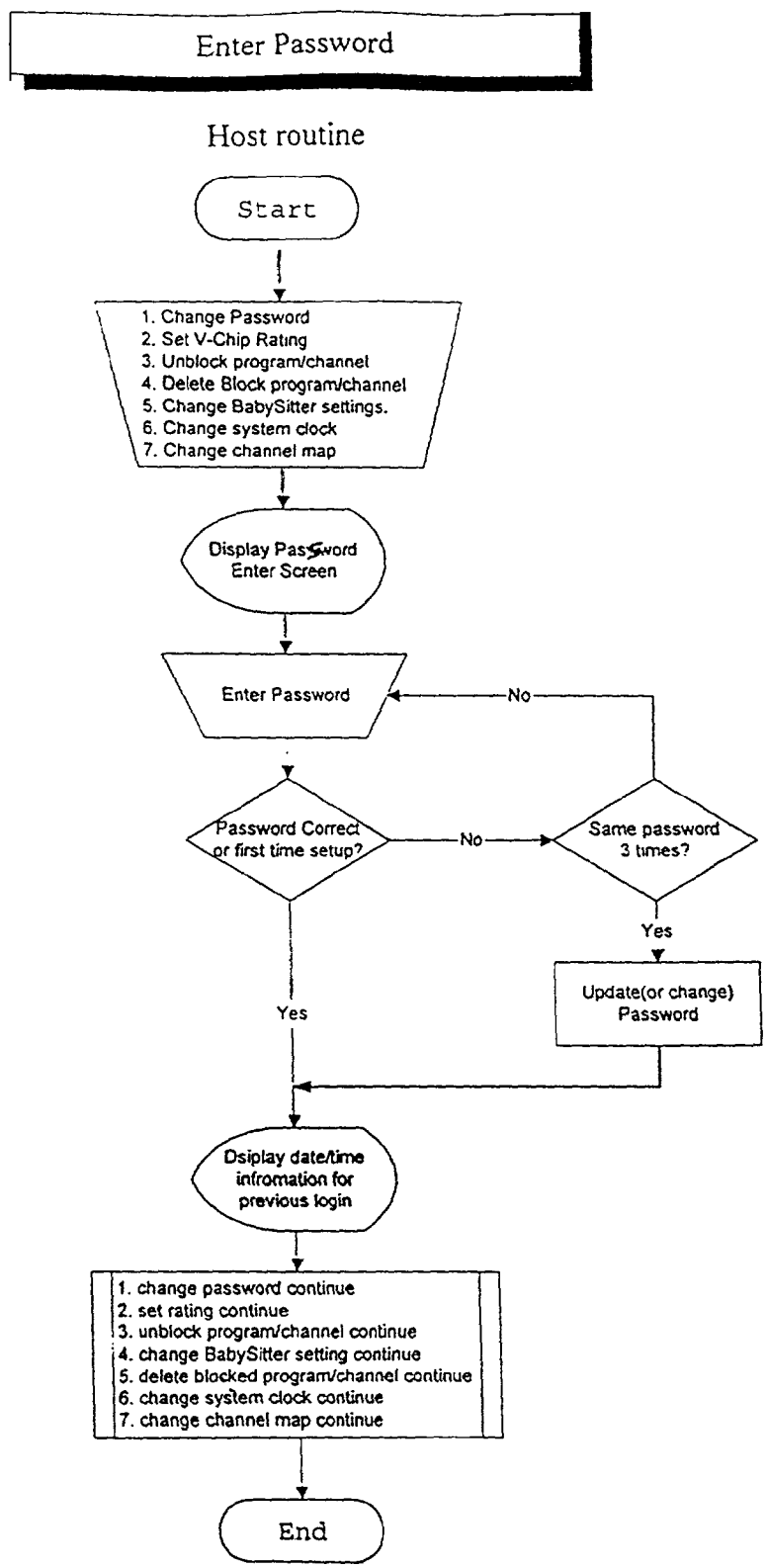
FIG. 39 is a flow diagram for a preferred embodiment of the password operation.
Figure 40:
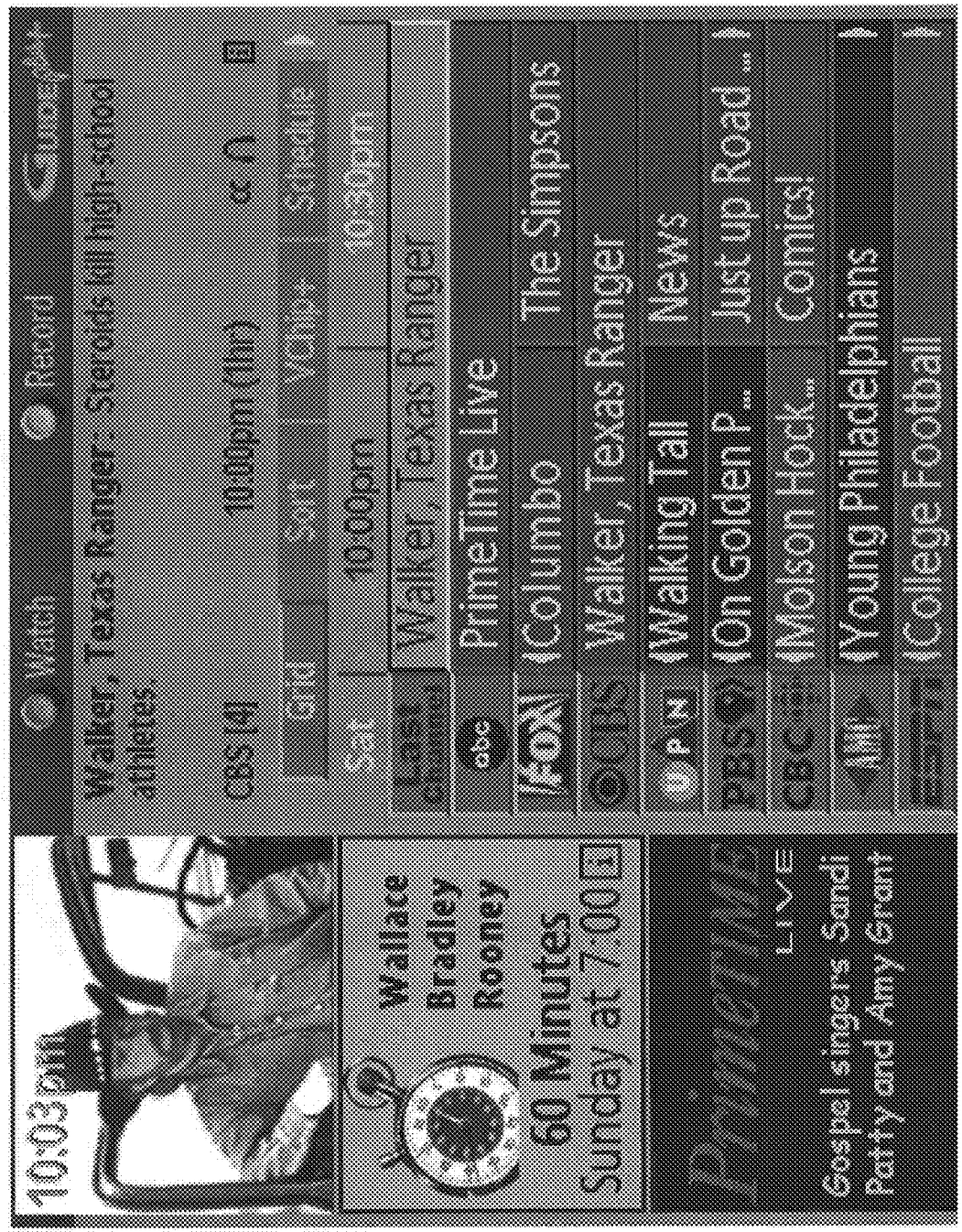
Figure 41:
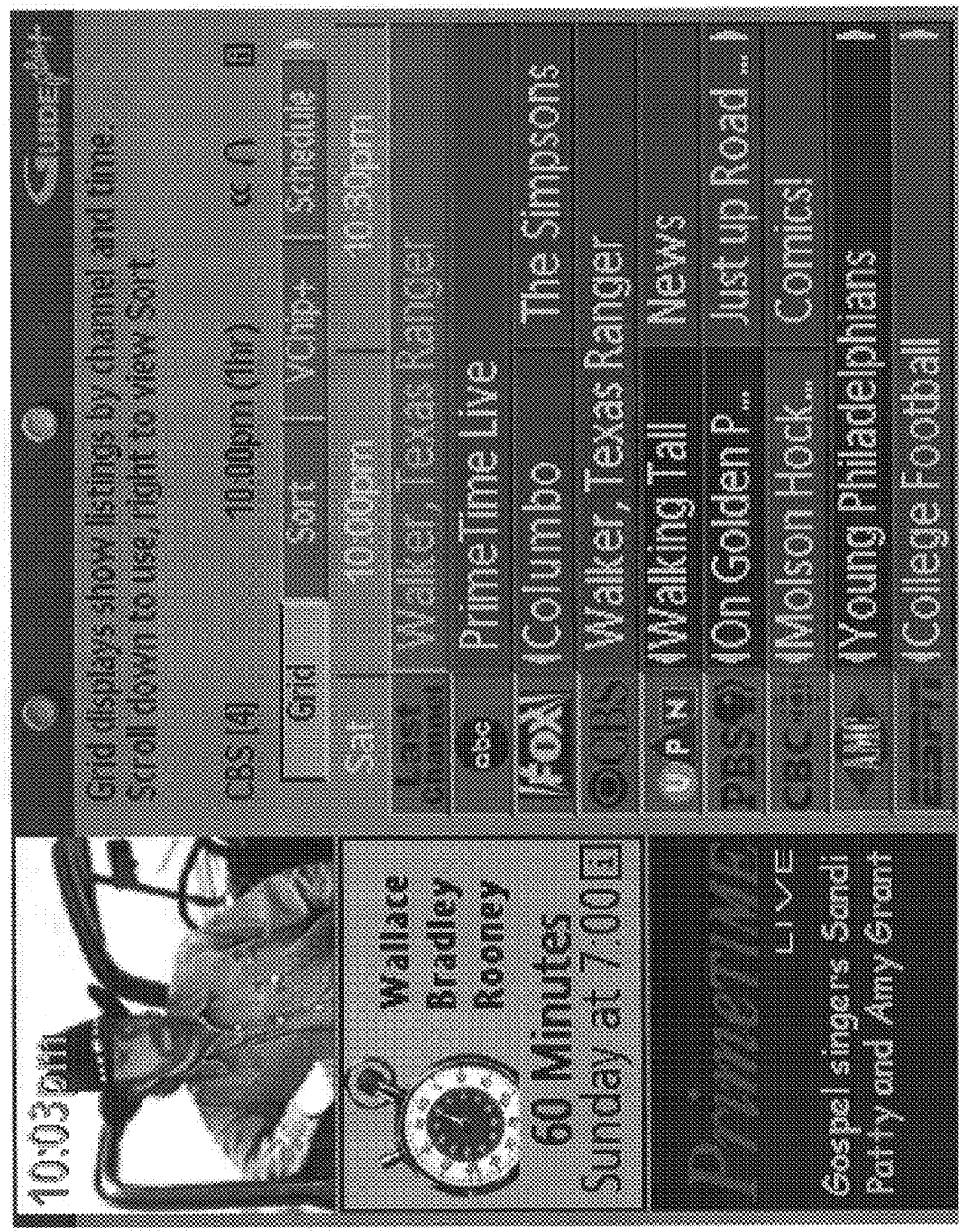
Figure 42:
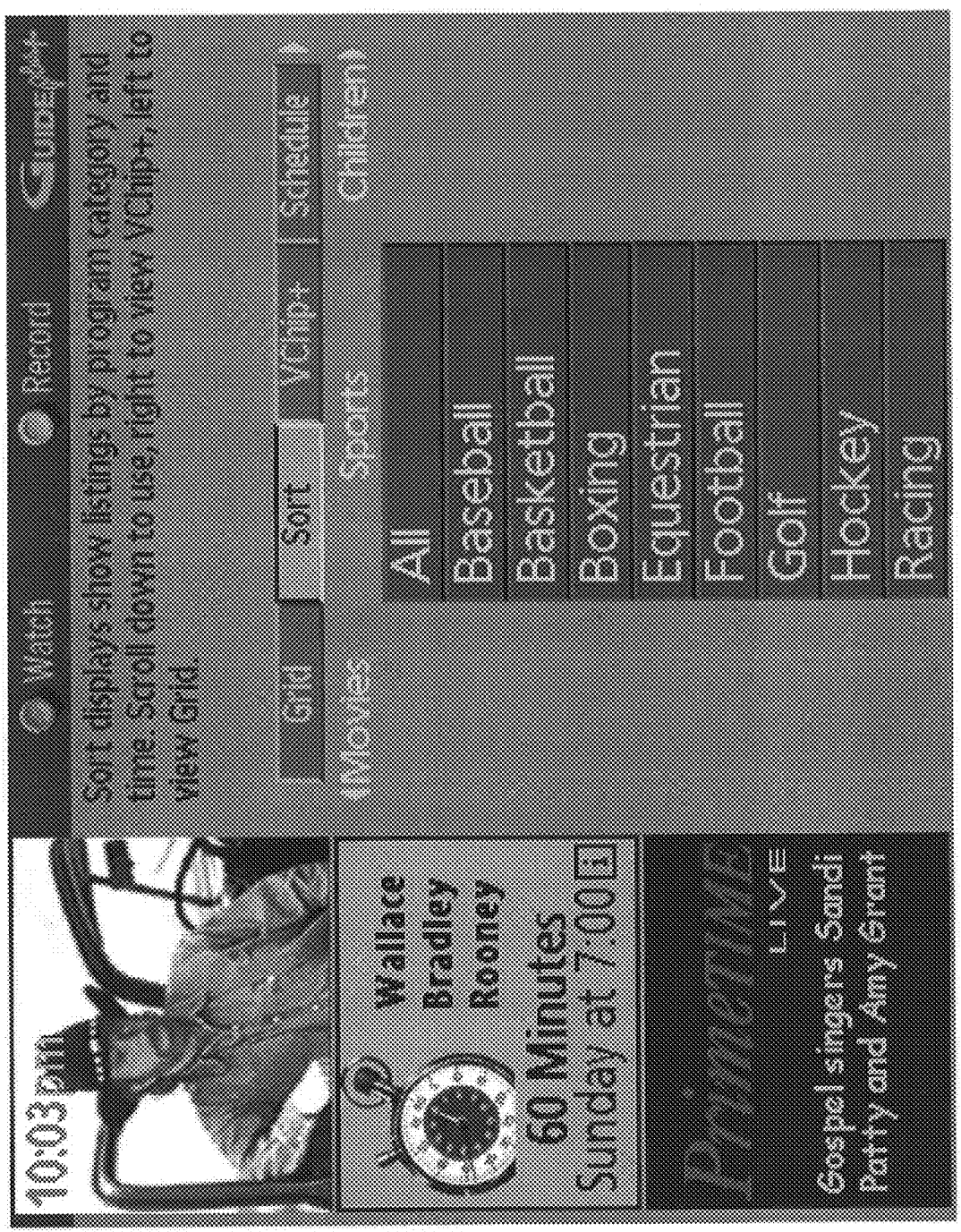

FIG. 39 is a flow chart of the master password operation. Obviously not all operations would require a password. As shown in block 391, the following operations have password protection: changing the password, changing the V-Chip ratings, deleting a "blocked" program or deleting a "blocked" channel, changing the "Babysitter" function, unblocking a program or a channel within the "Babysitter" function, changing the clock (this is because a different clock will cause VChip Plus+ to block a different program), and changing the channel map (this is because a different channel map will cause VChip Plus+ to block a different channel).

A Master password user can establish specific viewing (blocking) parameters for the User Profile, establish specific feature use limits (disable Recording or Watch) for the User Profile, modify the Master password, or enter all Guide screens and view, record or schedule to watch all shows. But, it is not necessary to input the Master Password to access unrestricted shows, channels, time slots, features and Guide screens. Whenever access to a blocked show (tuning to it in TV mode or pressing OK or Guide keys from the Guide) or a restricted screen (scrolling into or pressing OK from menu bar) or feature (recording via action buttons, any enabled buttons on the remote—likely the record button—and via the VCRPlus+ key) of the guide is attempted, a dialog box appears on screen requesting the password (see FIG. 66).

If the password is correctly input, access will be granted. If the password is incorrectly input, an error screen will be displayed. Once the password is correctly input, access to all shows and areas of the guide will be enabled until the TV is turned off, the user exits VChip Plus+ mode, or a certain time delay, which starts from the time when the user correctly eaters the password, has expired. Additionally, once the password is correctly entered, it can be changed by the user as shown in block 396. However, repeating the entry of a consistently incorrect password for a certain number of times can establish a new password. The new password is established by repeatedly entering the same incorrect password a certain number of times, and at the end of the process confirming the newly established password (block 395). The date and time of the last time that the password was used is recorded and, as shown in block 397, that date and time for the previous login is then displayed.

Once a Master Password is created, restrictions on access to certain Guide screens is automatically established as modifications to these screens may defeat blocking effectiveness. Only the Master may establish blocks. Access-blocking may be established on: individual shows; channels; themes (entire themes such as Movies, Sports, Children's or sub-themes such as Adventure, Drama, Baseball, Basketball, etc.); TV Parental Guideline or MPAA rating (including un-rated shows); time slot or day; and/or access to the Recording and Watch features.

When a show is blocked either by the blocking of the individual show, show channel, show theme, show rating, or show time slot, and a user without entering the Master Password tries to access a blocked element, access to the blocked element will be denied and a dialog box requesting the Master Password will be displayed (see FIG. 66). Failure to input the Master Password will result in maintaining the block and the function of the Guide will be as follows:

No viewing of a blocked show in TV mode,
No viewing of a blocked show in the PIP in TV mode,
No viewing of the blocked show in the PIG in Guide mode (the PIG will contain a message indicating the show is blocked),
No scheduling of the blocked show to record (via the Guide or VCR Plus+), and
No scheduling the blocked show to watch (via the Guide or VCR Plus+)

However, the descriptions for blocked shows will be available. Also, blocked shows may still be scheduled to record or watch once the Master Password is input. Any show scheduled to record or watch will be recorded or watched even if it is blocked previously or subsequently blocked.

The record and watch features may be blocked also. If a user attempts to schedule a show to record or watch when the feature is blocked and the guide is not in Master Mode, the action will be denied and the Master Password dialog box will appear. If the Master Password is not input, the function of the Guide will be modified as follows:

If the Record feature is blocked:
the user may not schedule any show to record via the Guide or VCR Plus+
all shows scheduled to record will be marked as blocked in the Schedule so the user may not remove it or modify its frequency.

If the Watch feature is blocked:
the user may not schedule any show to watch via the Guide or VCR Plus+
all shows scheduled to watch will be marked as blocked in the Schedule so the user may not remove it or modify its frequency.

However, any show scheduled to record or watch by the Master will still be executed even if these features are blocked. If these features are not blocked, a user without the Master Password may enter the Record/Watch Schedule and make changes to any shows in the queue.

When a Master Password is set, and a user without the Master Password is using the TV or the Guide, access to the Setup, Editor, and VChip Plus+ screens will be denied. A VChip Plus+ Dialog box appears whenever access has been denied to a show, channel, time screen, feature, etc. via a VChip Plus+ block. This dialog box provides for input of the Master Password for access as shown in FIG. 66. Additional dialog boxes appear if the input is not the correct password.

The GUIDE Plus+ system supports semi-automatic setup with minimal user intervention. The basic data required from the user includes, Country, Zip Code/Postal Code, whether the service is Over-the-Air (OTA) or cable, Cable Box, chosen from on-screen list of brand names, VCR Brand, chosen from on-screen list of brand names, cable Box output RF channel (if applicable). However, VChip Plus+ includes additional setup screens directly following the Cable Box output questions. These screens will appear only the first time the user goes through setup, thereafter, the user will use the VChip Plus+ password screen to set a Master Password or change it.

Figure 72:
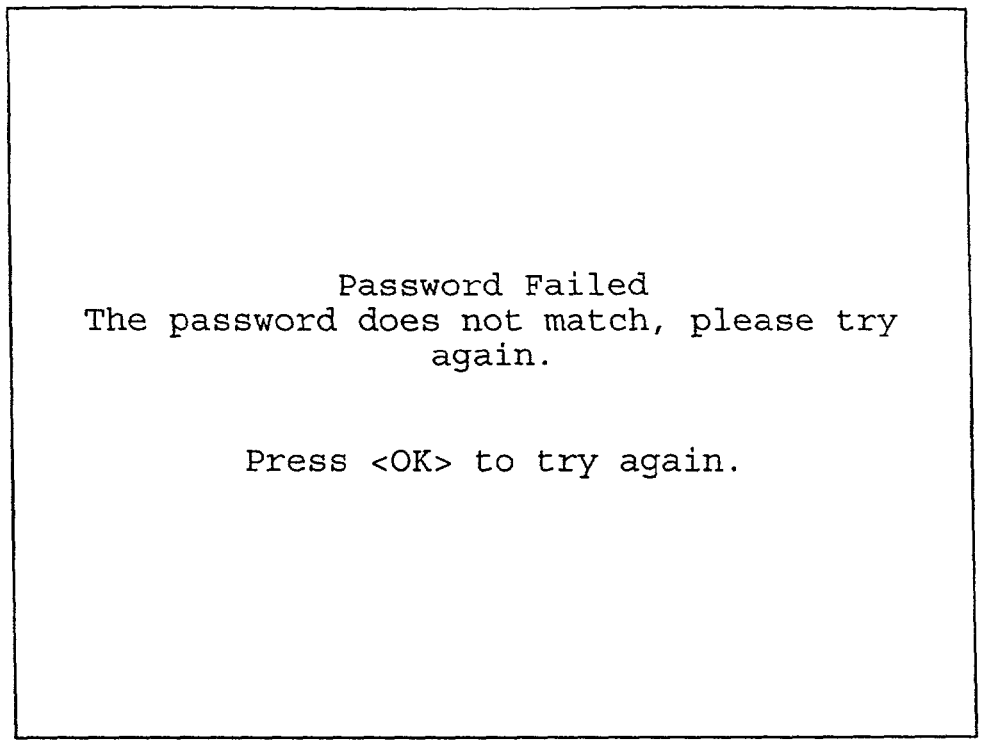

FIG. 67 depicts the Master Password Setup. The user is asked if he/she wishes to set up a Master Password now. If No, then a screen appears communicating that the user may set up a Master Password later by entering the VChip Plus+ Password screen within GUIDE Plus+ (see FIG. 68). If Yes, then the user is presented with a password creation screen as indicated by FIG. 69. Once a password is input, a confirmation screen is displayed (see FIG. 70). If the user correctly inputs the password a second time, the acceptance screen is displayed (see FIG. 71). If the user incorrectly inputs the password a second time, the failure screen shown in FIG. 72 is displayed. When the user presses the <OK> button, the Master Password Setup Screen of FIG. 67, is displayed. The user may try again now or input NO and try later.

It is apparent from the foregoing that the present invention satisfies an immediate need for a parental control apparatus which can be used with the V-Chip system. This parental control apparatus may be embodied in other specific forms and used with a variety of communications equipment without departing from the spirit or essential attributes of the present invention. It is therefore desired that the present embodiment be considered in all respects as illustrative and not restrictive, reference being made to the appended claims rather than the foregoing description to indicate the scope of the invention.

What is claimed is:

1. A method of exercising access control over a media asset based on a first blocking criterion and second blocking criterion, the method comprising:
receiving, using control circuitry, the first blocking criterion associated with a rating set by a viewer and a second blocking criterion associated with a rating factor set by the viewer;
receiving, using the control circuitry, a rating code associated with a rating of the media asset and a rating factor code associated with content of the media asset, wherein the rating factor code is associated with the content of the media asset without specifically identifying the media asset;

blocking access to the media asset, using the control circuitry, if the rating code satisfies the first blocking criterion and the rating factor code satisfies the second blocking criterion; and permitting, using the control circuitry and without requiring a password, access to the media asset if the rating code satisfies the first blocking criterion and the rating factor code does not satisfy the second blocking criterion.

2. The method of claim 1, wherein the rating code is associated with a TV rating and the rating factor code is associated with content.

3. The method of claim 1, wherein the rating code is one of TV-Y, TV-Y7, TV-G, TV-PG, TV-14, TV-MA, and UNRATED, and wherein the rating factor code comprises a content rating associated with at least one of violence, sexual explicitness, coarse language, and suggestive dialogue.

4. The method of claim 1, wherein the first blocking criterion is satisfied if the rating code exceeds a predefined threshold.

5. The method of claim 1, wherein the second blocking criterion is satisfied if the rating factor code exceeds a predefined threshold.

6. The method of claim 1, wherein the first blocking criterion and the second blocking criterion are received from the viewer via selections from an on-screen menu.

7. The method of claim 1, further comprising:
entering a master mode of operation responsive to receiving, using the control circuitry, the password; and
permitting access to the media asset, while in the master mode of operation, regardless of whether the rating code satisfies the first blocking criterion.

8. The method of claim 7, wherein the master mode remains in effect until the viewer exits the master mode or a time delay expires.

9. The method of claim 1, wherein at least one of the first blocking criterion and the second blocking criterion are specified in a parental control review list.

10. The method of claim 1, wherein the second blocking criterion is associated with a time allowance, the method further comprising:
overriding, using the control circuitry, the blocking of the media asset regardless of the rating factor code, if the time allowance is not exceeded.

11. A system for exercising access control over a media asset based on a first blocking criterion and second blocking criterion, the system comprising:
control circuitry configured to:
receive the first blocking criterion associated with a rating set by a viewer and the second blocking criterion associated with a rating factor set by the viewer;
receive a rating code associated with a rating of the media asset and a rating factor code associated with content of the media asset, wherein the rating factor code is associated with the content of the media asset without specifically identifying the media asset; and
access control circuitry configured to:
block access to the media asset if the rating code satisfies the first blocking criterion and the rating factor code satisfies the second blocking criterion; and
permit, without requiring a password, access to the media asset if the rating code satisfies the first blocking criterion or the rating factor code does not satisfy the second blocking criterion.

12. The system of claim 11, wherein the rating code is associated with a TV rating and the rating factor code is associated with content.

13. The system of claim 11, wherein the rating code is one of TV-Y, TV-Y7, TV-G, TV-PG, TV-14, TV-MA, and UNRATED, and wherein the rating factor code comprises a content rating associated with at least one of violence, sexual explicitness, coarse language, and suggestive dialogue.

14. The system of claim 11, wherein the first blocking criterion is satisfied if the rating code exceeds a predefined threshold.

15. The system of claim 11, wherein the second blocking criterion is satisfied if the rating factor code exceeds a predefined threshold.

16. The system of claim 11, wherein the first blocking criterion and the second blocking criterion are received from the viewer via selections from an on-screen menu.

17. The system of claim 11, wherein the access control circuitry is further configured to:
enter a master mode of operation responsive to receiving the password; and
permit access to the media asset, while in the master mode of operation, regardless of whether the rating code satisfies the first blocking criterion.

18. The system of claim 17, wherein the master mode remains in effect until the viewer exits the master mode or a time delay expires.

19. The system of claim 11, wherein at least one of the first blocking criterion and the second blocking criterion are specified in a parental control review list.

20. The system of claim 11, wherein the second blocking criterion is associated with a time allowance, and the access control circuitry is further configured to:
override the blocking of the media asset, regardless of the rating factor code, if the time allowance is not exceeded.

* * * * *